(12) United States Patent
Duggal et al.

(10) Patent No.: US 10,985,997 B2
(45) Date of Patent: Apr. 20, 2021

(54) SYSTEMS AND METHODS FOR DOMAIN-DRIVEN DESIGN AND EXECUTION OF METAMODELS

(71) Applicant: EnterpriseWeb LLC, Glens Falls, NY (US)

(72) Inventors: Dave M. Duggal, Glens Falls, NY (US); William J. Malyk, Guelph (CA)

(73) Assignee: EnterpriseWeb LLC, Glens Falls, NY (US)

( * ) Notice: Subject to any disclaimer, the term of this patent is extended or adjusted under 35 U.S.C. 154(b) by 0 days.

(21) Appl. No.: 16/152,314

(22) Filed: Oct. 4, 2018

(65) Prior Publication Data

US 2019/0052549 A1      Feb. 14, 2019

Related U.S. Application Data

(63) Continuation-in-part of application No. 15/589,864, filed on May 8, 2017, now Pat. No. 10,387,631.

(Continued)

(51) Int. Cl.
*G06F 9/44* (2018.01)
*H04L 12/24* (2006.01)
(Continued)

(52) U.S. Cl.
CPC .......... *H04L 41/5045* (2013.01); *G06Q 30/04* (2013.01); *G06Q 30/0635* (2013.01); *H04L 41/5019* (2013.01)

(58) Field of Classification Search
CPC ............... G06Q 30/04; G06Q 30/0635; H04L 41/5019; H04L 41/5045
(Continued)

(56) References Cited

U.S. PATENT DOCUMENTS 6,789,252 B1    9/2004   Burke
7,383,534 B1    6/2008   Agbabian
(Continued)

OTHER PUBLICATIONS

Rotsos et al., "Network Service Orchestration Standardization: A Technology Survey", Feb. 2017, Lancaster University, United Kingdom, retrieved from https://eprints.lancs.ac.uk/id/eprint/84578/1/paper.pdf, 15 pages (Year: 2017).*

(Continued)

*Primary Examiner* — Ted T. Vo
(74) *Attorney, Agent, or Firm* — Ahmann Kloke LLP

(57) ABSTRACT

An order is received indicating a network service model. A context of the order is identified. A deployment plan is generated using the network service model, the deployment plan facilitating an instantiation of a contextually-motivated network service instance as a set of normalized lifecycle management (LCM) operations performed against each of a plurality of associated service entities. The deployment plan is deployed, the deploying including binding each of the normalized LCM operations, based on the context of the order, to one or more respective micro-capabilities, each of the respective micro-capabilities having previously been onboarded to the system as one or more corresponding modeled objects capable of being declaratively composed, each of the corresponding modeled objects including a mapping of object properties, object behaviors, and standard LCM operations to one or more existing micro-capabilities of the system. The deploying also including managing execution of the one or more respective micro-capabilities and associated resources, associated storage, and associated network and service allocation and configuration, to instantiate the contextually-motivated network service instance.

27 Claims, 39 Drawing Sheets

Related U.S. Application Data

(60) Provisional application No. 62/568,226, filed on Oct. 4, 2017, provisional application No. 62/332,898, filed on May 6, 2016.

(51) Int. Cl.
  *G06Q 30/04* (2012.01)
  *G06Q 30/06* (2012.01)

(58) Field of Classification Search
  USPC .................................. 717/101–105, 120–123
  See application file for complete search history.

(56) References Cited

U.S. PATENT DOCUMENTS

| | | | |
|---|---|---|---|
| 7,627,861 | B2 | 12/2009 | Smith |
| 8,060,864 | B1 | 11/2011 | Michelsen |
| 8,621,598 | B2 | 12/2013 | Lai |
| 9,143,385 | B2 | 9/2015 | Bishop |
| 9,292,262 | B2 | 3/2016 | Gabel |
| 9,558,322 | B2 | 1/2017 | Carey |
| 9,841,955 | B2 * | 12/2017 | Duggal ............... G06F 8/35 |
| 10,387,631 | B2 * | 8/2019 | Duggal ............... H04L 67/00 |
| 10,432,464 | B2 * | 10/2019 | Franke ............... H04L 41/083 |
| 2010/0199260 | A1 | 8/2010 | Duggal |
| 2013/0246996 | A1 | 9/2013 | Duggal |
| 2014/0006220 | A1 | 1/2014 | Thiele |
| 2014/0013301 | A1 | 1/2014 | Duggal |
| 2015/0149640 | A1 * | 5/2015 | Douglas ............. H04L 41/5077 709/226 |
| 2015/0309772 | A1 | 10/2015 | Duggal |
| 2016/0062763 | A1 | 3/2016 | Duggal |
| 2017/0003950 | A1 * | 1/2017 | Newell ............... G06F 8/65 |
| 2017/0012898 | A1 * | 1/2017 | Zhu ................... H04L 12/6418 |
| 2017/0212733 | A1 | 7/2017 | Duggal |
| 2018/0191581 | A1 * | 7/2018 | Yu .................... G06F 9/45558 |

OTHER PUBLICATIONS

Autili et al., "Service Lifecycle Management", Apr. 2008, European Commission, Information Society and Media, 46 pages (Year: 2008).*

Andrew Mayer et al., "The Third Network: Lifecycle Service Orchestration Vision" 2015, MEF, The Metro Ethernet Forum 2015, 18 pages (Year: 2015).*

Andreessen, Marc, "Why Software is Eating the World," The Wall Street Journal, Aug. 20, 2011 [retrieved online at http://www.aberdeeninvestment.com/wp-content/uploads/2009/11/Why-Software-Is-Eating-The-World-8-20-111.pdf on Aug. 2, 2017].

Aruba Networks, Inc., "Aruba Networks Government Solutions Guide," Apr. 2014 [retrieved from https://www.arubanetworks.com/pdf/solutions/SG_Secure-Network-Access.pdf].

Foote, Brian et al., "Big Ball of Mud," Jun. 26, 1999 [retrieved online at http://www.laputan.org/pub/foote/mud.pdf on Aug. 2, 2017].

Mitrovic, Dejan, "Intelligent Multiagent Systems based on Distributed Non-Axiomatic Reasoning," Thesis from University of Novi Sad, Serbia, 2015.

Savkin, Victor, "Data Context Interaction: The Evolution of the Object Oriented Paradigm," Aug. 30, 2012 [retrieved from https://www.sitepoint.com/dci-the-evolution-of-the-object-oriented-paradigm].

Van De Sompel, Herbert, et al., "Reminiscing About 15 Years of Interoperability Efforts," D-Lib Magazine, vol. 21, No. 11/12, Nov. 2015.

International Application No. PCT/US2017/031622, International Search Report and Written Opinion dated Jul. 19, 2017.

U.S. Appl. No. 61/149,179, filed Feb. 2, 2009.
U.S. Appl. No. 61/612,907, filed Mar. 19, 2012.
U.S. Appl. No. 62/287,201, filed Jan. 26, 2016.

* cited by examiner

SYSTEMS AND METHODS FOR DOMAIN-DRIVEN DESIGN AND EXECUTION OF METAMODELS

CROSS-REFERENCE TO RELATED APPLICATIONS

The present application claims the benefit of U.S. Provisional Patent Application Ser. No. 62/568,226, filed Oct. 4, 2017 and entitled "Domain-Driven Design and Execution of Metamodel in Telecommunications," and is a continuation-in-part of U.S. patent application Ser. No. 15/589,864, filed May 8, 2017 and entitled "Systems and Methods for Domain-Driven Design and Execution of Modular and Dynamic Services, Applications and Processes," which claims the benefit of U.S. Provisional Patent Application Ser. No. 62/332,898, filed May 6, 2016 and entitled "Model-Based Application Development." In addition, the present application is related to U.S. patent application Ser. No. 15/417,122, filed Jan. 26, 2017 and entitled "Unified Operating System for Distributed Computing," now U.S. Pat. No. 9,841,955, which claims the benefit of U.S. Provisional Patent Application Ser. No. 62/287,201, filed Jan. 26, 2016 and entitled "Unified Operating System for Distributed Computing." All of the foregoing applications are hereby incorporated by reference herein.

Aspects of the current disclosure are related to U.S. Nonprovisional patent application Ser. No. 14/936,020, filed Nov. 9, 2015, which is a continuation of U.S. Nonprovisional patent application Ser. No. 14/022,033, filed Sep. 9, 2013, now U.S. Pat. No. 9,182,977 issued Nov. 10, 2015, which is a continuation of U.S. Nonprovisional patent application Ser. No. 12/698,361, filed 2 Feb. 2, 2010, now U.S. Pat. No. 8,533,675 issued Sep. 10, 2013, which claims the benefit of U.S. Provisional Patent Application Ser. No. 61/149,179, filed Feb. 2, 2009, each of which is incorporated herein by reference.

TECHNICAL FIELD

The disclosure relates generally to a dynamic language for declaratively modeling objects using domain concepts, types and policies, and the systems and methods of interpreting that language to process the objects (e.g., configure, control, implement) and realizing them as contextually motivated services.

DESCRIPTION OF RELATED ART

The work of organizations is typically implemented in formal and informal processes that organize the use of its resources (e.g., people, information, capabilities, infrastructure, assets, or the like) to deliver value. These processes may lead to a series of discrete tasks that must be executed by individuals or systems (note: "systems" is used here in the general form, not a specific technology and not even necessarily a technology). However, given interdependencies between tasks, individuals or systems working in isolation are prone to return suboptimal outputs if they may not efficiently coordinate with other people and other systems to share relevant resources and communicate relevant changes on a timely basis.

Task outputs may not be responsive to relevant external events if their operations are statically defined in advance, which materially constrains the exploitation of contextually relevant resources or limits context to pre-defined parameterization. Likewise, the overall process may not be responsive to relevant external events if it is connected in a rigid flow pattern which materially constrains the exploitation of contextually relevant resources or limits context to pre-defined parameterization, limiting the responsiveness of the process. In effect, such siloed process tasks and flows are optimized for a fixed pre-established context, which is inherently procedural and unable to naturally leverage contextually relevant resources from the broader domain.

Malone's "Coordination Theory," which is a general academic theory, studied interdependencies between process tasks and their management to explore more flexible and responsive patterns of interaction. In Computer Science, Coordination is studied in multiple areas including Autonomics, Multi-Agent Systems, Transition Systems, etc. and is associated with Actor Theory, Blackboards, Choreography, Dataflow, etc. The most prominent academic byproduct of this research was Linda and Linda-like systems, which implement some of these concepts. However, this class of software never achieved mainstream status as commercial products.

The software industry remains generally bound to static, linear processes and orchestration, which is typically based on the Business Process Execution Language, BPEL, an Object Management Group (i.e., OMG) standard or conceptually related domain-specific approaches (e.g., OpenStack HEAT), which were adopted by the vendor community over alternative proposals, such as the Choreography Description Language (i.e., CDL), which were subsequently abandoned. BPEL is often expressed using Business Process Modeling Notation (BPMN) and complimented with other OMG standards, Decision Modeling Notation (DMN), Case Management Modeling Notation (CMMN), and the emerging Value Domain Modeling Language (VDML), which are all implemented as separate software components intended to add capabilities. However, they each represent discrete modeling notations with specific software implementations and versions, that are related, but differences in modeling semantics and implementations lead to incomplete and imperfect mappings between the components, which constrain expressivity. In addition, the component-based approach also suggests multiple libraries and run-time engines to process the models leading to a manually-integrated and tightly-coupled middleware component stack, which is collectively hard to change and brittle; as secure, performant, scalable and resilient as the least secure, performant, scalable and resilient component.

In real-world deployments, these stacks are often extended by one or more rules engines, databases, enterprise service buses, complex event processors, etc. Additional components compound the accidental complexity, further constraining the overall solution architecture, and further limiting its support for the type of flexible and responsive interactions patterns suggested by Coordination Theory.

The primary alternative to BPEL-based or the like process modeling is custom software development using advanced languages and frameworks such as Erlang and Spring. While these languages support highly-dynamic and distributed processes, each one is itself a hard-coded development effort and all of the interdependencies are coded in advance, which does not have the same conceptual potential of models for flexibility, extensibility and adaptability.

In 1999 an academic paper titled "The Big Ball of Mud" exposed fundamental limitations of "modern" software development practices. Such papers reflect the tension between theory and applied science.

While "software is eating the world," software headaches (See www.wsj.com/articles/SB10001424053111903480904576512250915629460) are compounding as old practices may not support today's new requirements; they appear ill-suited for our increasingly dynamic, diverse and distributed age.

Value-chains are becoming increasingly complex orchestrations across multiple silos, partners, technologies and standards. As a result, a software application is no longer a single thing, but rather a composite built from internal, third party and public elements (e.g., Web-services, REST APIs, Microservices, atomic functions, systems, databases, devices), which are natively loosely-coupled. Application behavior is now dependent on the sum of interactions between participating elements. Manually-integrating these elements into services, applications and processes creates tightly-coupled, static and brittle solutions, which are in-turn dependent on tightly-coupled, static and brittle middleware component stacks. "The Big Ball of Mud" is growing exponentially in a tangle of connections that now spans beyond organizational boundaries.

As organizations hurdle towards becoming digital businesses, they expect more of their software; pushing boundaries and exposing weaknesses. The limitation of conventional modeling tools and software development practices is becoming more widely perceived as they are holding back the next wave of productivity and connectedness. The challenge is to connect elements for meaningful behavior without resorting to static, non-responsive and brittle methods.

Without efficient, timely coordination, distributed organizations risk becoming increasingly fragmented.

SUMMARY

Various embodiments of the present disclosure include systems, methods, and non-transitory computer readable media configured to receive an order, the order indicating a network service model. A context of the order is identified. A deployment plan is generated using the network service model, the deployment plan facilitating an instantiation of a contextually-motivated network service instance as a set of normalized lifecycle management (LCM) operations performed against each of a plurality of associated service entities. The deployment plan is deployed, the deploying including binding each of the normalized LCM operations, based on the context of the order, to one or more respective micro-capabilities, each of the respective micro-capabilities having previously been onboarded to the system as one or more corresponding modeled objects capable of being declaratively composed, each of the corresponding modeled objects including a mapping of object properties, object behaviors, and standard LCM operations to one or more existing micro-capabilities of the system. The deploying also including managing execution of the one or more respective micro-capabilities and associated resources, associated storage, and associated network and service allocation and configuration, to instantiate the contextually-motivated network service instance.

In some embodiments, the network service model comprises a plurality of virtual network functions (VNFs) managed as service entities of the system, the network service model including network information for connecting one or more of the service entities of the system to one or more other service entities of the service entities of the system.

In some embodiments, the order comprises a product order, the product order being a particular type of event that is evaluated based on the context.

In some embodiments, the systems, methods, and non-transitory computer readable media are configured to request a list of billing packages, thereby allowing the billing packages to be referenced as part of the network service model.

In some embodiments, the respective micro-capabilities comprise one or more billing policies.

In some embodiments, to deploy the deployment causes the the systems, methods, and non-transitory computer readable media to map and transform the billing policies into executable objects.

In some embodiments, any of the micro-capabilities and the associated resources, the associated storage, and the associated network and service allocation and configuration are performed by any of the system and one or more federated controllers.

In some embodiments, the one or more federated controllers include any of one or more Virtual Network Function Managers (VNFMs), and one or more Network Function Virtualization Orchestrator (NFVOs), and one or more Software Defined Networking Controllers (SDN Controllers).

In some embodiments, the order is received from an associated system through an Representational State Transfer (REST) Application Programming Interface (API).

In some embodiments, the order comprises an order for a Virtual Customer Premises Equipment (vCPE).

In some embodiments, the systems, methods, and non-transitory computer readable media are configured to determine, based on the network service model, deployment information one or more service entities, the deployment information including chaining requirements, VNF packages, and one or more connected policies.

In some embodiments, the one or more connected policies include one or more service license agreements (SLAs) related to system performance.

In some embodiments, the systems, methods, and non-transitory computer readable media are configured to detect one or more events associated with any of the network service instance or one or more other network service instances; correlate the one or more events against a set of SLAs, the set of SLAs including at least the one or more SLAs related to performance; determine one or more of the SLAs to be in violation; identify one or more required LCM operations for each of the one or more SLAs determined to be in violation; and bind each of the LCM operations, based on the context of a connected network service instance, to one or more micro-capabilities to bring each of the one or more SLAs determined to be in violation back into compliance.

In some embodiments, the one or more events include any of one or more alerts or state changes in any of the network service instance or the one or more other network service instances.

In some embodiments, the one or more required LCM operations include one or more scaling operations.

In some embodiments, to manage the execution of the one or more micro-capabilities causes the systems, methods, and non-transitory computer readable media to fulfill the order as a transaction providing guarantees, and applying any of compensations and rollback automatically.

A claimed solution rooted in computer technology overcomes problems specifically arising in the realm of computer technology. In various embodiments, a context of one or more interactions is determined. Two or more base objects are transformed into two or more interpreted objects by interpreting the two or more base objects based on evaluation of the context, and by resolving references of the two or more base objects relative to domain model types and concepts, each of the two or more base objects modeled using a same declarative modeling language, the same declarative modeling language enabling transitions between the two or more interpreted objects, at least one of the two or more interpreted objects including at least one post-condition, the at least one post-condition providing hooks for transition policies which allow the at least one of the two or more interpreted objects to be logically chained in a non-linear process. Transitioning between at least two of the two or more interpreted objects by chaining the at least two of the two or more interpreted objects based on a particular post-condition of a particular interpreted object of the at least two of the two or more interpreted objects to create at least a portion of a particular non-linear process. At least a portion of the particular non-linear process is executed.

In some embodiments, the one or more interactions include a real-time system request.

In some embodiments, the post-conditions provide hooks for one or more of the two or more interpreted objects to subscribe to interactions associated with a particular interpreted object.

In some embodiments, the at least two of the two or more interpreted objects are chained based on conditional policy-based interactions in a Publish-Subscribe style pattern.

In some embodiments, the at least two of the two or more interpreted objects are chained based on conditional policy-based links in a Hypermedia As The Engine Of Application State style pattern.

In some embodiments, the at least one pre-condition and the at least one post-condition are inherited from software contracts of the base objects. In related embodiments, the software contracts specify non-functional concerns, wrapping at least one of the two or more interpreted objects with centralized policies, thereby enabling common management of heterogeneous objects. In related embodiments, the centralized policies include security controls, the security controls comprising any of role-based access controls, license keys, certifications and authorizations. In related embodiments, the centralized policies include system controls, the system controls comprising state management controls.

In some embodiments, the at least one of the two or more interpreted objects include at least one pre-condition.

In some embodiments, the at least one pre-condition provides hooks for permissions which support configuration and enforcement of security and identity policies.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1:
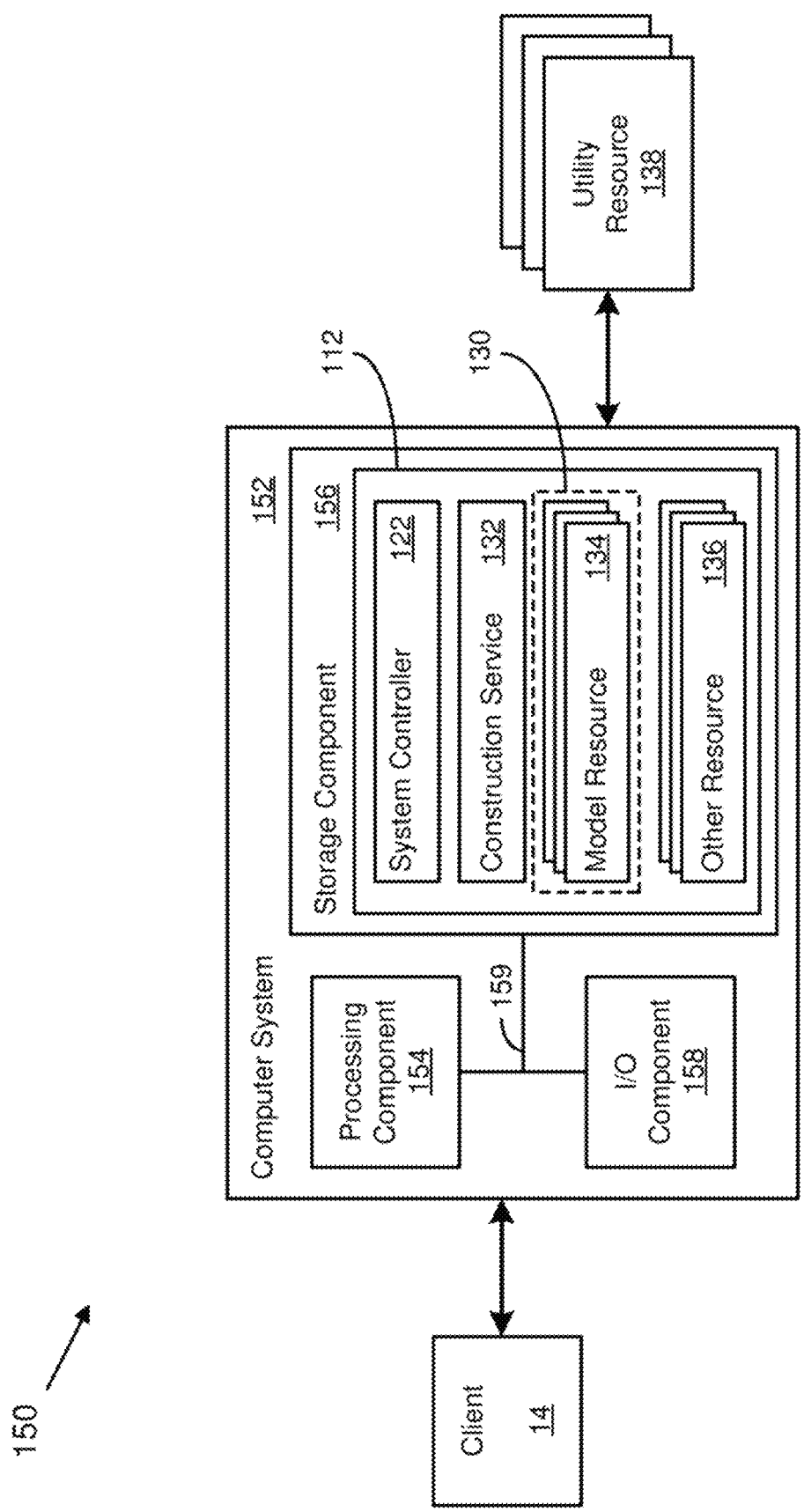
FIG. 1 depicts a diagram of an example of a system for interpreting, configuring and controlling objects (e.g., graph objects) according to some embodiments.

In various embodiments, a computing system platform (or, simply, "system" or "platform") enables declarative modeling of complex distributed domains and the use of domain metadata and/or metrics to configure and/or control dynamic dataflow processes and/or real-time state to optimize dynamic dataflow processes. The domain model may provide shared concepts and types that represent an extensible set of semantically-related building blocks that may be shared across processes for integrated operations. In one example, the domain model performs like an application fabric or metadata backplane that may allow tasks to coordinate across business silos, layers of Information Technology, administrative domains, organizational boundaries and industry standards. The domain model may also connect across deployment models (e.g., server, virtual machine or container-based processes) and devices and machines (e.g., Internet-of-Things).

Dynamic languages are, by definition, interpreted, rather than compiled languages, which allows for run-time evaluation of conditions, though the scope may vary by language. Some embodiments described herein, raise scope to an arbitrarily defined domain of shared concepts and types, with a common object data store for persistence. At least some of the systems and methods describe herein provide highly-efficient processing of live metadata and state, which allows for highly-dynamic domain-driven, compute and I/O intensive applications, which supports the real-time interpretation of complex objects. The context of interactions may be interpreted in real-time. Context may include the current state of one or more elements, whether they are reflecting on state of solution elements (direct through interfaces or indirect through monitoring tools or probes) during processing or "looking-up" state of one or more referenced system objects. Context may also include querying past state of one or more system objects for comparison, change history, audit or analytical purposes, etc. Further, context may include the sum of correlating the state of two or more elements or objects.

In some embodiments, the platform provides a single notation and/or run-time for declaratively modeling complex ontologies, objects, services/apps, processes, policies and communications. This may provide a unified toolchain for architects, solution developers and technical staff. This may, for example, ensure, within the domain, nothing is lost in translation—"What you model is what you get." In this example, from a Functional Programming perspective, the platform is side-effect free.

In some embodiments, fully declarative modeling and fully dynamic execution means the platform separates models from implementations, which allows business logic to be represented by "intent-based" interfaces without having to consider underlying technical complexity or hard-coding their choices, rather they rely on the execution environment to implement behavior. Models may include reflective policies, which may prompt an evaluation of run-time state for a modern implementation of complex events and autonomic processes.

Loose-coupling of declaratively modeled objects may ensure all processes are goal-oriented, event-based, domain-driven and policy-controlled for rich enterprise-class processes based on an asynchronous interaction pattern, which may be highly-scalable, available and resilient.

In various embodiments, a system agent handles interactions (e.g., human and/or system requests, as well as schedule, timed and ad-hoc events), using in-band metadata to translate policies back to specific domain concepts and types, which align business semantics to implementations. In some embodiments, the agent functions as a mediator, which may be implemented as a Representational State Transfer (REST) Intermediary, to render a late-binding service, and to enable pervasive loose-coupling of all system objects and universal separation of concerns.

The agent may decouple models from implementations, thereby enabling declarative modeling of highly-connected and dynamic dataflow processes. The agent may decouple consumers and providers for interoperability and evolution (e.g., connected solution elements, actors, applications and interface standards may evolve independent of each other for non-disruptive forward migration). The agent may decouple state from process by providing a backing service for persistence.

FIG. 1 depicts a diagram of an example of a system 100 for interpreting, configuring and controlling objects (e.g., interpreted objects) according to some embodiments. In the example of FIG. 1, the model resources 134 represent an application, which is executing in an environment in order to perform an activity according to an embodiment. To this extent, the environment 150 includes a computer system 152 that may perform a process described herein in order to manage the model resources 134 representing the application and other resources 136.

The computer system 152 is shown including a processing component 154 (e.g., one or more processors), a storage component 156 (e.g., a storage hierarchy), an input/output (I/O) component 158 (e.g., one or more I/O interfaces and/or devices), and a communications pathway 159. In general, the processing component 154 executes program code, such as a system controller 122 of the modeling application and/or representations of one or more resources of the application, which is at least partially fixed in the storage component 156. The storage component 156 may include at least one non-transitive computer readable medium (e.g., hard drive, optical disk, flash memory, and/or the like).

While executing program code, the processing component 154 may process data, which may result in reading and/or writing transformed data from/to the storage component 156 and/or the I/O component 158. The pathway 159 provides a communications link between each of the components in the computer system 152. The I/O component 158 may comprise one or more human I/O devices, which enable a human client 14 to interact with the computer system 152 and/or one or more communications devices to enable a system client 14 to communicate with the computer system 152 using any type of communications link. To this extent, the computer system 152 may manage a set of interfaces (e.g., graphical user interface(s), application program interface, and/or the like) that enable human and/or system clients 14 to interact with the application via the modeling application. Furthermore, the modeling application may manage (e.g., store, retrieve, create, manipulate, organize, present, or the like) data, such as one or more of the model resources of the application or other resources 136, using any data management solution.

The computer system 152 may be any digital device and may include any number of digital devices. A digital device is any device with at least one processor and memory.

The computer system 152 may comprise one or more general purpose computing articles of manufacture (e.g., computing devices) capable of executing program code, such as the system controller 122 of the modeling application, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the modeling application may be embodied as any combination of system software and/or application software.

As used herein, the term "component" means any configuration of hardware, with or without software, which implements the functionality described in conjunction therewith using any solution. The term "module" means program code that enables a computer system 152 to implement the functionality described in conjunction therewith using any solution, and refers to the system controller 122 and program artifacts of the resources of the application. When fixed in a storage component 156 of a computer system 152 that includes a processing component 154, a module is a substantial portion of a component that implements the functionality. Regardless, it is understood that two or more components, modules, and/or systems may share some/all of their respective hardware and/or software. Furthermore, it is understood that some of the functionality discussed herein may not be implemented or additional functionality may be included as part of the computer system 152.

When the computer system 152 comprises multiple computing devices, each computing device may have only a portion of the modeling application and/or the application fixed thereon (e.g., one or more resources of the application). However, it is understood that the computer system 152 and the modeling application are only representative of various possible equivalent computer systems that may perform a process described herein. To this extent, in other embodiments, the functionality provided by the computer system 152 and the modeling application may be at least partially implemented by one or more computing devices that include any combination of general and/or specific purpose hardware with or without program code. In each embodiment, the hardware and program code, if included, may be created using standard engineering and programming techniques, respectively.

Regardless, when the computer system 152 includes multiple computing devices, the computing devices may communicate over any type of communications link. Furthermore, while performing a process described herein, the computer system 152 may communicate with one or more other computer systems using any type of communications link. In either case, the communications link may comprise any combination of various types of wired and/or wireless links, comprise any combination of one or more types of networks, and/or utilize any combination of various types of transmission techniques and protocols. In an embodiment, the computer system 152 comprises an application server, which communicates with clients 14 over the Internet.

As discussed herein, the application may be represented by model resources 134. Additionally, the computer system 152 (e.g., by executing the modeling application) may provide dynamic design, use, and modification of the model resources 134 representing the application using a declarative application meta-model that provides for self-modification. To this extent, the computer system 152 may enable continuous real-time testing, simulation, deployment, and modification of the model resources 134 representing the application as described herein.

Execution of the application may result in the generation of one or more other resources 136. The other resources 136 may be utilized along with the model resources 134, to enable the computer system 152 to execute a set of actions used by the application to perform an activity. One or more of the resources of the application may be separately developed and/or implemented remote from other portions of the application. For example, a set of utility resources 138 are shown implemented remote from the application. However, it is understood that any resources of the application, such as one or more of the model resources 134, also may be separately developed and/or implemented. Furthermore, it is understood that the environment may include a mix of model resources 134 that are part of the application 130 and remote from the application.

As described herein, a model resource 134 may represent an entity, a function, and/or the like. The model resources 134 may include one or more sets of related models, each of which may represent a complex entity, a complex function, and/or the like. A set of related models may be expressed using a set of declarative relations, which may be defined using any solution, and stored as model resources 134 of the application using any solution. For example, a declarative relation may be defined using a uniform resource identifier (URI), a metadata reference, and/or the like.

In an embodiment, the environment 150 is a modeling environment providing dynamic design, use, and modification of the model resources 134 of the application using a declarative application meta-model that provides for self-modification and the client 14 is a user using the application executing in the modeling environment to perform continuous real-time testing, simulation, deployment, and/or modification of the model resources 134 of the application. In this case, the activities that the user may perform using the application may include dynamically modifying one or more aspects of the software application in the runtime environment.

A software application, by being processed by an intermediary component, may manage an application layer, which enables a user 14 to use the software application to perform one or more activities, each of which is defined using a set of model resources 134 of the software application.

As used herein, it is understood that the term "activity" may mean a set of atomic operations to accomplish a goal (e.g., form a complete business/technical process). The goal may be set when the activity is initiated (e.g., when a request, such as an HTTP request, is received from a user 14), but the specific atomic operation(s) performed by executing the application to accomplish the goal may vary based on the context information corresponding to each instance of an activity to which the software application is directed. A group of related atomic operations (e.g., a compound operation) is referred to herein as a "task" (e.g., a process fragment). A task is a discrete fragment of an activity that fulfills a defined objective in furtherance of the goal (e.g., complete a form, review a form, submit a form, modify a form, and/or the like). Similar to an activity, the objective of the task is set when the activity is initiated, but the specific atomic operation(s) performed by executing the application to accomplish the goal may vary based on the context information corresponding to the activity. It is understood that some atomic operations and/or tasks may be performed as standalone operations (e.g., report generation, basic navigation), apart from a larger task or activity. In this case, the atomic operation is a task and activity in itself or the task is an activity in itself.

An "end user activity" is a type of activity performed by the user 14 using the application in its intended manner to accomplish a goal. For example, if the application manages an end user interface that provides a word processor user interface, the end user activities include those activities performed by the user 14 that utilize the word processor to create a document. Furthermore, the end user activities may include those activities performed by the user 14 that customize one or more attributes of the word processor user interface according to the preferences of the user 14 (e.g., by modifying a setting exposed to the user 14 or by default attributes for the document), including a "plug-in" component to provide expanded functionality, and/or the like. In an embodiment, end user activities of the application include one or more development activities.

A "development activity" is an activity performed by the user 14 using the application, which changes one or more attributes of a set of changeable resources of the application. The changeable resources may include model resources 134 that define at least a portion of an application model, which is applied by the application to perform one or more activities. To this extent, a development activity may comprise an activity historically performed by a programmer, a designer, and/or the like, in a software development environment. However, a development interface managed by the application may enable a user 14 to perform the development activity in the environment. The development interface may manage any combination of various types of development tools for use by the user 14, such as a modeling environment (e.g., a declarative modeling environment), an integrated development environment, and/or the like. In this manner, the environment may provide dynamic design, use, and modification of the application represented by a collection of models (as embodied in the model resources 134) using a declarative application meta-model that provides for self-modification, and may enable continuous real-time testing, simulation, deployment, and modification of the application represented by the collection of models. In an embodiment, the changeable resources of the application are immutable (static). In this case, a change to a changeable resource results in a new version of the changeable resource being created, which is linked in place of the previous version. The use of immutable resources may provide an ability for the application to provide an auditable history of changes, rollback a change, and/or the like.

Resources of the application (or representations thereof) may be processed by an intermediary component. The resources may include a set of changeable resources and a set of static resources. A changeable resource in the set of changeable resources may comprise a resource that is capable of being dynamically modified by the user 14. In an embodiment, a change to a changeable resource, such as a model resource 134, does not require any compilation to take effect in the application.

A static resource in the set of static resources may comprise a resource that is not capable of being dynamically modified by the user 14. In an embodiment, the set of changeable resources includes a first subset of the model resources 134 and static resources includes a second subset of the model resources 134. It will be appreciated that this is only illustrative, and an embodiment of the environment may include no static resources, no changeable resources, and/or the like. Furthermore, while the construction service resource 132 and the system controller 122 may be resources, these resources 132, 122 may not be changeable by the user 14.

When the set of changeable resources may include one or more model resources 134 and/or relation information (e.g., declarative relations) for a set of related models, the user 14 may modify a configuration of the software application while an instance of the software application is executing by modifying a configuration of one or more of the model resources 134 and/or relation information. Such a modification may result in an immediate modification to the configuration of the software application (e.g., when the model resources 134 and/or relation information are stored as non-compiled information). Additionally, the modification may have any applicable scope. For example, the modification may modify a configuration of an instance of the modified changeable resource(s) for the user 14, a configuration of the modified changeable resource(s) for use in subsequent instances and/or of the changeable resource(s), and/or the like. In this manner, the software application may support local variance, global change, and/or the like, and may enable continuous real-time testing, simulation, deployment, and modification of the models and set(s) of related models representing the software application.

Each resource representing the software application (e.g., each model resource 134) may have a set of properties. To this extent, when the resource is a changeable resource, one or more properties of the changeable resource may be modified by the user 14 while the software application is executing. Furthermore, when a model resource 134 is included in a set of related models, each model in the set of related models may be capable of configuring one or more of a set of properties of the set of related models. In this case, collective properties of the set of related models (e.g., a complex entity, a complex function, and/or the like) may emerge dynamically from interaction of the set of related models (e.g., in real-time during execution of the software application). In this manner, the software application may have a set of dynamically emergent properties, which are inherited from the collective properties of the interaction of the set(s) of related models representing the software application.

An ability of a user 14 to modify one or more resources of the software application may be provided by a set of models of modification controls, which are included in the model resources 134 of the software application. To this extent, the user 14 may be restricted from modifying a static resource in the set of static resources and/or allowed be make modifications to a changeable resource in the set of changeable resources based on the set of models of modification controls. The set of models of modification controls may enable the user 14 to make modifications of any scope (e.g., local variance, global change, and/or the like) to a changeable resource. It is understood that the set of models of modification controls may enable/disable an ability to modify one or more resources differently for multiple users. To this extent, whether a resource of the software application is a changeable resource or a static resource may depend on the user 14. Furthermore, the set of models of modification controls may be resources (e.g., model resources 134) of the software application, and themselves may be changeable resources for one or more users 14 of the software application. In this case, any restrictions on an ability of a user 14 to modify a resource is not an inherent limitation of the software application, but rather is a purposeful limitation based on the goals of the software application, which may be modified.

An intermediary component may be configured to process each interaction request made by the user 14 as part of an activity (development or end user). In a more particular embodiment, the intermediary component is a generic component, which may be used to execute multiple applications configured to perform activities of any type. The model resources 134 of the software application may define the logic of how the software application performs each activity. To this extent, the intermediary component may operate in a context-independent manner without including or relying on any run-time logic or data specific to the particular application (e.g., the activities performed using the application) on which the intermediary component is operating. In this case, such logic and/or data of the application are defined within the set of changeable resources and/or a set of static resources.

In a more particular illustrative embodiment, the intermediary component comprises the system controller 122 and the construction service 132. In this case, the system controller 122 may receive each request generated by a user 14 and perform pre-processing of the request. As part of processing the request, the system controller 122 may instantiate a container for processing the request, and request a representation of the construction service resource 132 for execution in the container. The construction service resource 132 may further process the request within the container. To this extent, for every atomic operation performed by the application, an instance or representation of the same system controller 122 and construction service resource 132 may be used to process the request. The processing of each atomic operation by the construction service resource 132 may include obtaining an instance of a resource identified in the request, such as a changeable resource or a static resource, and processing the logic included in the instance of the resource.

By obtaining, in response to receiving a request, an instance of a resource identified in the request, and instances of any other resources required to complete the request, the intermediary component binds the resource(s) of the application in real-time to dynamically construct an implementation of the resource. The intermediary component may bind the resource in real-time for every interaction with the resource (e.g., each request requiring the resource). To this extent, any model resource(s) required to complete the request bind in real-time when processing the request. When the application includes a set of models of modification controls, these models also may bind in real-time. As a result, the application may support customization, personalization, machine-learning (e.g., automated change management), and/or the like.

The application logic may be defined by the application resources (e.g., assets such as models, code, data, policies, and/or the like). In an embodiment, each of the application resources is stateless. That is, each execution of an application resource may be performed using resources obtained during the execution. The execution may be in the form of processing representations of the resources, consistent with REST constraints (e.g., stateless 'read' of the system resources) and any state changes may be managed by creating new resource(s) consistent with the principles of immutability (e.g., a stateless 'write' of a new resource back to the system), thereby providing an overall 'stateless' property for the system. By processing representations of the resources, a resource (e.g., model) is separated from implementation and the execution may perform non-blocking reads and writes while managing contention. The logic may be defined in a manner that preserves a loose-coupling between the stateless application resources (e.g., by associating the resources with one another using a set of declarative relations for a model resource 134). The association may be made directly, such as with explicit identifiers (e.g., Universal Resource Identifiers or URIs or 'links') and/or indirectly such as with metadata references that may be resolved by the intermediary component at run-time based on a context for the corresponding request and/or activity. Furthermore, the logic may be stored in a manner that does not require compilation to effect any changes. In this manner, a change to the application logic (e.g., one or more model resources 134) may be made immediately available.

By enabling the application, and the system as a whole, to be defined in a loosely-coupled fashion, the application may provide a dynamic software application framework having many desirable properties (e.g., reflection, under-specification, late-binding, and/or lazy evaluation), and may promote many advantages related to operational responsiveness (e.g., dynamic payload customization based on context and more efficient application development and change management capabilities) and development productivity (e.g., optimal re-use of resources, more efficient application development and change management capabilities).

During execution of the application, the intermediary component may receive interaction requests generated by the user 14. An interaction request may request that the application perform a corresponding activity, and may include a reference to one or more of the resources. In response, the intermediary component may dynamically configure each atomic operation for the activity based on its context, and dynamically determine a process flow for performing the activity based on the activity context at the conclusion of each atomic operation, for the entire lifecycle of the activity. The atomic operation of the framework for the application may be an individual system interaction that is performed by the intermediary component by calling a single resource (e.g., a model resource 134). In this case, the intermediary component comprises an agent acting between the user 14 requesting an atomic operation and the resource(s) configured to perform the atomic operation per the related model. The intermediary component provides a mechanism for evaluating the request relative to activity context, customizing the deliverable (payload) for each atomic operation and directing the user 14 to the next valid interaction(s) for continuing to perform the activity based on use of context information in support of the activity. In this manner, the intermediary component mediates interactions between the user 14 and a group of loosely-coupled resources to enable the user 14 to perform an activity using the application per the related models in the resources.

Figure 2:
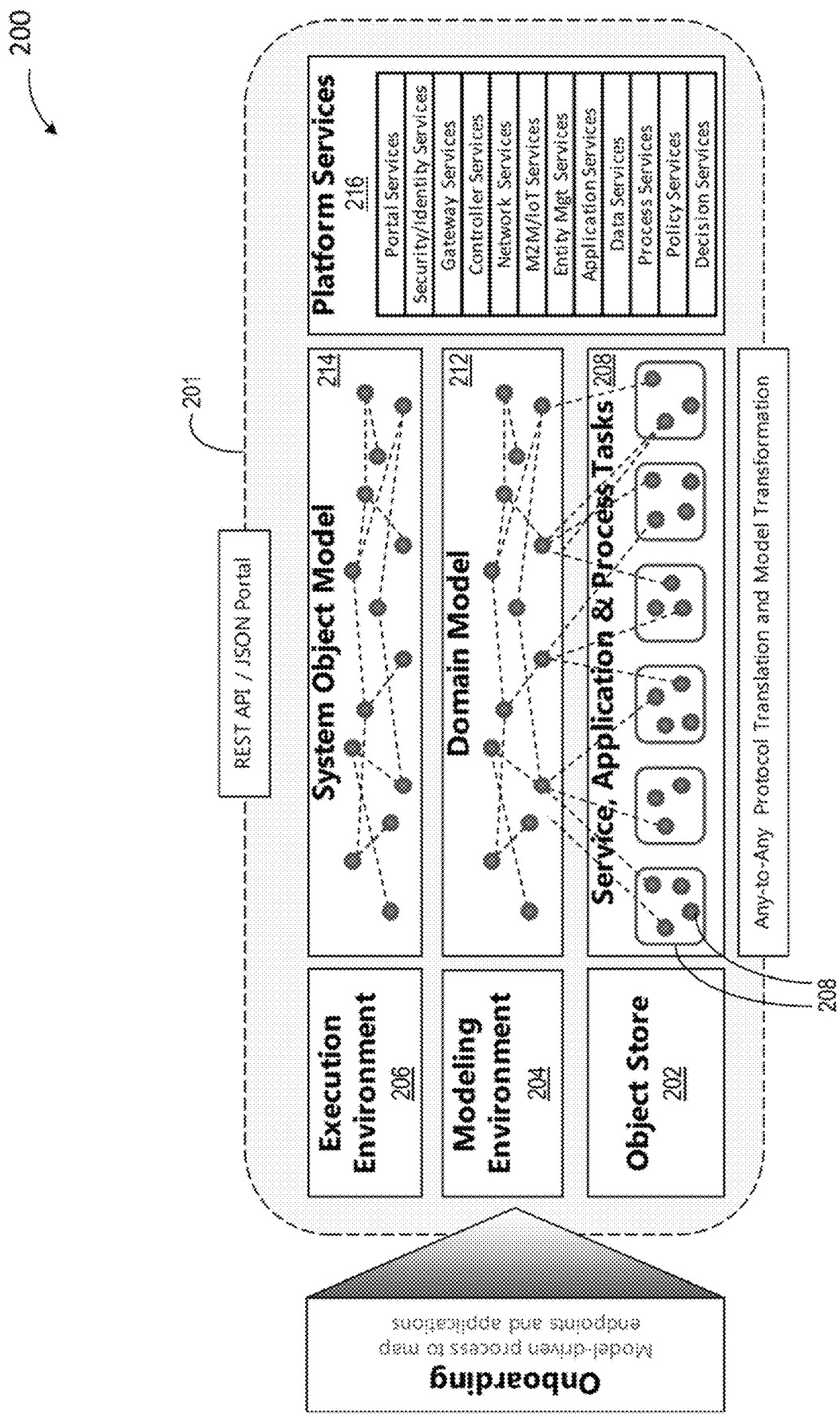
FIG. 2 depicts a diagram of an example of a system for interpreting, configuring and controlling objects (e.g., graph objects) according to some embodiments.

FIG. 2 depicts a diagram of an example of a system 200 for interpreting, configuring and controlling objects 208 (e.g., graph objects and/or other executable objects) according to some embodiments. The system 200 includes an object data store 202, a modeling environment 204, and an execution environment 206.

The object data store 202 may function to store and/or otherwise manage (e.g., create, read, update, and/or delete) objects 208 (e.g., base objects). Objects 208 may include base objects, graph objects, interpreted objects. As discussed herein, base objects may comprise a primitive with references. As also discussed herein, an interpreted object may be an interpretation of the base object. The interpreted object may be termed as a realized object or graph object. Objects 208 may be modeled using a declarative modeling language. Objects 208 may be logically connected (e.g., "linked" or "chained") to create a particular type of object 208 (e.g., a interpreted or task object). The objects 208 and the logical connections may be modeled using the same declarative modeling language.

The modeling environment 204 may function to declaratively model properties and behaviors of objects 208. The modeling environment 204 may include a domain model 212. The domain may be modeled as a set of loosely-coupled concepts and types, with conditional, policy-based, relationships to flexibly support alignment with real-world complexity of a scope of a service, application, line-of-business, enterprise, value-chain, industry, and/or the like. Modeling may be done directly within the modeling environment 204. In some embodiments, models maybe imported (e.g., RDF, OWL, or the like) from one or more other systems and/or environments.

In some embodiments, concepts are comprised of a set of business entities, with conditional, policy-based, relationships for dynamic schemas that support varied representations based on identity (e.g., role-based access control) and real-time interaction-context (e.g., a dynamic form). Business entities may be comprised by a set of properties (e.g., metadata and metrics) with conditional, policy-based, relationships.

In some embodiments, types are comprised of a set of attached implementations, with conditional, policy-based, relationships for dynamic behavior based on identity (e.g., role-based access control) and real-time interaction-context (e.g., closed-loop autonomic behavior). Implementations may reference internal libraries or a set of external services, APIs, systems, databases and devices. Conditions may represent 'decision gateways' with declarative policies, which may declare simple parameters to be completed with in-band metadata or may specify reflective policies with embedded queries, atomic functions, complex algorithms (e.g., other objects) prompting a broader evaluation of system state at run-time to dynamically generate a schema for a given context. Policies may reference internal libraries (e.g., local objects) or a set of external services, APIs and systems (e.g., remote objects).

The execution environment 206 may function to execute one or more platform services 216. In some embodiments, the platform services 216 may be represented by one or more system object models 214. In some embodiments, a declarative modeling language may be used to model objects and processes, which provides a common machine-readable design pattern for handling heterogeneous endpoints. It addresses fundamental complexity of connecting, coordinating, collaborating and controlling elements in Distributed Computing and Cyber-Physical System. This canonical approach to modeling, using metadata, links and constraints, provides a common denotational semantics for building rich, highly-modular solutions and achieving behavior from a set of independent, isolated and potentially autonomous elements. It may represent an implementation of a unified, performant and scalable approach to Abstract Rewriting Systems and Transition Systems, pursued most notably by British Computer Scientist and Turing Award winner, Robin Milner, throughout his entire academic career ending with his related work on bi-graphs.

Robin Milner is an inspiration to many contemporary programmers and visionaries, Mr. Milner once stated:

I think we are in a terrific tension between (a) finding a small set of primitives and (b) modelling the real world accurately.

We are trying, to find fundaments. We should always be open to different applications, in case they can help us focus on a better fundamental notion.

Eventually people want, or I want them to want, to be able to talk about a process in the same way that they talk about a function. That's why I'm not interested in short-term gains!

(users.sussex.ac.uk/~mfb21/interviews/milner/). Inventors herein deeply appreciate and honor the career, contributions, and life of Robin Milner.

In some embodiments, all objects 208 may be declaratively modeled using the Graph Object and Action Language (GOAL), providing a common machine-readable pattern, representing an invariant or canonical model of an object 208.

The system 200 may be reflexive in that objects 208 may be declaratively composed into higher-level services, apps and processes using the same language (in one example, everything is an object 208).

In some embodiments, the system's 200 processing of objects 208 follows a canonical microflow program. System primitives act as invariants, allowing normalized execution by the system agent in arbitrary and volatile domains.

1. The agent handles events (requests, events) for objects, processing Functional and Non-Functional Concerns. The Agent interprets Objects at run-time in a dynamic dataflow process, the canonical System microflow.
2. The agent uses live metadata and real-time state to resolve all conditions (i.e., translate policies, execute queries, functions and algorithms as specified) to define the set of applicable set of relationships to types, concepts and policies (e.g., Dynamic Type and Schema).
3. The agent executes all necessary connections and processing details of the underlying elements including license keys and certifications, protocol translations, data format transformations (e.g., bus, gateway, mediator like capabilities) to construct a 'context-aware' representation of the Object, in real-time; which personalizes user-experience, while enforcing contracts.

The aforementioned operations of the systems canonical microflow may be non-linear, and the agent may be executing a Functional Program, which may not require an ordered set of operations, rather it builds closures over its activities.

Execution supports goal-oriented, data-driven, policy-controlled parallel processing with optimistic concurrency and policy-based consistency.

In some embodiments, an agent functions as a generic, highly-efficient, performant, scalable and resilient graph processing engine, which supports modeling with the GOAL in the platform's design environment, as well as the execution environment's interpretation of GOAL-based objects.

In some embodiments, objects 208 may relate to category theory and the related processing of such objects is referred to as abstract rewriting. The abstract rewriting implements multi-paradigmatic functional, reflective and dataflow programming concepts. In this context, the object is a Monad and the agents are Monadic transformers. The agents relate to actor theory and the platform itself relates to coordination theory (generalized theory, coordinating tasks with interdependencies).

Figure 3:
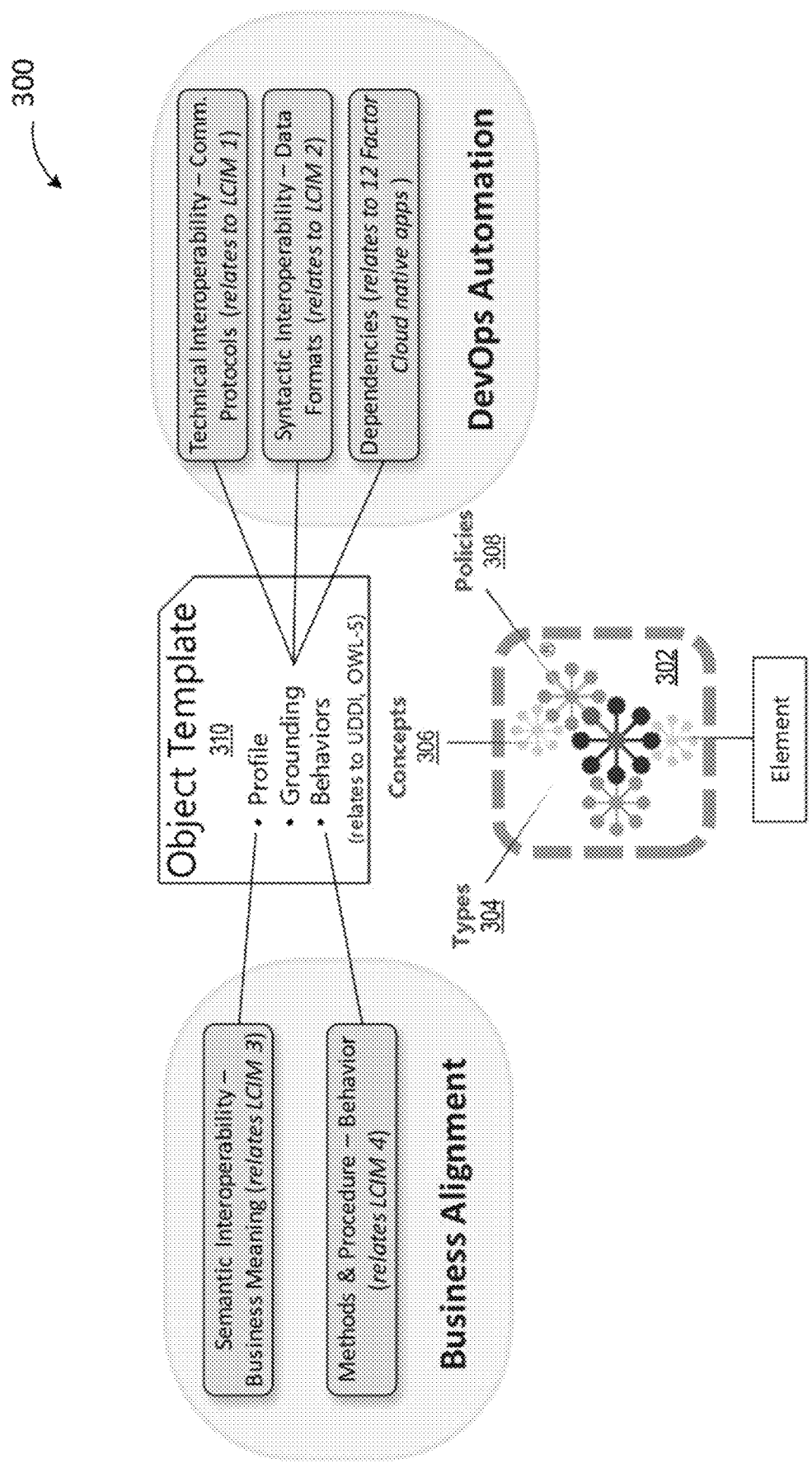
FIG. 3 depicts a diagram of an example of an object according to some embodiments.

FIG. 3 depicts a diagram 300 of an example of an object 302 (e.g., a base object 208) according to some embodiments. The object 302 includes types 304, concepts 306, and policies 308. The types 304, concepts 306, and/or policies 308 may comprise references to corresponding types, concepts, and/or policies of an ontology and/or domain model (e.g., of one or more domain models such as a domain model 212).

In some embodiments, objects 302 may be modeled using a declarative modeling language. The language may model remote endpoints (e.g., services, APIs, systems, databases, devices, or the like), on-boarded application packages, and imported files or libraries as executable objects with a graph topology. In some embodiments, a design environment (e.g., modeling environment 204) may be accessed via a REST API or JSON-based portal. The design environment may enable technical staff to map properties, behaviors, constraints and dependencies to domain concepts and types. The graph topology represents mappings as a set of conditional, policy-based relationships, which allow one-or-more implementations of an object based on prototypal, non-hierarchical, inheritance.

With GOAL, objects 302 may have a logical model that references a conceptual model of a domain (e.g., an ontology), which also describes its physical model (e.g., implementations); eliminating or reducing system overhead and supporting greater expressivity and adaptability of the system. Objects are loosely-coupled to their underlying elements, to each other and to the domain model for a complete separation of concerns and a completely metadata configurable environment.

By mapping all connected elements to a common domain model, the platform may accommodate heterogeneous interfaces with diverse formats, data protocols and support interoperability with third party components (middleware, tools, runtimes, etc.), databases, network resources and devices/machines where specified which may relax constraints to promote interoperability and allow the system boundaries to be extended in a natural manner.

Objects 302 may comprise rich entities with software contracts that specify non-functional concerns, wrapping endpoints with centralized policies for i) consistent enforcement of security/identity (e.g., role-based access control, license keys, certifications and authorizations), ii) business-compliance, iii) IT governance, and iv) system controls (e.g., state management, consistency, etc.) thereby enabling common management of heterogeneous objects (local and remote).

In some embodiments, objects 302 include pre-conditions and/or post-conditions. The pre-conditions and/or post-conditions may include one or more software contracts wrapping the object 302. Pre-conditions may provide hooks for permissions (e.g., client privileges and access mechanisms to read, write, execute an object), which may support the configuration and enforcement of security and identity policies. Post-conditions may provide hooks for other non-functional concerns, enabling the configuration and enforcement of business compliance, IT governance and system control policies.

In some embodiments, post-conditions provide hooks for users to subscribe to events on an object. The domain provides metadata and metrics for policies, which allow users to declaratively specify logic for their specific events of interest. On the occurrence of an event, the system agent executes the Object's post-conditions and publishes state changes to subscribers as per their policies, which may be used for alerts and notifications.

In some embodiments, post-conditions also provide hooks for transition policies, allowing task objects to be logically chained in non-linear processes based on conditional, policy-based, events (Pub/Sub-style) and conditional, policy-based, links (Hypermedia As The Engine Of Application State-style or HATEOAS-style pattern). Publish/Subscribe-style (Pub/Sub-style pattern) capabilities may be used to model event-based triggers to launch a new process or advance an existing process that was in a 'wait' state, while HATEOAS-style link capabilities allow modeling of acyclic process chains (infinite state machine), which supports complex exception paths. The declarative implementation of both styles allows for lightweight, loosely-coupled and asynchronous task flows.

In some embodiments, objects 302 may be persisted in an unstructured, web-style key-value system store. They are all dynamically indexed for discovery and re-use, tagged for relationships to other objects and version-controlled for lifecycle management and audit history. The metadata is available for discovery, composition, orchestration and policies. Objects 302 may each have a profile that may be viewed directly through the platform's portal, based on group security. Objects may optionally expose a public API. Objects may be declaratively composed into higher-level domains, services, applications and processes that may share the domain in order to efficiently interoperate and coordinate tasks.

The domain model-based approach may support the use of shared concepts and types as semantically-related building blocks that support rapid prototyping and simple re-configuration of solutions, enabling improved IT productivity, integrated operations and business agility. In some embodiments, the domain model provides shared concepts and types that represent an extensible set of semantically-related building blocks that may be shared across processes for integrated operations.

In some embodiments, the domain model functions like an application fabric or metadata backplane allowing for tasks to coordinate across business silos, layers of Information Technology, administrative domains, organizational boundaries and industry standards. The domain model may also connect across deployment models (e.g., server, virtual machine or container-based processes) and devices and machines (e.g., Internet-of-Things).

In some embodiments, dynamic, dataflow processes may be modeled (e.g., using the same Graph Object and Action Language (GOAL™)), as a set of loosely-coupled tasks objects (or, simply, "tasks"), with conditional, policy-based, relationships. In some embodiments, all objects 302 include pre-conditions and/or post-conditions in their software contracts. Post-conditions may enable tasks to be logically chained in a non-linear processes by conditional, policy-based, events (e.g., Pub/Sub) and conditional, policy-based, links (e.g., HATEOAS).

In some embodiments, post-conditions provide hooks for users to subscribe to events on an object. The domain provides metadata and metrics for policies, which allow users to declaratively specify logic for their specific events of interest (e.g., filters) and to configure the message they want to receive (e.g., data model) upon a relevant event. Conditions may represent 'Decision Gateways' with declarative policies, which may declare simple parameters to be completed with in-band metadata or may specify reflective policies with embedded queries, atomic functions, complex algorithms (e.g., other objects) prompting a broader evaluation of system state at run-time to define advanced subscriber rules.

In operation, the agent (e.g., in response to an event or interaction) may execute an object's post-conditions and publish state changes to subscribers as per their policies, which may be used for alerts and notifications, as well as event-based triggers to launch a new process or advance an existing process that was in a 'wait' state. This approach may provide lightweight, configurable, high-performance Complex Events using a single-notation and execution environment.

In some embodiments, task objects have an additional attribute on their contract post-conditions. For example, task objects may have an attribute for the ability to specify conditional, policy-based, links. This approach may align with the notion of Hypermedia links on the web and more formally, HATEOAS in REST-style architecture. The systems described herein may extend this further with its own implementation of linked data, which connects post-condition policies to domain metadata and metrics, which may provide the application logic for configuring and controlling dynamic dataflow processes.

In some embodiments, conditions may represent 'decision gateways' with declarative policies, which may declare simple parameters to be completed with in-band metadata or may specify reflective policies with embedded queries, atomic functions, complex algorithms (e.g., other objects 208) prompting a broader evaluation of system state at run-time to dynamically generate next recommended or directed actions. This approach may provide lightweight, configurable, asynchronous, highly-scalable hypermedia flows using a single-notation and execution environment. In some embodiments, post-condition, policy-based links may leverage the dynamic execution environment to include reflective policies that prompt evaluation of system state to optimize the flow of tasks at run-time (e.g., recommending or directing next best actions and supporting event-driven closed-loop autonomic behavior).

In some embodiments, tasks may be modeled as a set of loosely-coupled operations, with conditional, policy-based, relationships. The domain may provide metadata and metrics for policies, which provide the application logic for the task. Operations may be logically chained by conditional, policy-based, links (HATEOAS) and conditional, policy-based, events (Pub Sub) as a processing pipeline (various types). The domain provides metadata and metrics for policies, which provide the application logic for configuring and controlling the pipeline.

In some embodiments, conditions may represent 'decision gateways' with declarative policies, which may declare simple parameters to be completed with in-band metadata or may specify reflective policies with embedded queries, atomic functions, complex algorithms (e.g., other objects 208) prompting a broader evaluation of system state at run-time to dynamically optimize the behavior of an individual task (e.g., personalizing user-experiences and enforcing non-functional concerns).

In some embodiments, task types accelerate development by providing re-usable building blocks for routine modeling requirements. In addition to standard properties, task types may have attached behaviors, lower-level system objects, which represent common patterns for message exchange, coordination, enterprise application integration (EAT), workflow, data integration pipelines, DevOps automation, cloud computing, carrier virtualization and generic controllers. Task types may be nested in complex processes that support end-to-end automation from human process and mashups to service orchestration and resource provisioning. Task types may be comprehensive, providing a unified workbench for rapidly prototyping, testing, deploying, running and managing processes.

In some embodiments, objects 302 may be created with a model-driven object template 310. The object template 310 may capture a rich model of an endpoint (e.g., element) so the system may automate interoperability. Interoperability may include technical interoperability (e.g., communication protocols) and/or syntactic interoperability (e.g., data formats). The object template 310 may declare dependencies, such as code repositories, target hosts, port bindings, environment variables, middleware components, engines, run-times, databases, operating systems, and/or the like.

Figure 4:
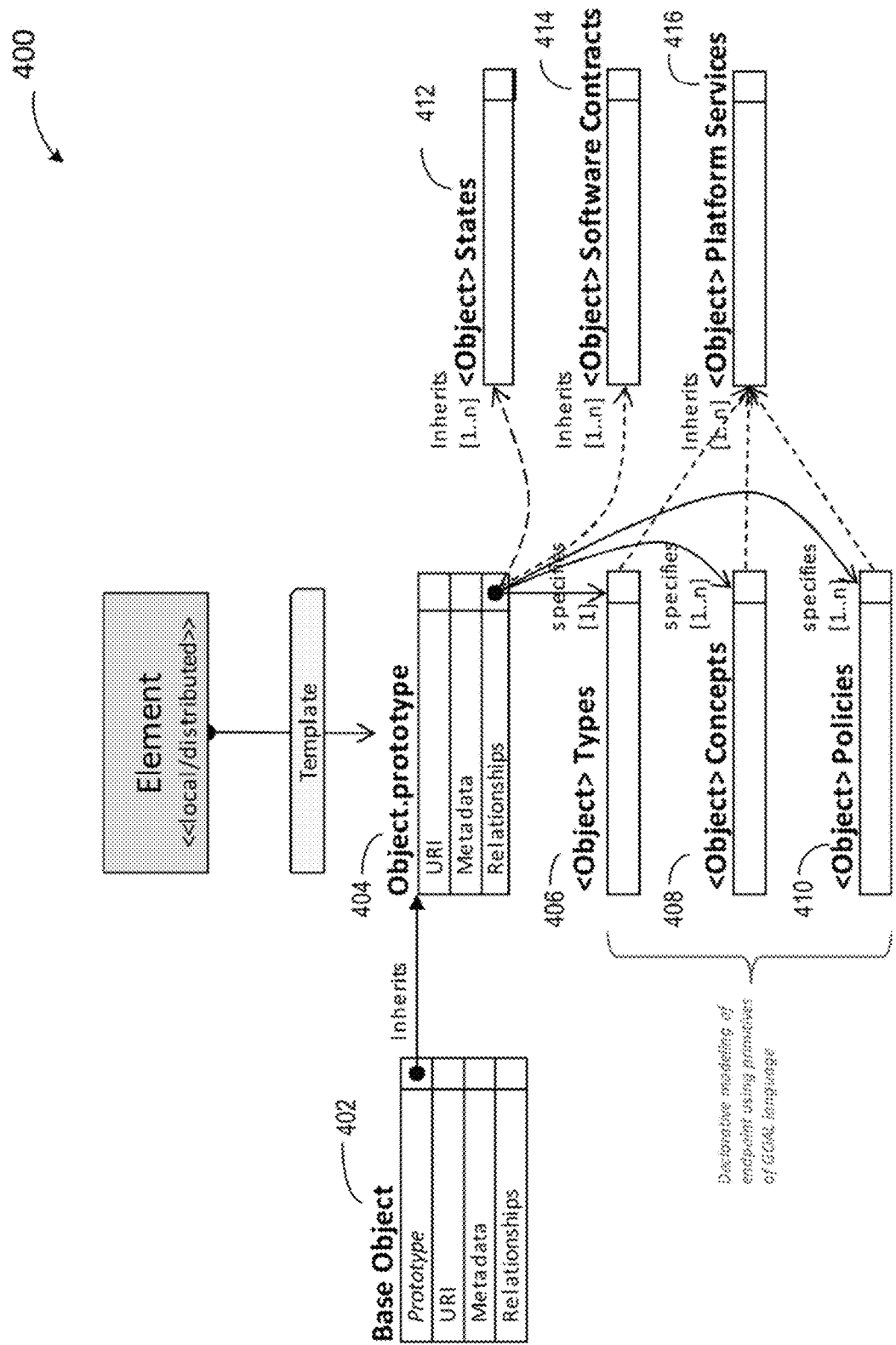
FIG. 4 depicts a diagram of an example of an object model according to some embodiments.

FIG. 4 depicts a diagram 400 of an example of an object model according to some embodiments. In some embodiments, a prototype object 404 is created and/or interpreted from a base object 402. The base object 402 may comprise set of primitives (e.g., URI, metadata, relationships, and/or the like) which may be inherited by the prototype object 404. The relationships of the prototype object 404, may include and/or reference one or more types 406, concepts 408, policies 410, states 412, software contracts 414, and/or platform services 416.

In some embodiments, software contracts 414 wrap objects which may enable consistent governance of heterogeneous and distributed endpoints and/or objects. Software contracts may wrap objects to enable centralized management of non-functional concerns (e.g., security, identity management, business compliance, IT governance, and/or the like). The software contracts may include one or more pre-conditions and/or post-conditions. For example, pre-conditions may provide hooks for permissions (e.g., client privileges and access mechanisms to read, write, execute an object), which may support the configuration and/or enforcement of security and/or identity policies. Post-conditions may provide, for example, hooks for the configuration and enforcement of business compliance, IT governance and system control policies, as well as hooks for configuration and execution of Pub/Sub policies and transition policies for task flows based on hyperlinks.

Developers may not be required to code and maintain non-functional concerns per application as related policies and services may be automatically inherited from the base object providing fine-grained control. The system handles software contracts at run-time enforcing policies and performing services. This may eliminate complex development work and may enable consistent governance. Software contracts may include object management and the related policies implement the system's functional persistence model (i.e., log-style, append-only, and immutable).

In some embodiments, every object has a linked-list of states (i.e., directed acyclic graph). The approach supports universal version control and audit history over every object, regardless of type and enables "cliffs" to be performed to highlight deltas between versions. Functional Persistence also supports reasoning over the correctness of code.

The platform services 416 may include middleware capabilities inherited through the type system and automatically linked to the object graph. The middleware capabilities may include portal services (e.g., browser-based JSON portal (cross-platform)), dynamic applications, work-lists, forms, enterprise search, UI-Integration (e.g., templates, content, mashups), security services (e.g., identity, role-based access control, single sign-on authentication/authorization protocols (such as Kerberos, OAuth, SAML, XACML, or the like), certification and credential management, encryption in-flight/at-rest), gateway services (e.g., Modeling/onboarding endpoints (service, API, system, database, device)), protocol translation, data type transformations, entity mapping, proxy services, fault management, controller services (e.g., automate configuration and control), network services (e.g., network integration (virtual functions, orchestrators, target hosts, network resources)), M2M/IoT services (e.g., Machine/Device Integration (sensors, actuators, gateways)), entity management services (e.g., Lifecycle management of all system objects (models and instances, apps and data, nodes and machines/devices)), application services (e.g., application integration, data services (e.g., data integration (structured, semi-structured and un-structured)), process services (e.g., service choreography and orchestration, system and human workflows, collaboration), policy services (e.g., enforcement and execution of declarative policies), decision services (e.g., decision tables, decision trees)).

In some embodiments, developers do not have to manually integrate or even specify platform services, rather they are inherited from the type system. The system may handle any necessary connections, transformations, integration, and/or the like, at run-time. This may eliminate and/or reduce tedious and/or redundant integration work, and may enable declarative composition of higher-level services, applications and processes.

Figure 5:
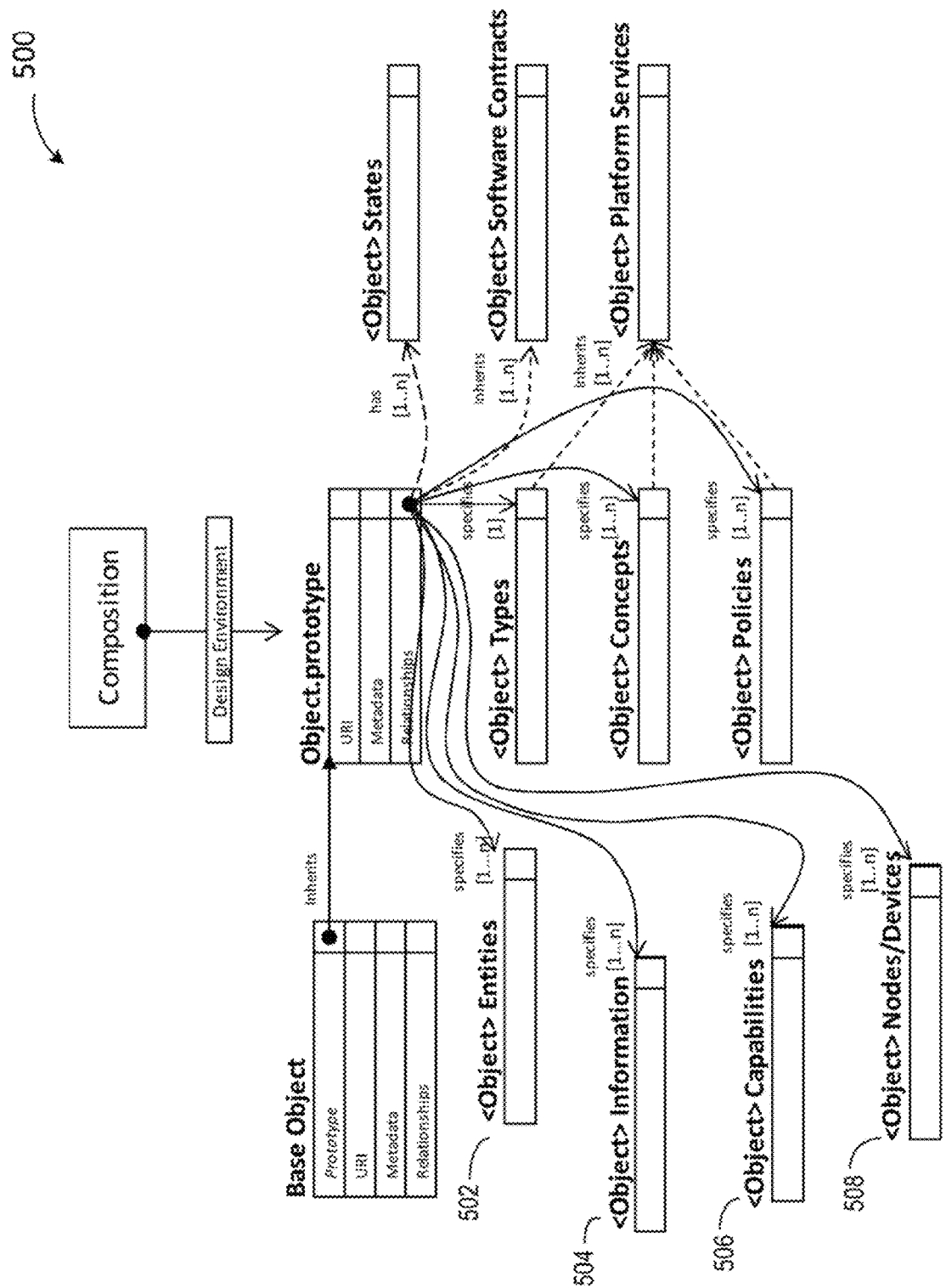
FIG. 5 depicts a diagram of an example of modeling as a declarative composition of objects according to some embodiments.

FIG. 5 depicts a diagram 500 of an example of modeling as a declarative composition of objects according to some embodiments. As shown, a design environment (e.g., modeling environment 204) may be used to specify one or more relationships of an object (e.g., entities 502, information 504, capabilities 506, and nodes/devices 508). Entities 502 may include, for example, people, organizations, or the like. Information 504 may include, for example, documents, statistics, logs, or the like. Capabilities 506 may include, for example, functions, queries, algorithms, or the like. Nodes/devices 508 may include, for example, servers, sensors, or the like.

One example of a declarative composition of objects is a cloud application for content management, with relationships to entities 502 such as documents, media and users, to information 504 such as encoding formats and media types, to capabilities 506 such as encryption, authentication, caching and charging, and to nodes/devices 508 such as file servers and network attached storage.

An example of a declarative composition of objects is an Internet of Things (IoT) application for automating industrial manufacturing, with relationships to entities 502 such as products, orders, materials and locations, to information 504 such as product specifications and machine specifications, to capabilities 506 such as machine activation, machine configuration, machining simulation, metric collection and metric aggregation, and nodes/devices 508 such as welding robots, 3D printers and atmospheric sensors for temperatures, pressure, moisture, etc.

An example of a declarative composition of objects is an algorithm to calculate budget costs for a person on a project, with relationships to entities 502 such as organizations, departments and people, to information 504 such as organizational facts, project parameters, pay scales, benefits schedules, inflation schedules, to capabilities 506 such as functions for calculating time on project, future value, benefits, overheads and full cost to project, and nodes/devices 508 such as integrated payroll and human resources systems.

Figure 6:
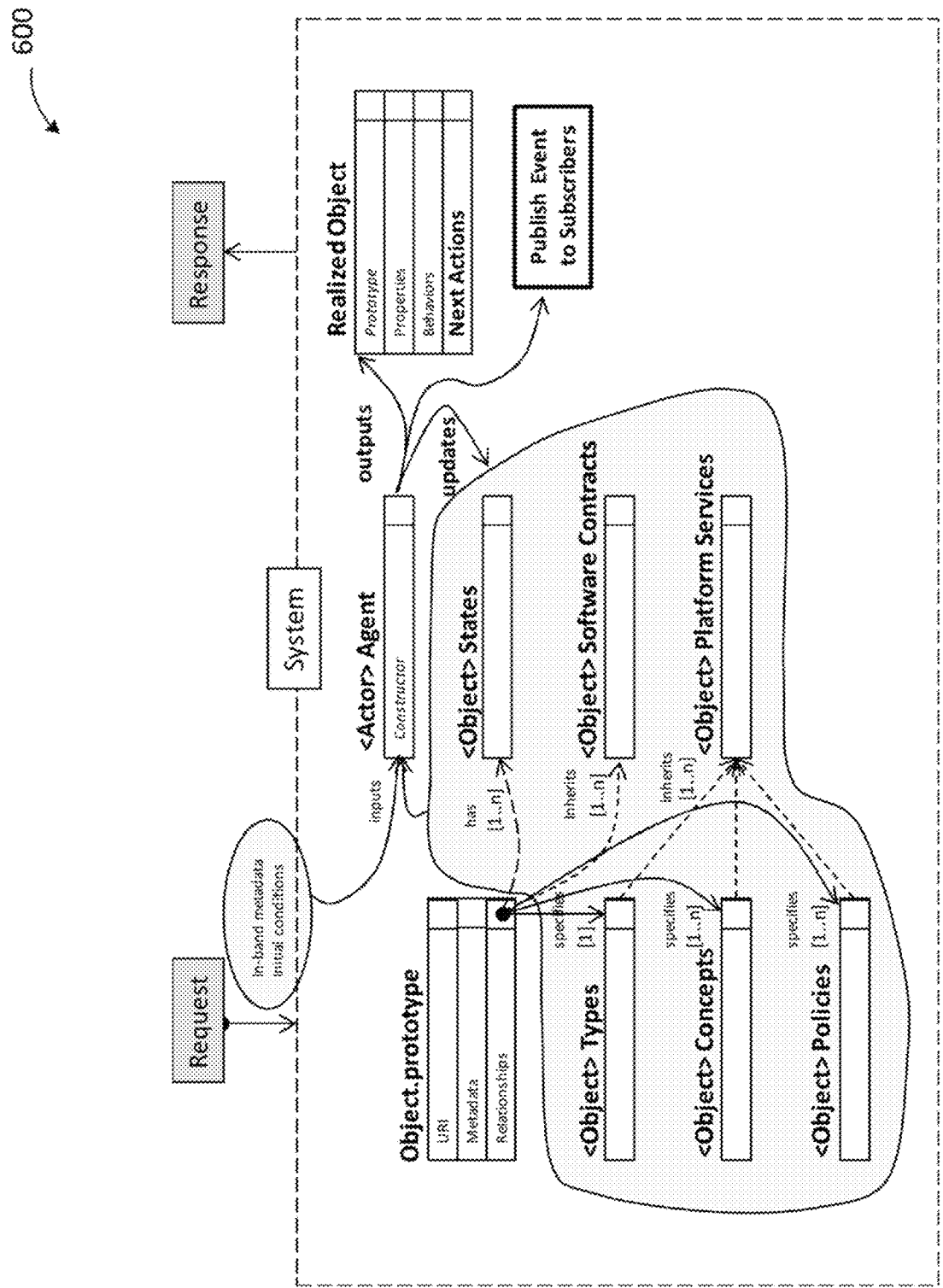
FIG. 6 depicts a diagram of an example of a transaction model according to some embodiments.

FIG. 6 depicts a diagram 600 of an example of a transaction model according to some embodiments. In the example of FIG. 6, the system 602 (through agent 606) receives a request 604 (e.g., associated with an interaction). The system may use a prototype object 404 and a real-time context (e.g., based on in-band metadata 606) to construct (or, interpret) a realized object 610 (which may be termed as an interpreted object). The realized object 610 may be provided in a response 612 from the system 602. Events may be published to subscribers in a HATEOAS process. In some embodiments, objects may be updated and/or otherwise modified (e.g., based on additional real-time context).

Figure 7:
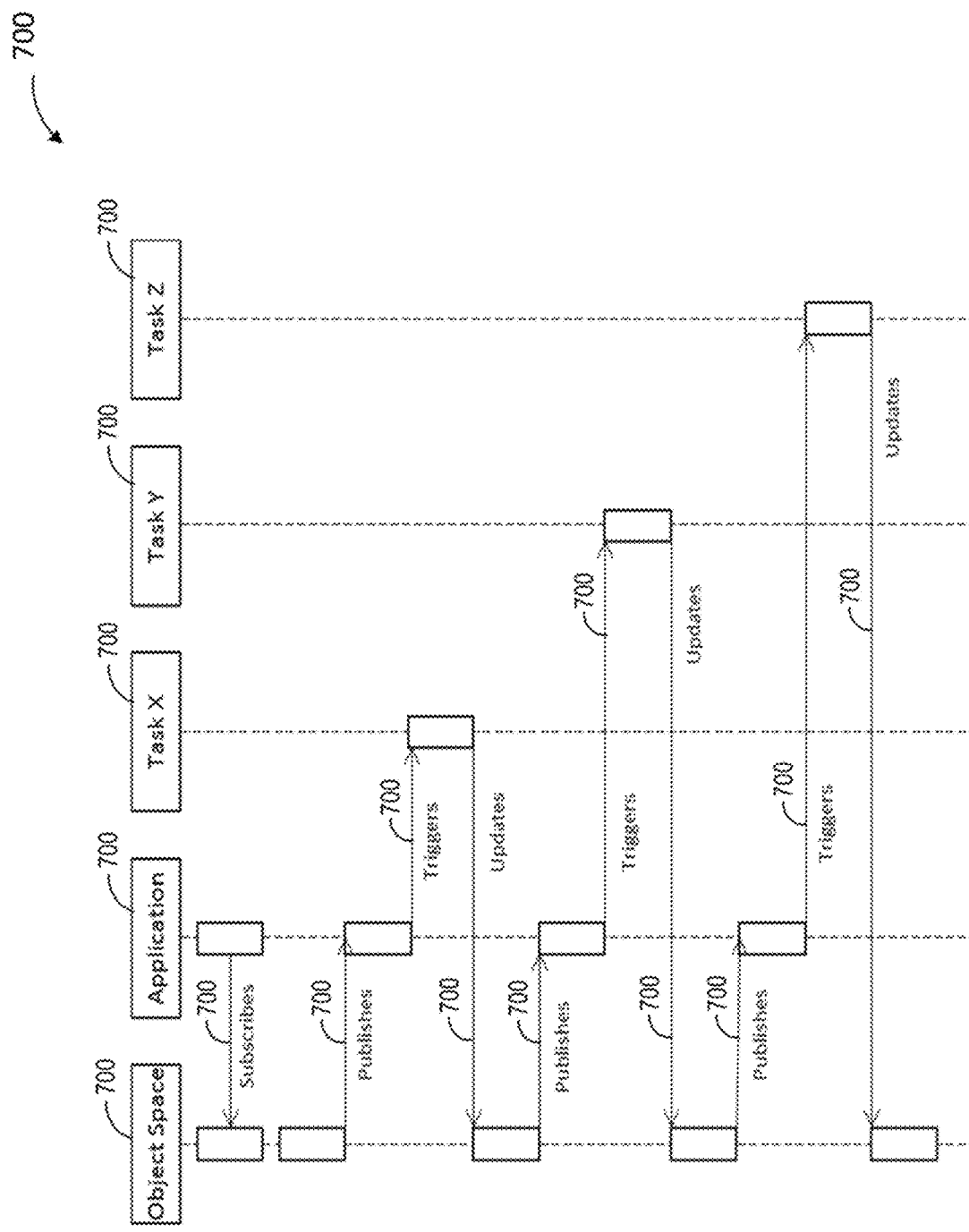
FIG. 7 depicts a sequence diagram of an example of a method of a non-linear process associated with a set of asynchronous interactions connected by next actions or subscribed events (or, "interactions") according to some embodiments.

FIG. 7 depicts a sequence diagram 700 of an example of a method of a non-linear process associated with a set of asynchronous interactions connected by next actions or subscribed events (or, "interactions") according to some embodiments. Workflows consist of loosely-coupled tasks to enable dynamic, non-linear processes and decouple state from process to support web-scale, dataflow processes. In this and other diagrams, the diagram illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step, 702, an application (e.g., represented by one or more objects) subscribes to an object and/or an interaction associated with an object. In step 704, the object publishes to the application, which triggers a first task (step 706). In step 708, the first task updates the object. In step 710, the object publishes to the application, which triggers a second task (step 712). In step 714, the second task updates the object. In step 716, the object publishes to the application, which triggers a third task (step 718). In step 720, the third task updates the object. This may continue for any number of steps.

Figure 8:
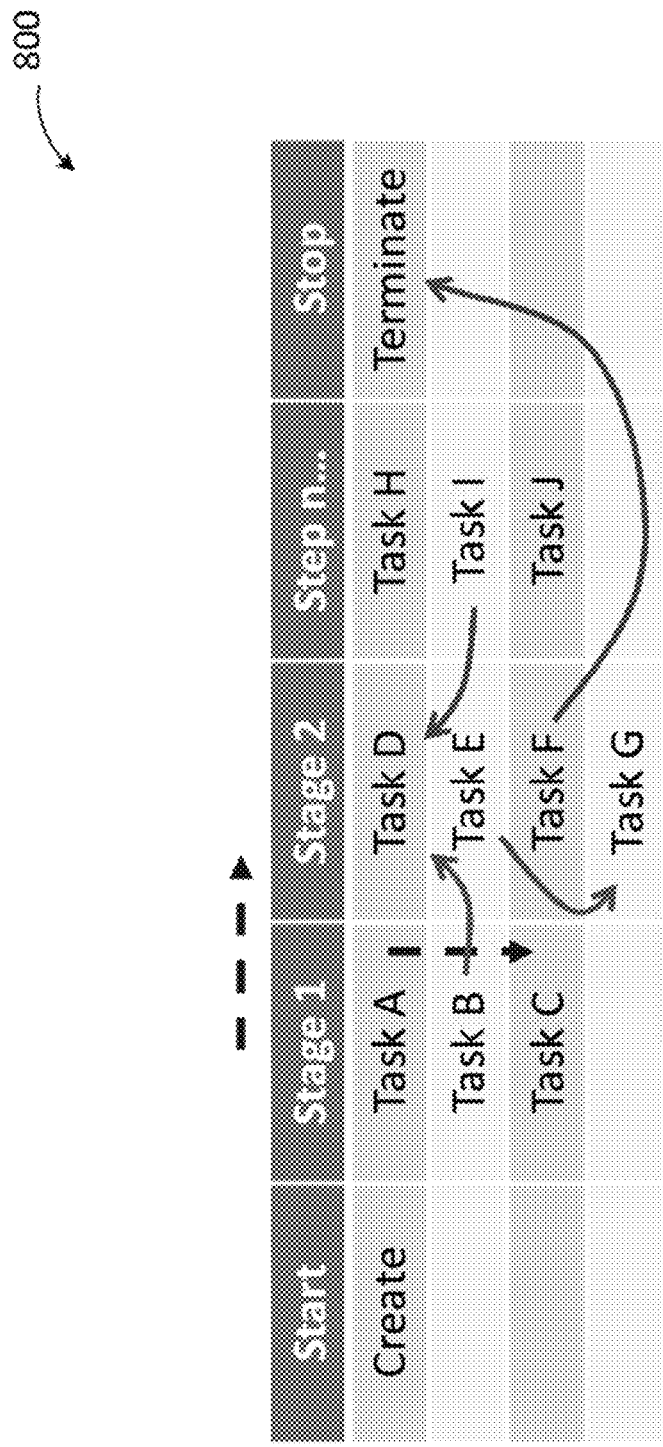
FIG. 8 depicts a state chart of an example of a model of a process according to some embodiments.

FIG. 8 depicts a state chart 800 of an example of a model of a process according to some embodiments. A process may be modeled indirectly as a set of tasks, which specify next actions as link relations to other tasks. The tasks represent potential states of a process and are organized into stages to provide a logical structure (i.e., state chart) for comprehending non-linear processes. In some embodiments, an acyclic graph model allows one-to-many conditional relationships between tasks to support logical exception paths based on context (e.g., as opposed to a statically encoded flowchart or state chart).

Figure 9:
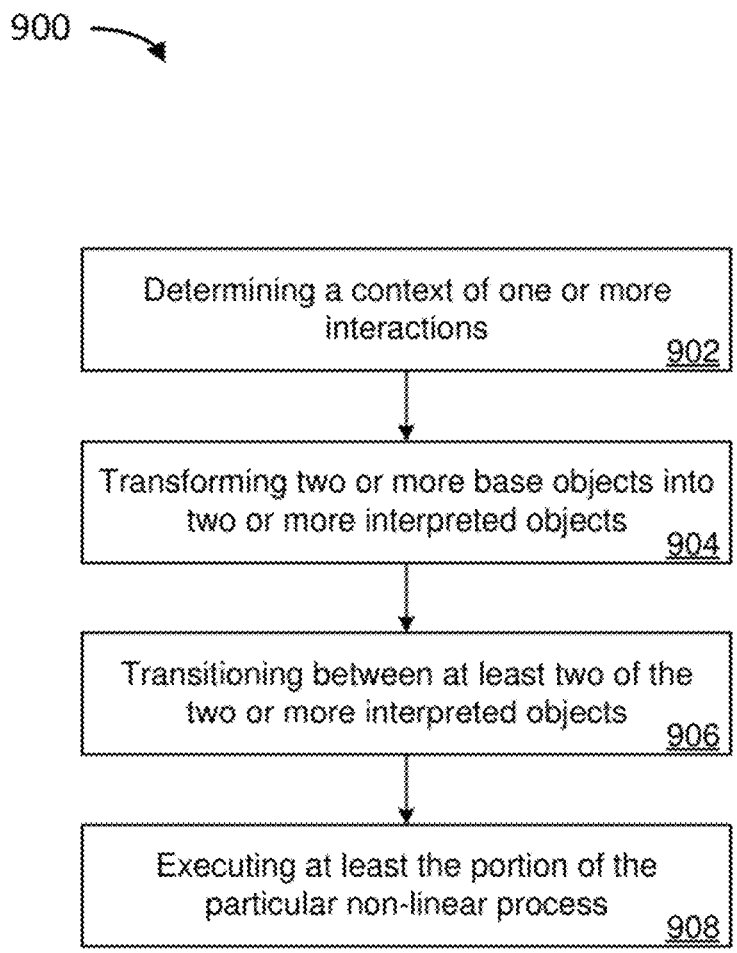
FIG. 9 depicts a flowchart of an example of a method of interpreting, configuring and controlling objects according to some embodiments.

FIG. 9 depicts a flowchart 900 of an example of a method of interpreting, configuring and controlling objects according to some embodiments.

In step 902, a computing system (e.g., one or more computer systems 152 and/or system 200) determines a context of one or more interactions (e.g., using one or more agents).

In step 904, the computing system transforms two or more base objects (e.g., base objects 402 and/or prototype objects 404) into two or more interpreted objects (e.g., prototype objects 505 and/or realized objects 612) by interpreting the two or more base objects based on evaluation of the context (e.g., performed by the computing system), and by resolving references of the two or more base objects relative to domain model types and concepts (e.g., domain model 212), each of the two or more base objects modeled using a same declarative modeling language (e.g., GOAL), the same declarative modeling language enabling transitions between the two or more interpreted objects, at least one of the two or more interpreted objects including at least one post-condition, the at least one post-condition providing hooks for transition policies which allow the at least one of the two or more interpreted objects to be logically chained in a non-linear process.

In step 906, the computing system transitions between at least two of the two or more interpreted objects by chaining the at least two of the two or more interpreted objects based on a particular post-condition of a particular interpreted object of the at least two of the two or more interpreted objects to create at least a portion of a particular non-linear process. In step 908, the computing system executes at least the portion of the particular non-linear process (e.g., to perform one or more platform services, and/or portions of platform services).

Figure 10:
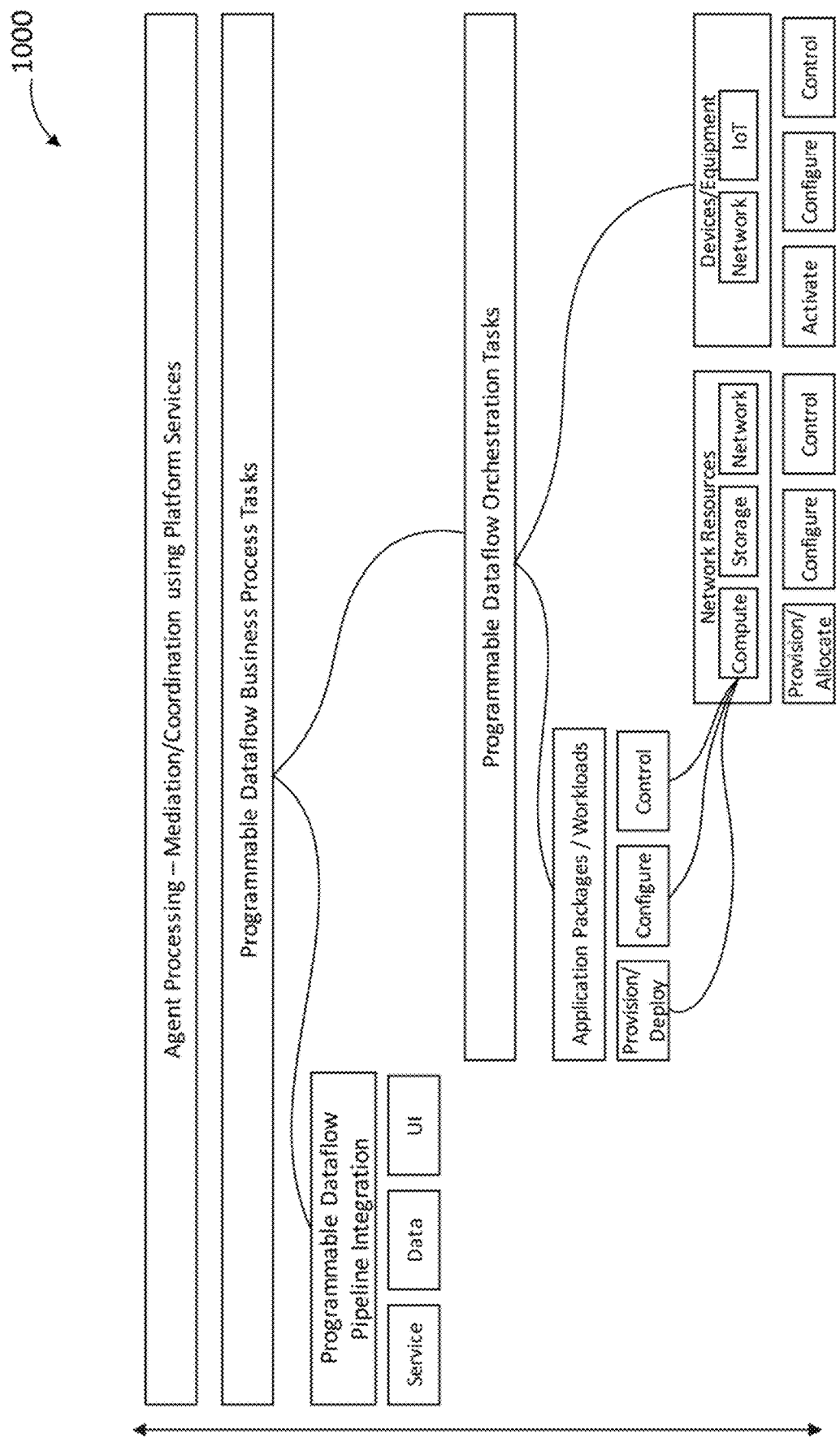
FIG. 10 depicts a diagram of an example of a unified execution system according to some embodiments.

FIG. 10 depicts a diagram of an example of a unified execution system 1000 according to some embodiments. In various embodiments, interpreting objects as discussed herein using the GOAL language enables management of workflows that may run inside compute of network resources. In some embodiments, the system 200 enables the unified execution system 1000 to streamline solution architecture, eliminate hops, join, context-switching, and/or the like, gain flexibility, extensibility, and/or adaptability, and achieve unified governance. The unified execution system 1000 may include some or all of the features of a unified operating system (e.g., as described in U.S. patent application Ser. No. 15/417,122, filed on Jan. 26, 2017, and entitled "Unified Operating System for Distributed Computing," which is incorporated herein by reference). In various embodiments, other systems described herein may include some or all of the features of a unified operating system.

Figure 11:
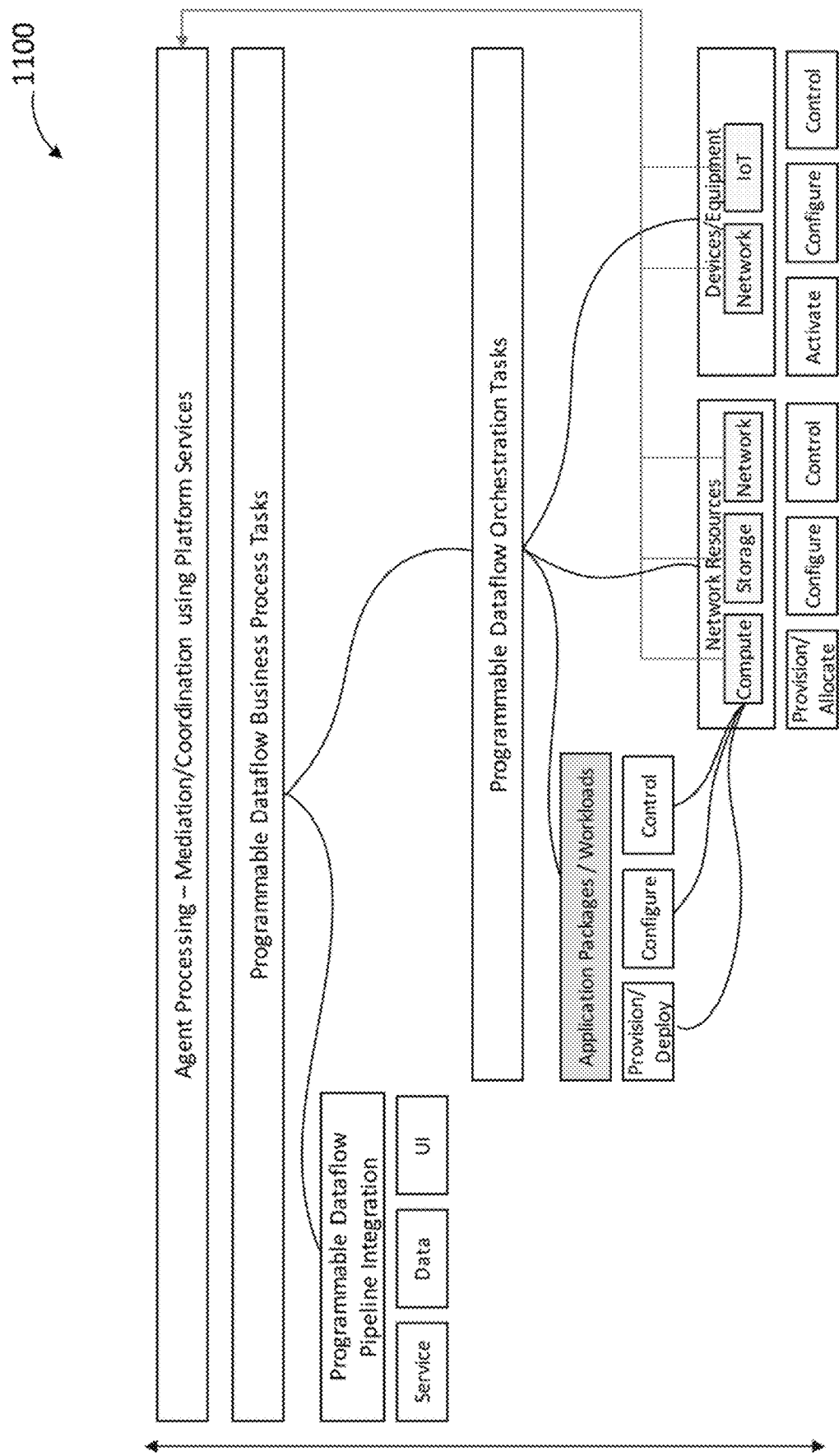
FIG. 11 depicts a diagram of an example of a closed-loop control system according to some embodiments.

FIG. 11 depicts a diagram of an example of a closed-loop control system 1100 according to some embodiments. In some embodiments, the system 200 enables the closed-loop control system 1100 to pull back data from connected interfaces interactively during the course of executions and on events to optimize automated decision-making with real-time live state. In some embodiments, the system 200 enables the closed-loop control system 1100 to deploy, manage and communicate with monitoring services or components that provide assurance and closed-loop control. In some embodiments, the system 200 facilities smart automation for event-driven systems that require control loops to optimize performance, deployments or configurations (e.g., load-balancing; predictive maintenance, network function virtualization, asset management, or the like) and may involve human intervention (e.g., service calls, service redesign, proactive customer service, or the like).

Figure 12:
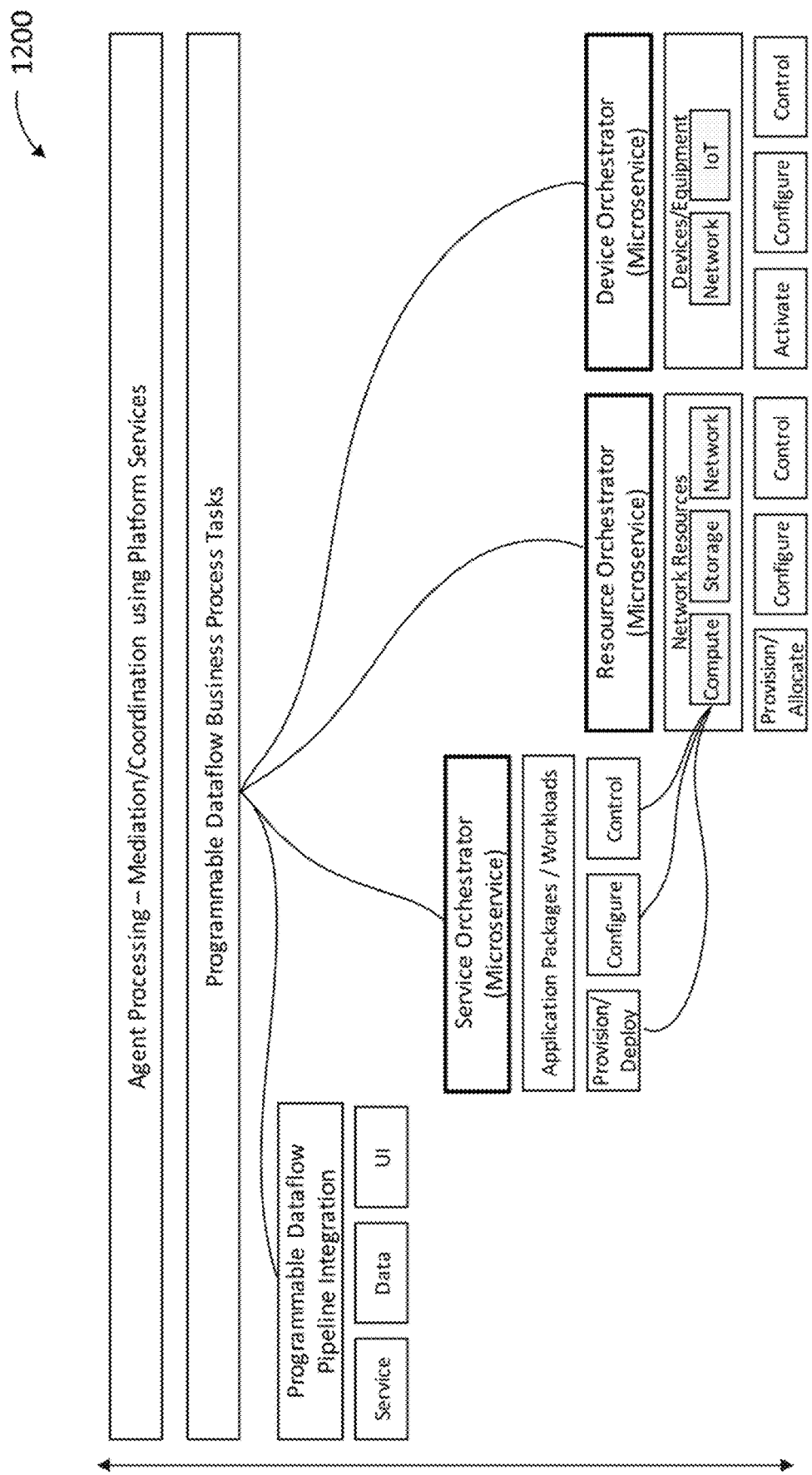
FIG. 12 depicts a diagram of an example of a system for distributing processing in micro-services according to some embodiments.

FIG. 12 depicts a diagram of an example of a system 1200 for distributing processing in micro-services according to some embodiments. In some embodiments, the system 200 can be decomposed into a set of micro-services for independent management, scaling and disaster recovery, which may be coordinated like any other connected endpoint.

Figure 13:
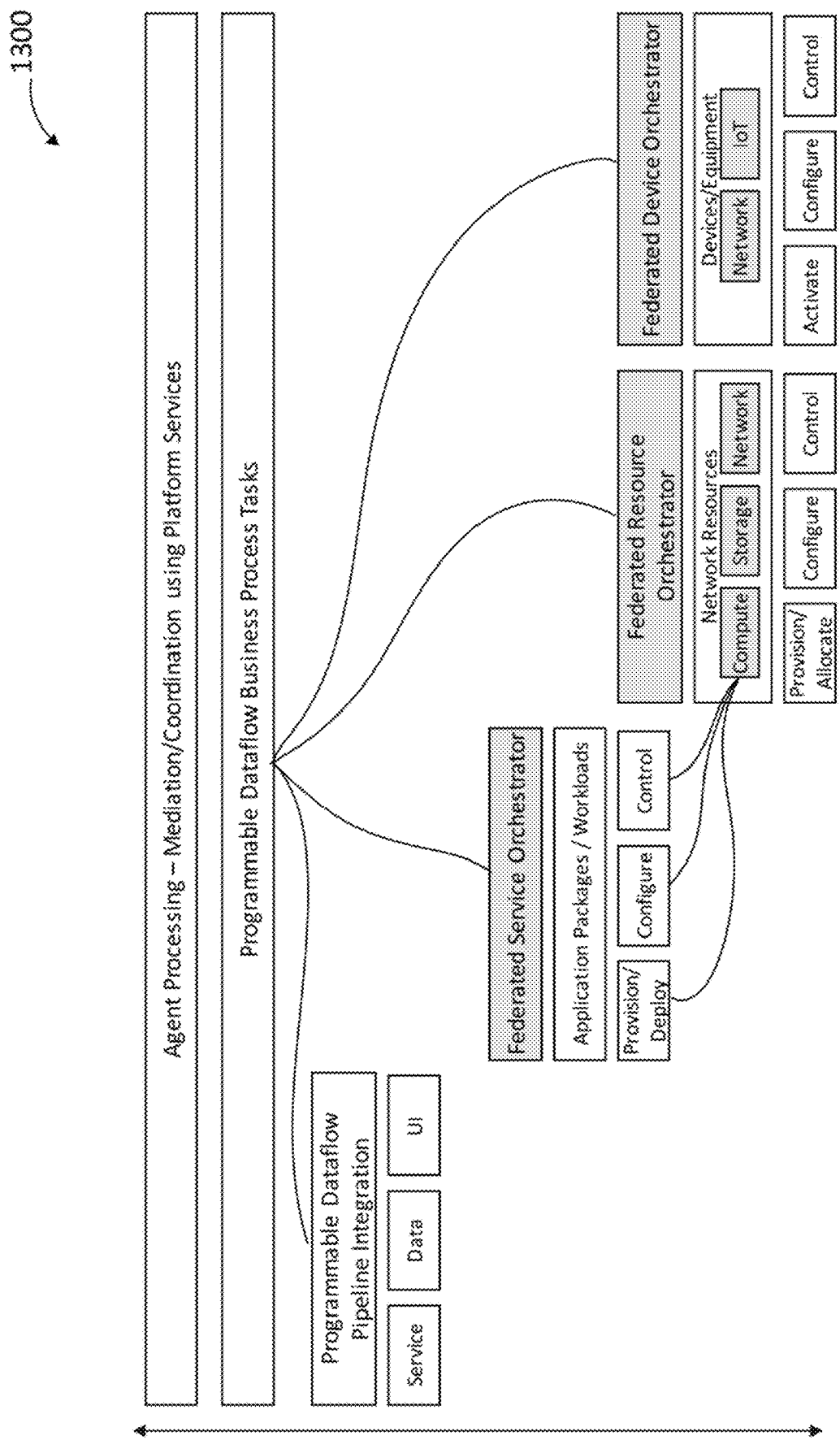
FIG. 13 depicts a diagram of an example of a federated orchestrator and a federated controller according to some embodiments.

FIG. 13 depicts a diagram of an example of a system 1300 including a federated orchestrator and a federated controller according to some embodiments. In some embodiments, the system 200 enables the system 1300 to integrate with any combination of orchestrators, domain controllers and automation tools and dynamically coordinate behavior across a set of collaborating services.

In some embodiments, systems and methods may drop down to any "level" of task type, many times, in any order, as necessary to fulfill higher-level business logic of a composite application involving two or more elements.

As discussed herein, in some embodiments, task types may be nested in complex processes that support end-to-end automation from human process and mashups to service orchestration and resource provisioning. It will be appreciated that many operations are at the system integration level for interoperability between heterogeneous elements, which may include connecting remote endpoints, handling license keys and certifications, as well as transformation, translation and mediation as may be necessary whereby the configuration and control of each participating element may be directed by live metadata and real-time state.

In some embodiments, the agent may require state (e.g., reflection and look-ups) and additional processing (e.g., queries, functions, algorithms) to resolve policy-based conditions.

In some embodiments, the execution of specific orchestration tasks over services, resources and devices may represent the minority of agent processing activity relative to the Input/Output (i.e., "I/O") and compute-intensive activity of interpreting objects and making real-time context-enhanced decisions in order to optimize the execution orchestration tasks. It will be appreciated that in some embodiments, the overall end-to-end processing of a transaction by the agent based on the systems and methods is more performant, scalable and resilient by design than conventional methods previously described.

Figure 14:
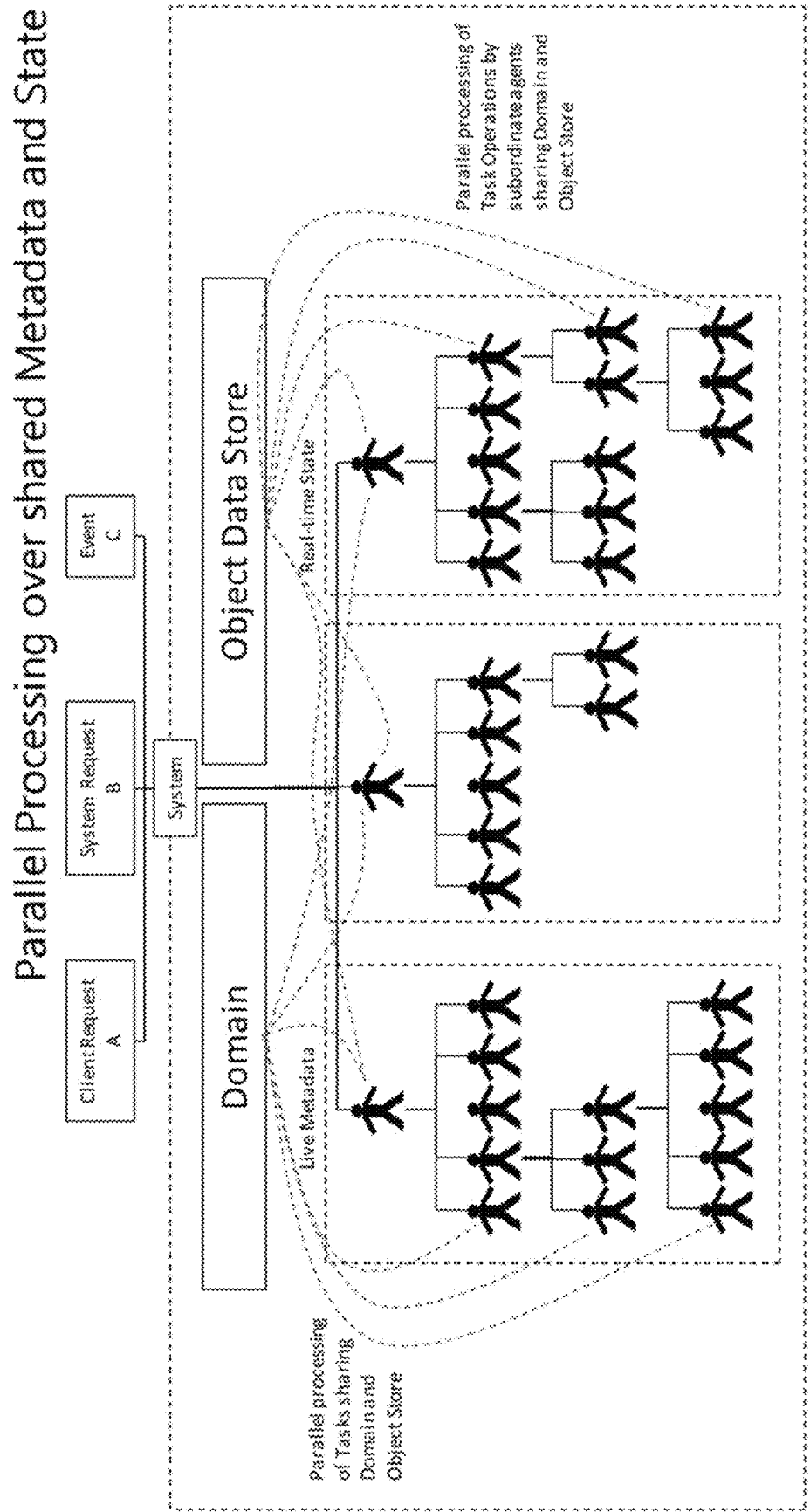
FIG. 14 depicts an example of multiple discrete interactions, processing in parallel by separate agents acting as transaction managers for each interaction, which in turn may distribute work for parallel processing to multiple subordinate agents (responding to the request of the transaction managers, enacting the same protocol).

FIG. 14 depicts an example 1400 of multiple discrete interactions, processing in parallel by separate agents acting as transaction managers for each interaction, which in turn may distribute work for parallel processing to multiple subordinate agents (e.g., responding to the request of the transaction managers, enacting the same protocol). The agent program or protocol may be based on functional programming concepts. The agent program or protocol may be naturally parallel and order of processing may not be required. As such, the agent program or protocol, in this example, may be schedule free with lazy evaluation.

As distinct from Map-Reduce algorithms, which divide a workload across multiple workers and then aggregate results, in this example, diverse workloads may be distributed to agents and coordinated such that overall processing of a complex event may be modeled in a single language with a unified execution engine with all agents leveraging shared domain semantics and object data store so metadata and state is exchanged efficiently. Agents may run in the same compute node or distributed nodes, which may represent different deployment technologies (e.g., servers, virtual machines, containers) and the placement of agent workloads may itself be an automated, domain-driven, policy-controlled decision based on real-time metadata and state. Task operations may be delegated to federated services as specified. As such, the middle-tier may be flattened and/or unified.

In contrast to big-data, this example is not a simple map-reduce of a workload across workers over nodes. In this example, there may be a "simple request" for an object and one or more agents may decode at least some (or all) complex interdependencies as discrete tasks (i.e., diverse workloads). An executive transaction manager may delegate to many workers (subordinate agents) for parallelism, and an executive agent may reason over inputs and may direct next actions.

Figure 15:
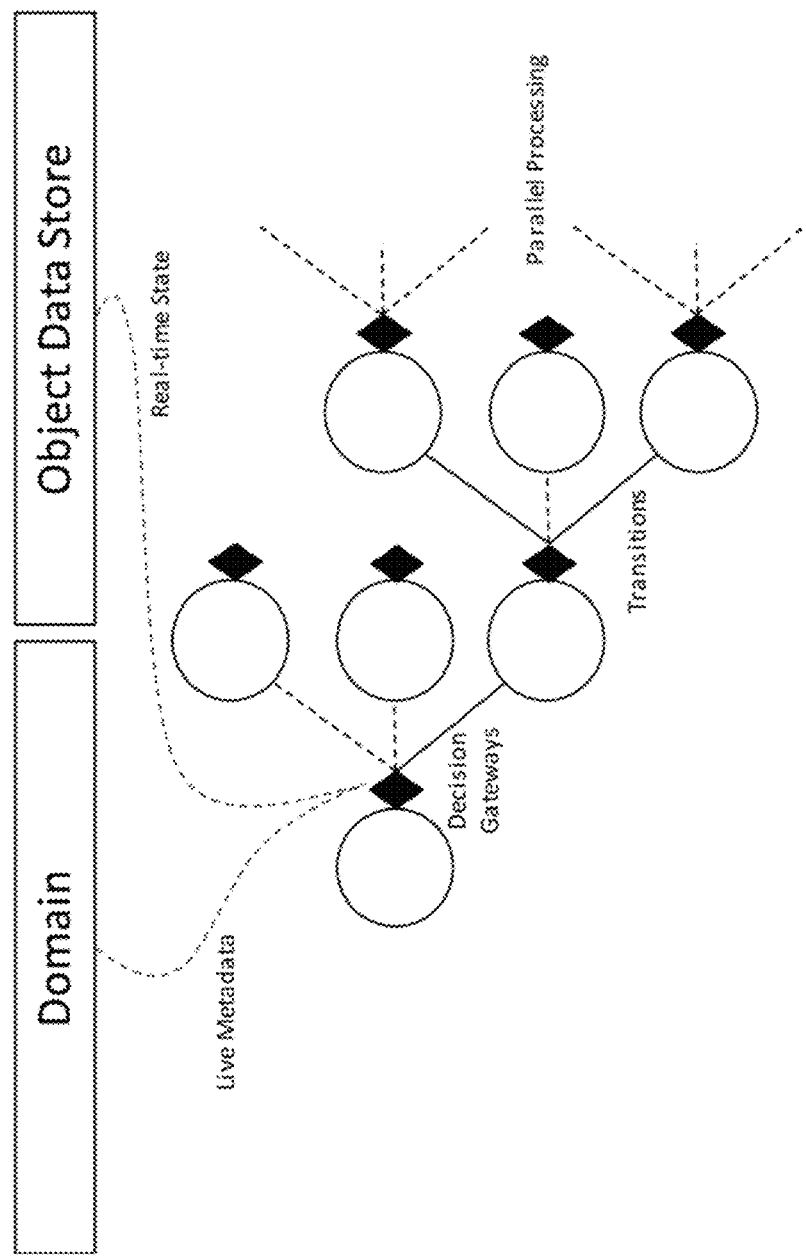
FIGS. 15 and 16 highlight examples of roles of "decision gateways" that may drive flow of tasks as well as performance of a task's operations using live metadata and real-time state.
Figure 16:
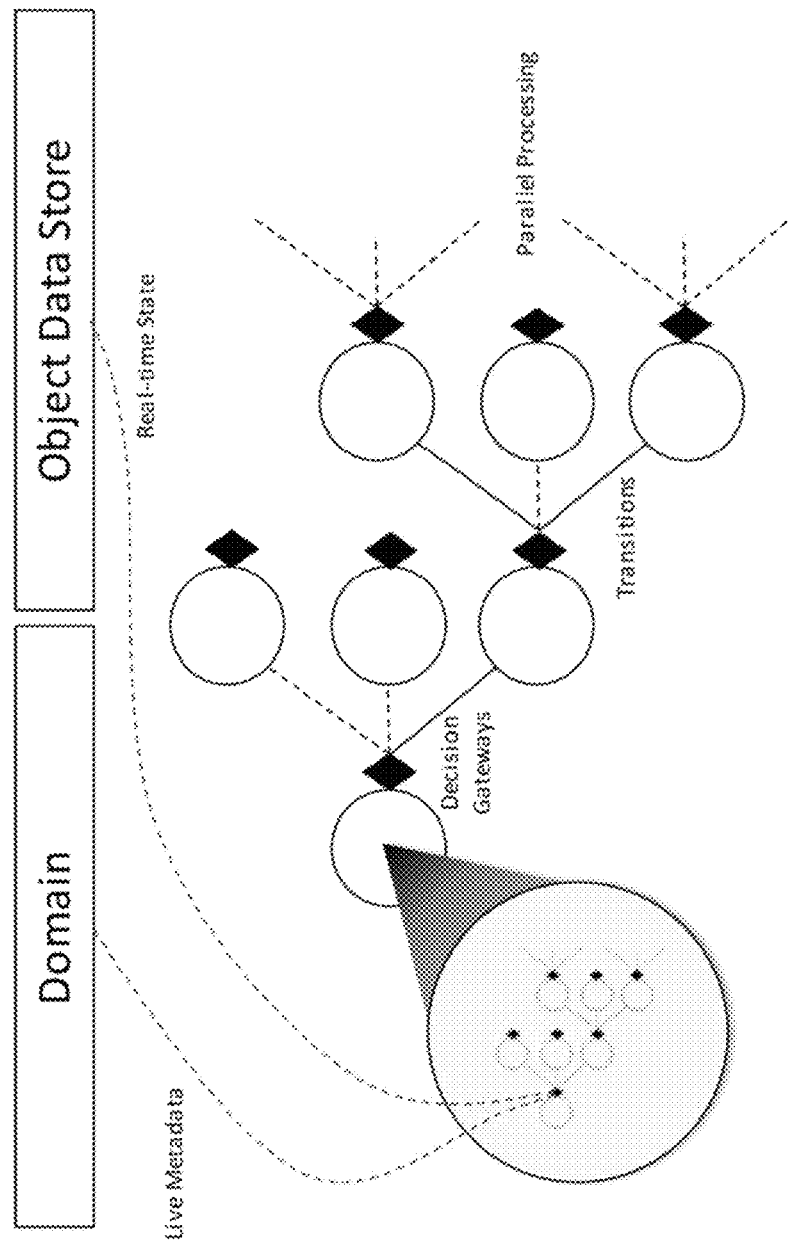

FIGS. 15 and 16 highlight examples 1500 and 1600 of roles of "decision gateways" that may drive flow of tasks as well as performance of a task's operations using live metadata and real-time state. FIGS. 15 and 16 depict automated domain-driven, policy-based decision-making based on live metadata and real-time state.

Complex events may be modeled independent of systems to monitor and respond to behaviors across systems in an after-the-fact approach. It will be appreciated based on content herein that interactions may be modeled against a shared domain, which provides the domain semantics (e.g., domain semantics need not be inferred, they are modeled). Live metadata and real-time state may configure and control the task processing and flows, in a contextualized, model-driven, fact-based manner. In some embodiments, it will be appreciated, based on content herein, that decision gateways may include predictive, probabilistic, fuzzy or the like algorithms, which may weight or rank decisions based on a variety of factors.

Figure 17:
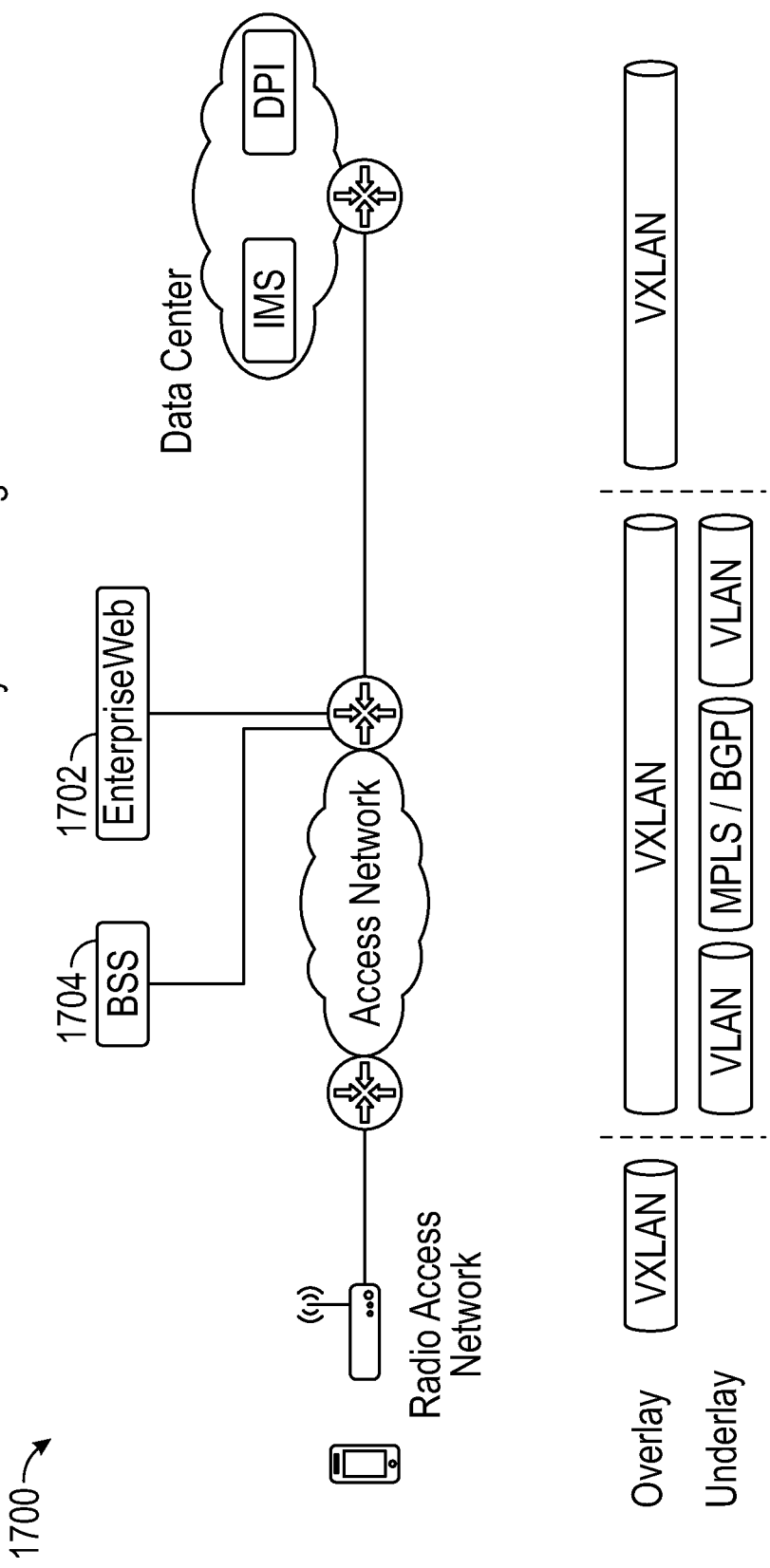
FIG. 17 depicts a diagram of an example system for dynamic billing of Network Function Virtualization (NFV) based telecommunication services according to some embodiments.

FIG. 17 depicts a diagram 1700 of an example system for dynamic billing of Network Function Virtualization (NFV) based telecommunication services according to some embodiments. In some embodiments, the system of FIG. 17 configures and manages an IP Multimedia Subsystem (IMS) Virtual Network Function (VNF) and extends it with dynamic Business Support System (BSS) based billing. In various embodiments, some or all of the elements of FIG. 17, and/or other FIGS. described herein, may be implemented by computer system 152 and/or other appropriately configured system(s). For example, EnterpriseWeb, BSS, and/or the like, may be implemented by one or more computer systems 152.

In some embodiments, an instance of EnterpriseWeb (e.g., any number of digital devices) provides an OSS, which can be used to order products, in this case a "Voice Calling Service." The product is realized as a network service comprised of an IMS VNF (e.g., to provide calling functionality) paired with a DPI VNF (e.g., to analyze call traffic), deployed into a data center. An Access Network connects the data center to a Radio Access Network by which cell phones consume the service.

Figure 18:
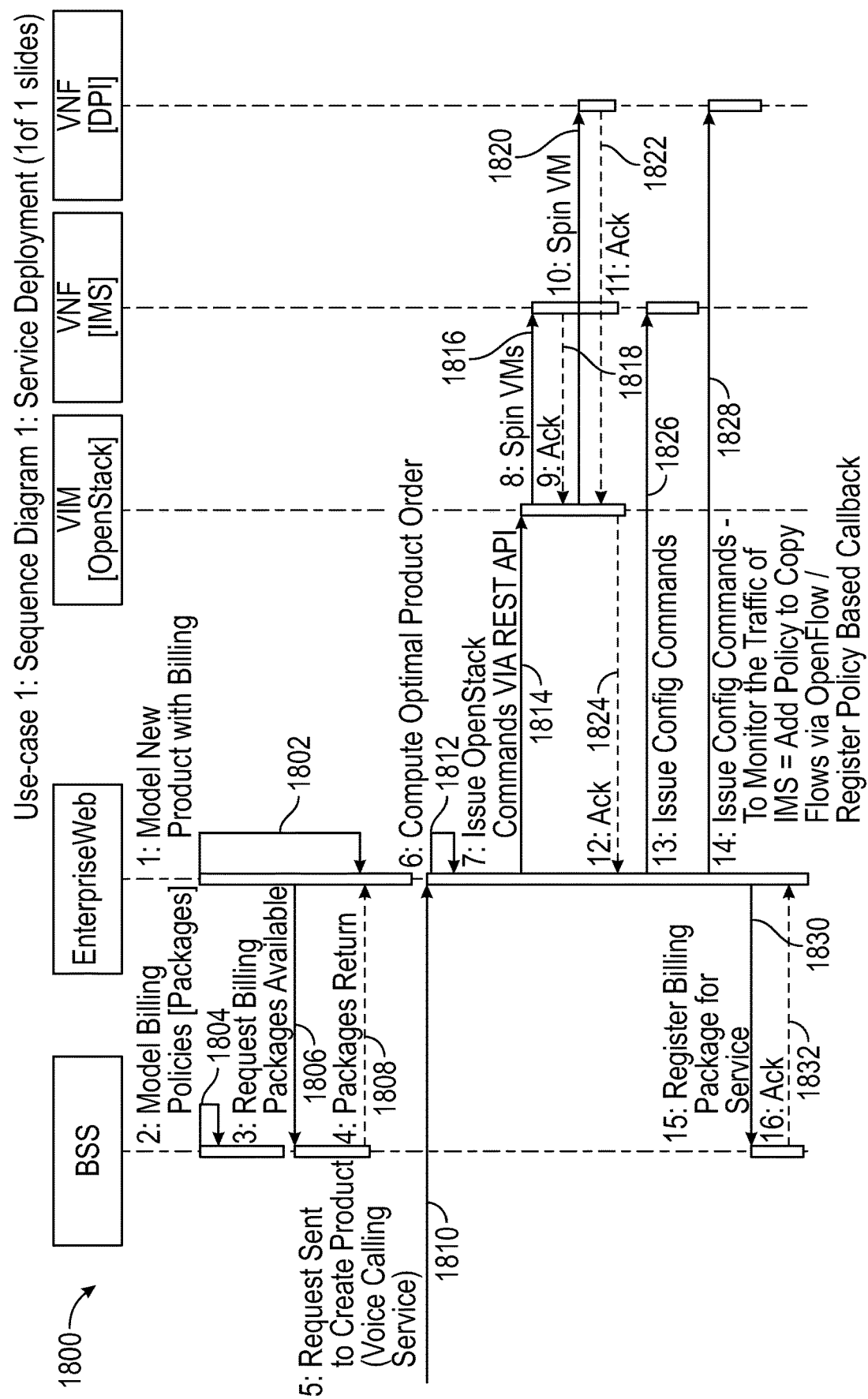
FIG. 18 depicts a sequence diagram of an example of a method of service deployment according to some embodiments.

References are made to EnterpriseWeb regarding FIG. 18 and thereafter. In various embodiments, EnterpriseWeb represents the components and/or a computer system including components (e.g., software such as executable instructions configured to control one or more processors to perform steps). In one example, EnterpriseWeb refers to all or part of computer system 152 discussed regarding FIG. 1 which may include the execution environment 206, the modeling environment 204, the object store 202, the service, application and process tasks 208, the domain model 212, the system object model 214, and/or the platform services 216 discussed regarding FIG. 2.

In some embodiments, EnterpriseWeb choreographs the deployment of service elements, and the enforcement of policies modeled for SLA management (e.g., to scale the network when video traffic is detected) and dynamic billing (e.g., to update a BSS based on allocated resources) to enable closed-loop modification of the service. EnterpriseWeb may act as a model-based event-listener to respond intelligently to events related to the service, and through the entire lifecycle of the service acts as an executive transaction manager to make sure all interactions have guarantees, compensations and rollback as required.

In some embodiments, there are no federated controllers, and EnterpriseWeb is fulfilling roles directly in realizing the service, performing messaging and middleware functions, including but not limited to connecting, coordinating, configuring and controlling each participating Virtual Network Function and Service without support of third-party components.

Examples and Example Implementations

| | |
|---|---|
| Application and Computing Resources | VIM Adaptor (OpenStack) |
| | BSS Adaptor |
| In this example, each is | SDN Controller Adaptor |
| onboard to the system using a | IMS VNF Package |
| model-based process: | DPI VNF Package |
| mapping properties/behaviors | |
| to the metamodel, and | |
| defining standards-based LCM | |
| operations. | |
| Micro-capabilities | Service Orchestration Functions (Calculate Optimized |
| In this example, a set of | Deployment Plan, Coordinate Actors, Route |
| business/IT functions and | Events/Messages) |
| middleware/platform services | VIM interface (Instantiate VM/VDU, Terminate |
| enabling the set of | VM/VDU, Scale VM/VDU, etc.) |
| desired/necessary operations | VNFM interface (Deploy VNF, Start VNF, Stop VNF, etc.) |
| over other objects to connect, | Product Order interface (List Products, Get Product |
| configure, control, coordinate. | Spec, Place Order, etc.) |
| | Dynamic Billing Interface (Add Policy, Get Policy, Update Policy, Bind Policy, etc.) |
| | Configure VNF (Adjust Config Files, Transfer Configs, Execute Scripts) |
| | SDN Interface (Configure Virtual Links, Establish Service Chain, Install Routing Policy) |
| | Protocol/Format translation and transformation |
| | Distributed Transaction Management |

| | |
|---|---|
| Composed Models | Network Service = IMS VNF Package + DPI VNF Package + IMS VNF Package + Network Connection Graph + SLA Model (Video Calling) + Dynamic Billing Policy<br>SLA (Video Calling):<br>    KPI: video traffic present = False<br>        KPI measured via DPI<br>        Change of state reported as Event<br>        LCM Operation: scale down IMS to<br>        minimal configuration<br>    KPI: video traffic present = True<br>        KPI measured via DPI<br>        Change of state reported as Event<br>        LCM Operation: scale up IMS to<br>        accommodate anticipated load<br>Dynamic Billing Policy:<br>    Resource usage thresholds classified as low, medium or high within BSS.<br>    Thresholds exposed as Billing Packages<br>    Packages are evaluated on all state changes in network service.<br>    If resource use no longer falls within currently registered package thresholds, BSS is signaled and package is reassigned. |

Some or each of the sequence diagrams described herein may represent a single transaction, wherein EnterpriseWeb responds to an event, calculates an optimal plan in response, and acts as an executive transaction manager ensuring the completion of the set of parallel and sequential interactions required by the plan, and if needed applies compensations or rollback in case of failure.

The sequence diagrams cover three transactions: service deployment (e.g., FIG. 18), service deployment failure (e.g., FIG. 19), and a scaling and billing event (e.g., FIG. 20) generated from a successful deployment.

As noted elsewhere herein, in some embodiments, there may be no federated controllers, so EnterpriseWeb is fulfilling all roles directly in realizing the service, performing all messaging and middleware functions, including but not limited to connecting, coordinating, configuring and controlling each participating Virtual Network Function and Service without support of any third-party components.

FIG. 18 depicts a sequence diagram 1800 of an example of a method of service deployment according to some embodiments. In this and other diagrams (e.g., sequence diagrams, flowcharts, and/or the like), the diagram illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In some embodiments, acting as an OSS, EnterpriseWeb exchanges billing policies with a paired BSS. At any time, an order may be placed to EnterpriseWeb for the service, from which an instance of the service is generated and billing is coordinated.

In some embodiments, each step in the sequence diagram 1800 corresponds to an interaction which is elaborated at an operational level below. Steps 1812, 1814, 1826, and 1828 are expanded on elsewhere herein (e.g., FIGS. 22-25), elaborating lower-level implementation details indicative of the complexity and breadth of EnterpriseWeb capabilities found in each interaction.

In step 1802, a network service model is created by EnterpriseWeb. In step 1804, billing policy packages are created independently in a BSS. In step 1806, EnterpriseWeb connects to the BSS to request the list of billing packages so they can be referenced as part of the new network service model. In step 808, EnterpriseWeb maps and transforms proprietary BSS billing policies into executable objects.

In step 1810, a request is sent to create a product (e.g., voice calling service). For example, a human user of the system through a portal, or a system through an API, places an order for the service to EnterpriseWeb.

In step 1812, an optimal product order is computed. In some embodiments, the product order is an event evaluated based on context. Resource requirements and configurations for VNFs and Networks are determined based on the network service model, VNF packages involved (IMS and DPI) and any related Policies (e.g., scaling and billing), and an optimized plan is generated for subsequent interactions.

In step 1814, OpenStack commands are issued via REST API. In some embodiments, EnterpriseWeb requires VMs/VDUs to be created for each VNF via OpenStack VIM, and for VLs to be established providing networking to each VM/VDU. Further, EnterpriseWeb determines there is no subnet for the new service, and adds corresponding subnet and VXLAN SDN configurations to the set of requirements. EnterpriseWeb uses a model of the VIM to translate standard LCM operations to create and instantiate VMs (e.g., for both IMS and DPI) and networks into specific commands—in this case issued using HTTP/REST/JSON. This initiates an independent set of actions in OpenStack as part of the choreography.

In step 1816, one or more VMs are spun up. VMs for the IMS VNF are created independently by OpenStack, and VLs are allocated for each required network port. As the subnet does not yet exist, it is created as part of this process and attached.

In step 1818, OpenStack is alerted of completion. In step 1820, one or more VMs are spun up. VMs for the DPI VNF are created independently by OpenStack, and VLs are allocated for each required network port. The subnet created in 1816 is attached to complete the required service chain.

In step 1822, OpenStack is alerted of completion. In step 1824, OpenStack sends an alert to EnterpriseWeb that VMs/VDUs are ready. This event is interpreted and it is determined that configuration of the VNFs is required.

In step 1826, configuration commands are issued from EnterpriseWeb to VNF (IMS). EnterpriseWeb uses a model of the IMS VNF package to translate standard LCM operations to configure the VNF into specific commands via a format and protocol specific to the VNF—in this case issuing commands using SSH to send configuration files to the IMS VMs.

In step 1828, configuration commands are issued from EntrprisWeb to VNF (DPI). EnterpriseWeb uses a model of the DPI VNF package to translate standard LCM operations to configure the VNF into specific commands via a format and protocol specific to the VNF—in this case issuing OpenFlow (SDN) commands to the underlying VM, and choreographing the VNF (e.g., via REST) to alert EnterpriseWeb if it detects video traffic for the purposes of enforcing scaling and billing policies.

In step 1830, a billing package for a service is registered. In some embodiments, EnterpriseWeb connects to the BBS system to register the new service for billing. In step 1832, BSS alerts EnterpriseWeb when complete, so the service can be used.

Figure 19:
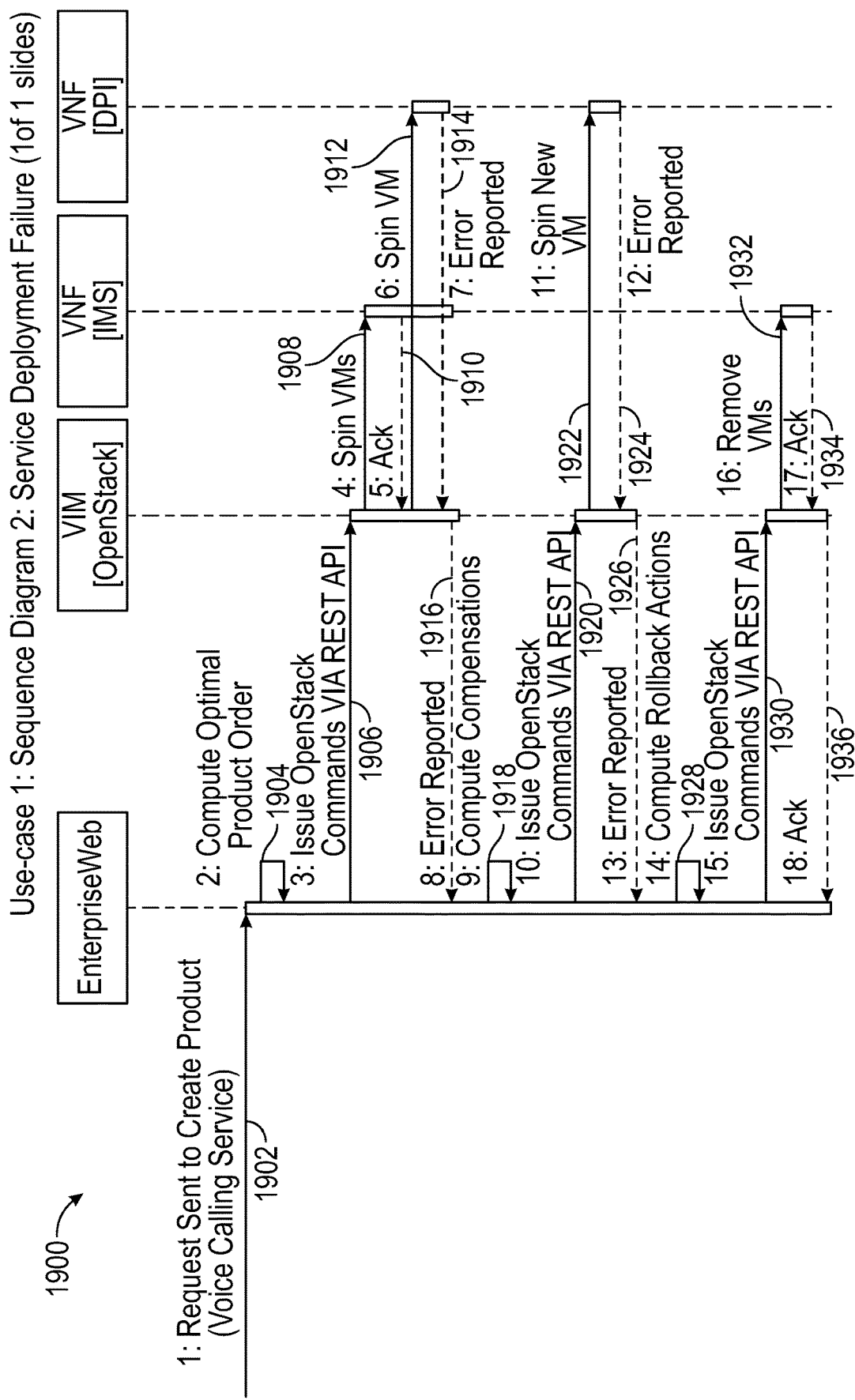
FIG. 19 depicts a sequence diagram of an example of a method of service deployment failure according to some embodiments.

FIG. 19 depicts a sequence diagram 1900 of an example of a method of service deployment failure according to some embodiments. As in the example sequence diagram 1800, EnterpriseWeb receives an order for the service, however deployment of this service instance fails. EnterpriseWeb may first apply compensations to attempt to complete the transaction, and failing those, may perform a rollback operation, returning the resources to a pre-transaction state.

Each step in the sequence diagram corresponds to an interaction which is elaborated at an operational level below. For example, FIGS. 22-25 provide an elaboration of the lower-level implementation details of like-similar interactions in another sequence diagram, which are indicative of the complexity and breadth of EnterpriseWeb capabilities rendered by each step.

In step 1902, a request is sent to create a product (e.g., voice calling service). For example, a human user of the system through a portal, or a system through an API, places an order for the service to EnterpriseWeb.

In step 1904, an optimal (e.g., preferred) product order is computed. In some embodiments, the product order is an event evaluated based on context. Resource requirements and configurations for VNFs and networks are determined based on the network service model, VNF packages involved (e.g., IMS and DPI) and any related policies (e.g., scaling and billing), and an optimized plan is generated for subsequent interactions.

In step 1906, OpenStack commands are issued via REST API. EnterpriseWeb requires VMs/VDUs to be created for each VNF via OpenStack VIM, and for VLs to be established providing networking to each VM/VDU. Further, EnterpriseWeb determines there is no subnet for the new service, and adds corresponding subnet and VXLAN SDN configurations to the set of requirements. EnterpriseWeb uses a model of the VIM to translate standard LCM operations to create and instantiate VMs (e.g., for both IMS and DPI) and networks into specific commands—in this case issued using HTTP/REST/JSON. This initiates an independent set of actions in OpenStack as part of the choreography.

In step 1908, VMs are spun up. In some embodiments, VMs for the IMS VNF are created independently by OpenStack, and VLs are allocated for each required network port. As the subnet does not yet exist, it is created as part of this process and attached. In step 1910, OpenStack is alerted of completion.

In step 1912, VMs are spun up. VMs for the DPI VNF are created independently by OpenStack, and VLs are allocated for each required network port. The subnet created in step 1908 is attached to complete the required service chain.

In step 1914, errors are reported. In some embodiments, OpenStack is alerted of an error deploying the VM, the node is created, but the required port (e.g., for the VL, to connect the service to the service chain) cannot be attached to the subnet created in 1908.

In step 1916, errors are reported. In some embodiments, OpenStack sends an alert to EnterpriseWeb that VMs/VDUs was created, but an error occurred allocating the port/creating the VL because security does not allow the networking across availability zones (e.g., a detail specific to the VIM). This event is interpreted and it is determined that a compensation can be attempted to continue the transaction.

In step 1918, compensations are computed. In some embodiments, EnterpriseWeb uses the details of the attempted/failed interaction, the error reported, and a model of OpenStack to determine that explicitly deploying the DPI VNF in the same availability zone as the IMS VNF may be an appropriate alternative action. The previous plan is updated to first remove the previous VM, then issue an updated order for the a VM explicitly specifying the deployment location (e.g., availability zone) and resume.

In step 1920, OpenStack commands are issued via REST API. In some embodiments, EnterpriseWeb uses a model of the VIM to translate standard LCM operations to remove the previous VM from step 1912, and to create and instantiate a new VM (e.g., for DPI) in the availability zone used for the IMS VM, into specific commands—in this case issued using HTTP/REST/JSON. This initiates an independent set of actions in OpenStack as part of the choreography.

In step 1922, VMs are spun up. In some embodiments, the previous VM is spun-down (e.g., removed) and VMs for the updated DPI VNF are created independently by OpenStack, and VLs are allocated for each required network port. The subnet created in 1908 is attached to complete the required service chain.

In step 1924, errors are reported. In some embodiments, OpenStack is alerted of an error deploying the VM, the could not be created due to an error allocating the required memory for the VM.

In step 1926, errors are reported. In some embodiments, OpenStack sends an alert to EnterpriseWeb that VMs/VDUs could not be created in the indicated availability zone due to an error allocating memory within OpenStack. This event is interpreted and it is determined that there is no compensation available, and a rollback must be performed.

In step 1928, rollback actions are computed. In some embodiments, EnterpriseWeb uses the details of the successful interactions, attempted/failed interaction, the error reported, and a model of OpenStack to determine that the VMs and subnet(s) created in the previous steps need to be removed to return OpenStack to its pre-transaction state. The previous plan is abandoned, and a new optimized plan is generated for subsequent interactions.

In step 1930, OpenStack commands are issued via REST API. In some embodiments, EnterpriseWeb uses a model of the VIM to translate standard LCM operations to remove the previous VM and subnets created in step 1906 into specific commands—in this case issued using HTTP/REST/JSON. This initiates an independent set of actions in OpenStack as part of the choreography. Note: since no resources were allocated in step 1920 no actions are required to undo it.

In step 1932, VMs are removed. In some embodiments, the previous VMs from 1908 are spun-down (e.g., removed) and the subnet created in step 1908 is removed.

In step 1934, OpenStack is alerted of completion. In step 1936, OpenStack sends an alert to EnterpriseWeb that VMs/VDUs and subnet have been removed. This event is interpreted and it is determined that the rollback is complete, and the transaction is closed.

Figure 20:
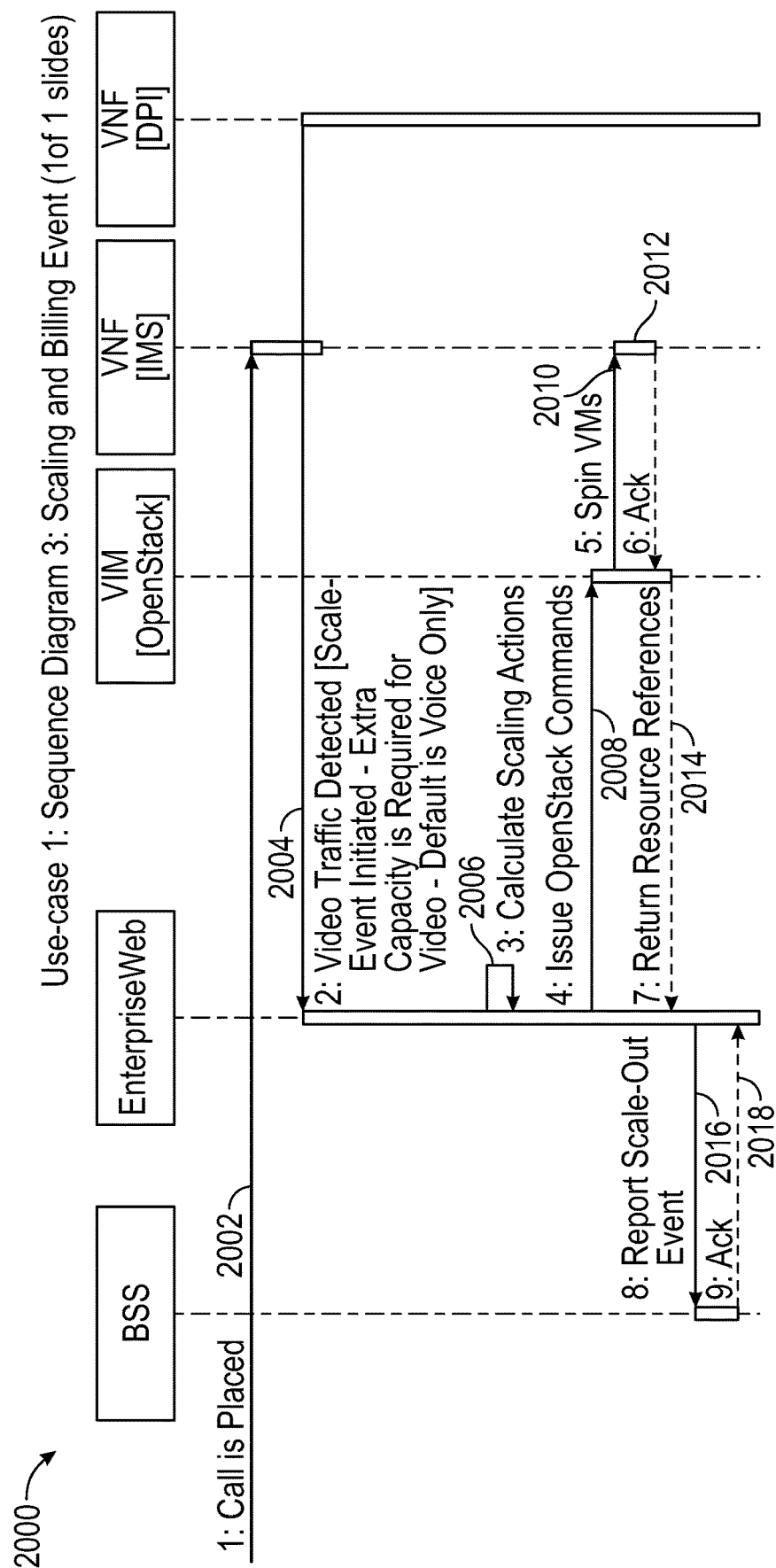
FIG. 20 depicts a sequence diagram of an example of a method of network scaling and generating billing events according to some embodiments.

FIG. 20 depicts a sequence diagram 2000 of an example of a method of network scaling and generating billing events according to some embodiments. In the example of FIG. 20, video traffic is detected during use of the service, forcing close-loop modification of the network (e.g., scaling) and billing events to be generated.

Each step in the sequence diagram corresponds to an interaction which is elaborated at an operational level below. The description below provides an elaboration of the lower-level implementation details of like-similar interactions in another sequence diagram, which are indicative of the complexity and breadth of EnterpriseWeb capabilities rendered by each step.

In step 2002, a call is placed. In some embodiments, a call is placed by a user of the system, who then initiates video on the call. SLA policies will require the service to scale, and per Billing policies, this will require a different billing package to be associated with the service.

In step 2004, video traffic is detected. In some embodiments, the DPI VNF detects the video traffic, and per the SLA, reports this to EnterpriseWeb by sending an alert.

In step 2006, scaling actions are detected. In some embodiments, EnterpriseWeb receives the alert, responding to the event by evaluating the alert against all related SLAs, and determines that it triggers a Scaling Operation. The IMS needs to be scaled out, and the new configuration needs to be reported to the BSS, an optimized plan is generated for the subsequent interactions required.

In step 2008, OpenStack commands are issued. In some embodiments, EnterpriseWeb requires additional VMs/VDUs to be created for the IMS VNF via OpenStack VIM, and for VLs to be established providing networking to each VM/VDU. EnterpriseWeb uses a model of the VIM to translate standard LCM operations to create and instantiate VMs into specific commands—in this case issued using HTTP/REST/JSON. This initiates an independent set of actions in OpenStack as part of the choreography.

In step 2010, VMs are spun up. In some embodiments, additional VMs for scaling the IMS VNF are created, and VLs are allocated for each required network port, independently by OpenStack. In step 2012, OpenStack is alerted of completion.

In step 2014, resource references are returned. In some embodiments, OpenStack sends an alert to EnterpriseWeb that the new VMs/VDUs are ready. This event is interpreted and it is determined that configuration of the VNFs is not required because they inherit the existing configuration of the IMS and Subnet. Billing will need to be adjusted.

In 2016, a scale-out event is reported. In some embodiments, EnterpriseWeb connects to the BBS system to report the update of the service so that billing is dynamically adjusted. In step 2018, BSS alerts EnterpriseWeb when complete.

Figure 21:
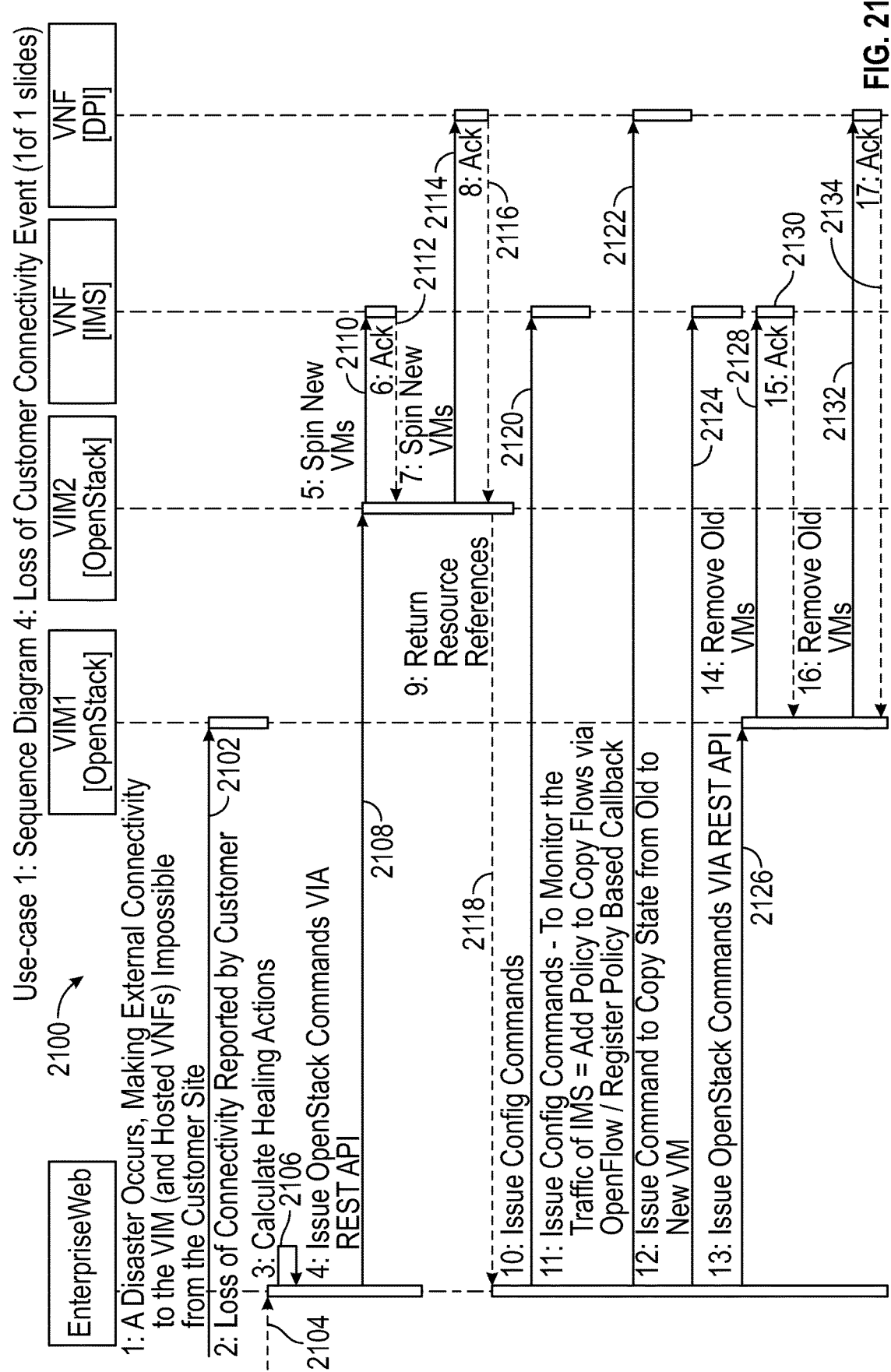
FIG. 21 depicts a sequence diagram of an example of a method of handling a loss of customer connectivity event according to some embodiments.

FIG. 21 depicts a sequence diagram 2100 of an example of a method of handling a loss of customer connectivity event according to some embodiments. In one example, a loss of connectivity is detected during use of the service, forcing close-loop modification of the network to heal, and resume service in a failover scenario. This involves automatically establishing the service in a secondary location, migrating stateful aspects of the service to the new location, and decommissioning the original service instance.

Each step in the sequence diagram corresponds to an interaction which is elaborated at an operational level below. FIGS. 22-25 provides for an elaboration of the lower-level implementation details of like-similar interactions in another sequence diagram, which are indicative of the complexity and breadth of EnterpriseWeb capabilities rendered by each step.

In step 2102, a disaster occurs making external connectivity to the VIM (e.g., and hosted VNFs) impossible from the customer site. For example, a break of a physical metro-ethernet connection between the customer and VIM (e.g., data center).

In step 2104, a loss of connectivity is reported (e.g., by a customer). For example, a customer may use a portal exposed by EnterpriseWeb to report the loss of connectivity. This is an event interpreted by the EnterpriseWeb Agent, it is verified via a simple PING test, then matched to the standard LCM Operation to Heal the service, as defined by the Network Service Model.

In step 2106, healing actions are calculated. For example, EnterpriseWeb may first determine a second physically distinct VIM (VIM 2) to migrate the service to, then resource requirements and configurations for a new deployment of the VNFs and networks are determined based on the network service model, VNF packages involved (e.g., IMS and DPI) and any related policies (e.g., scaling and billing). Further, stateful aspects of the network service are identified, in this case, the backing DB of the IMS needs to be migrated to the new instance from the old, and finally any actions required to retire the previous service instance are determined. Based on this an optimized plan is generated for subsequent interactions.

In step 2108, OpenStack issues commands via REST API. In some embodiments, EnterpriseWeb requires VMs/VDUs to be created for each VNF via OpenStack VIM, and for VLs to be established providing networking to each VM/VDU. Further, EnterpriseWeb determines there is no subnet for the new service, and adds corresponding subnet and VXLAN SDN configurations to the set of requirements. EnterpriseWeb uses a model of the VIM to translate standard LCM operations to create and instantiate VMs (e.g., for both IMS and DPI) and networks into specific commands—in this case issued using HTTP/REST/JSON. This initiates an independent set of actions in OpenStack as part of the choreography (e.g., in the new/target VIM instance).

In step 2110, new VMs are spun up. In some embodiments, VMs for the IMS VNF are created independently by OpenStack, and VLs are allocated for each required network port. As the subnet does not yet exist, it is created as part of this process and attached. In step 2112, OpenStack is alerted of completion.

In step 2114, new VMs are spun up. In some embodiments, VMs for the DPI VNF are created independently by OpenStack, and VLs are allocated for each required network port. The subnet created in step 2110 is attached to complete the required service chain. In step 2116, OpenStack is alerted of completion.

In step 2118, resource references are returned. In some embodiments, OpenStack sends an alert to EnterpriseWeb that VMs/VDUs are ready. This event is interpreted and it is determined that configuration of the VNFs is required.

In step 2120, configuration commands are issued. In some embodiments, EnterpriseWeb uses a model of the IMS VNF package to translate standard LCM operations to configure the VNF into specific commands via a format and protocol specific to the VNF—in this case issuing commands using SSH to send configuration files to the IMS VMs.

In step 2122, configuration commands are issued. For example, to Monitor the Traffic of IMS=Add Policy to Copy Flows via OpenFlow/Register Policy Based Callback may be issued. EnterpriseWeb may utilize a model of the DPI VNF package to translate standard LCM operations to configure the VNF into specific commands via a format and protocol specific to the VNF—in this case issuing OpenFlow (SDN) commands to the underlying VM, and choreographing the VNF (e.g., via REST) to alert EnterpriseWeb if it detects video traffic for the purposes of enforcing scaling and billing policies.

In step 2124, commands are issued to copy state from old VM to new VM. In some embodiments, EnterpriseWeb uses a model of the IMS VNF package to translate standard LCM operations to migrate the VNF into specific commands via a format and protocol specific to the VNF—in this case issuing commands using SSH on the new IMS VMs to stream load the contents of the previous IMS VMs DB—effectively copying the state from the previous instance to the new instance by synchronizing the DBs. This is performed for the Cassandra clusters and/or the like.

In step 2126, OpenStack commands are issued via REST API. In some embodiments, EnterpriseWeb uses a model of the VIM to translate standard LCM operations to remove the previous VM and subnets created for the original deployment into specific commands—in this case issued using HTTP/REST/JSON. This initiates an independent set of actions in OpenStack as part of the choreography.

In step 2128, old VMs are removed. For example, the previous VMs are spun-down. In step 2130, OpenStack is alerted of completion. In step 2132, old VMs are removed. The previous VMs are spun-down (e.g., removed) and any subnets created are removed. In step 2134, OpenStack is alerted of completion.

Figure 22:
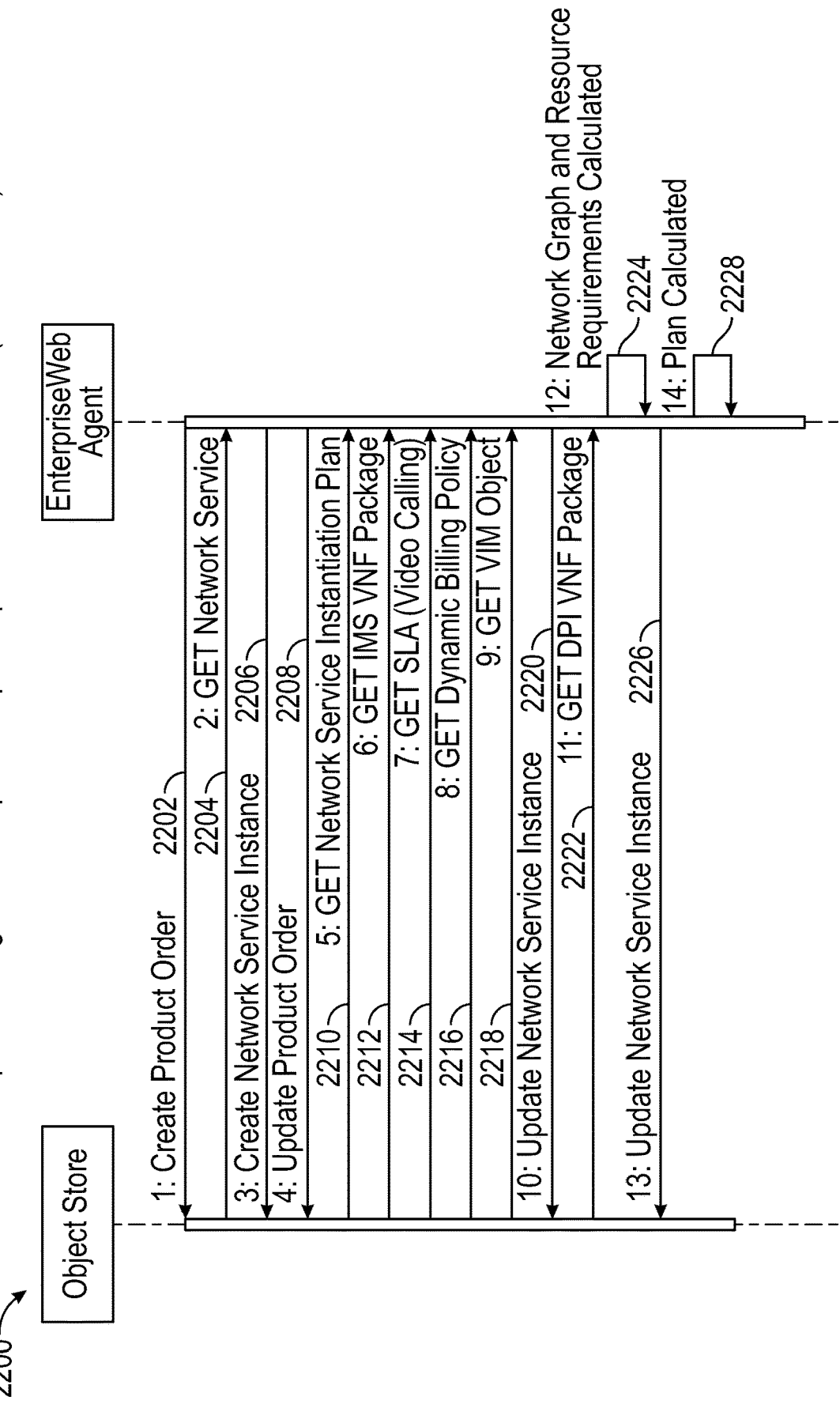
FIG. 22 depicts a sequence diagram of an example of a method of computing optical product orders according to some embodiments.

FIG. 22 depicts a sequence diagram 2200 of an example of a method of computing optical product orders according to some embodiments. Generally, FIGS. 22-25 elaborate on the lower-level implementation details of several interactions found in FIG. 18. More specifically, FIG. 22 corresponds to 1812, FIGS. 23A-C correspond to step 1814, FIGS. 24A-B correspond to step 1826, and FIG. 25 corresponds to step 1828.

In this interaction, at an operational level, a product order event is evaluated based on context. Resource requirements and configurations for VNFs and Networks are determined based on the Network Service Model, VNF packages involved (e.g., IMS and DPI) and any related policies (e.g., scaling and billing), and an optimized plan is generated for subsequent interactions.

Each step in the sequence diagram corresponds to an operation involved in the realization of the interaction. The object store is not an EnterpriseWeb module, it is a backing service utilized for persistence, acting as a shared memory/state space for the EnterpriseWeb Agent. All interactions between the object store and the EnterpriseWeb Agent are non-blocking, and represent in-process communications.

In step 2202, a product order is created. In some embodiments, a product order event is received by the EnterpriseWeb agent starting this interaction. It may have a payload that includes customer information, and may reference a network service corresponding to the product (e.g., voice calling service) which is to be instantiated. In some embodiments, a product order object must first be created/persisted to commemorate the event, and then a plan is constructed.

In step 2204, a network service is instantiated. In some embodiments, the plan will be to instantiate the referenced network service (e.g., voice calling service). The object for the service will be fetched into the agent's local memory so that a plan can be assembled based on the template it represents.

In step 2206, a network service instance is created. In some embodiments, a network service instance object must be created/persisted so that a history of interactions related to the instance can be recorded against it.

In step 2208, a product order is updated. In some embodiments, the product order object created in step 2202 may be updated to reference the newly created network service instance. This may be a non-blocking write which may occur in parallel with the next operation/step.

In step 2210, a network service instantiation plan is obtained. In some embodiments, the network service object has attached plans for normalized Lifecycle Management (LCM) Operations, in this case the instantiation plan will be fetched. In some embodiments, it is an EnterpriseWeb dataflow (e.g., intent-based) process object describing the high-level steps required, and may be used as a prototype to guide the creation of concrete plan which will be used to respond to this event (e.g., it will be contextualized once the graph of all required objects is assembled)

In step 2212, an IMS VNF package is obtained. In some embodiments, the network service object graph is walked as required to populate the network service instance and network service instantiation plan objects. The network service is composed of an IMS VNF, SLA (e.g., video calling), and dynamic billing policy. Each will be fetched in parallel. For the IMS VNF, an IMS VNF package object is fetched as it provides the model required to instantiate the VNF.

In step 2214, an SLA (e.g., video calling) is obtained. In some embodiments, the network service object graph is extended. In step 2216, a dynamic billing policy is obtained. In some embodiments, the network service object graph is extended.

In step 2218, a VIM object is obtained. For example, walking the network service object graph, the SLA is evaluated and a dependency on DPI-based functionality is discovered. However, this functionality may already be available in the deployment host. To make this determination, the service order is referenced, a target host was identified as a specific VIM (e.g., a specific OpenStack instance for which an object model is available]. That object is fetched and added to the network service instance object as it will provide both the model for communication with the host, and the source used to query the state of the host.

In step 2220, the network service instance is updated. For example, the network service instance object is updated to reflect the fact that has been associated with a particular VIM. This is a non-blocking write which will occur in parallel with the next operations.

In step 2222, a DPI VNF package is obtained. In some embodiments, the VIM object has the attached state of the target environment, and reveals that it does not have an instance of the DPI function available. This is an example of a contextual adjustment to the network service instance. At this point, if the state were not current, or policies connected to the VIM dictated it, a new interaction with the VIM could be initiated to attain the current state to make this decision, however in this instance it is not required. Since DPI is not present, it needs to be added to the network service instance object that is to be deployed, so the DPI VNF package object is fetched as it provides the model required to instantiate the VNF.

In step 2224, a network graph and resource requirements is calculated. In some embodiments, at this point, all base dependencies (e.g., related object models) have been collected for the network service instance. A network graph (e.g., sub-component of the network service instance object) is constructed and Resource Requirements are compiled. The VNF package models are walked, and it is determined that: A) The IMS package will require 5 VDUs based on its VNFC requirements with VLs connecting all VDUs in a private subnet with an external port for SIP traffic and an external port for HTTP-based management traffic being exposed; B) The DPI package will require 1 VDU, must be placed in the subnet where packets are to be monitored and an external port for HTTP-based management traffic must be exposed; and, C) VLs exposing SIP traffic from the IMS VNF must be exposed to the DPI VNF VLs. For each VDU identified, resource requirements for CPU, RAM, disk, network I/O are parameterized as a constraint satisfaction algorithm as guided by the VIM object state and metadata. The resulting network graph sees the VDUs connected on a single subnet.

In step 2226, the network service instance is updated. For example, the network service instance object is updated to reflect the calculated resource requirements and network graph. This is a non-blocking write which will occur in parallel with the next operations.

In step 2228, a plan is calculated. In some embodiments, the network service instantiation plan object will now be updated based on the Network Graph. In particular, since it was determined the subnet (e.g., networking) required for the Service does not yet exist, it will need to be created at the start of the plan during any resource coordination/orchestration phases of the deployment. And per the prototype, service configuration will follow successful resource allocation, and in parallel the BSS can be alerted to the appropriate BSS billing package for the service since that is derived entirely from the results of resource allocation. Based on this, the next set of planned interactions will be: A) coordinate resources (step 2214, and discussed further elsewhere herein), B) In parallel to: coordinate the 2 VNFs (step 2226, and discussed further elsewhere herein; and, step 2228, and discussed further elsewhere herein) and update the BSS (step 2230).

Figure 23A:
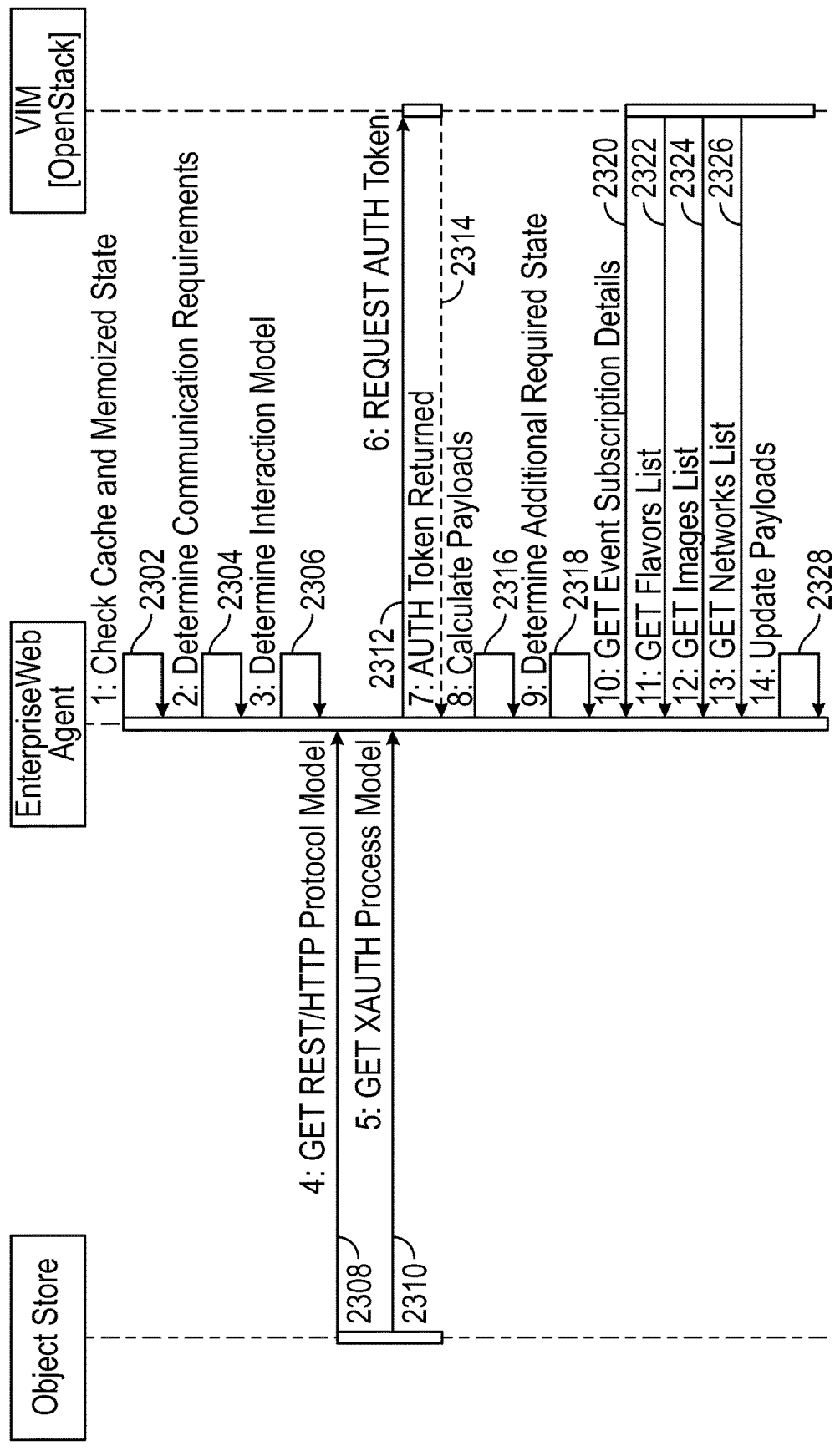
FIGS. 23A-C depict sequence diagrams of an example method of coordinating resources according to some embodiments.
Figure 23B:
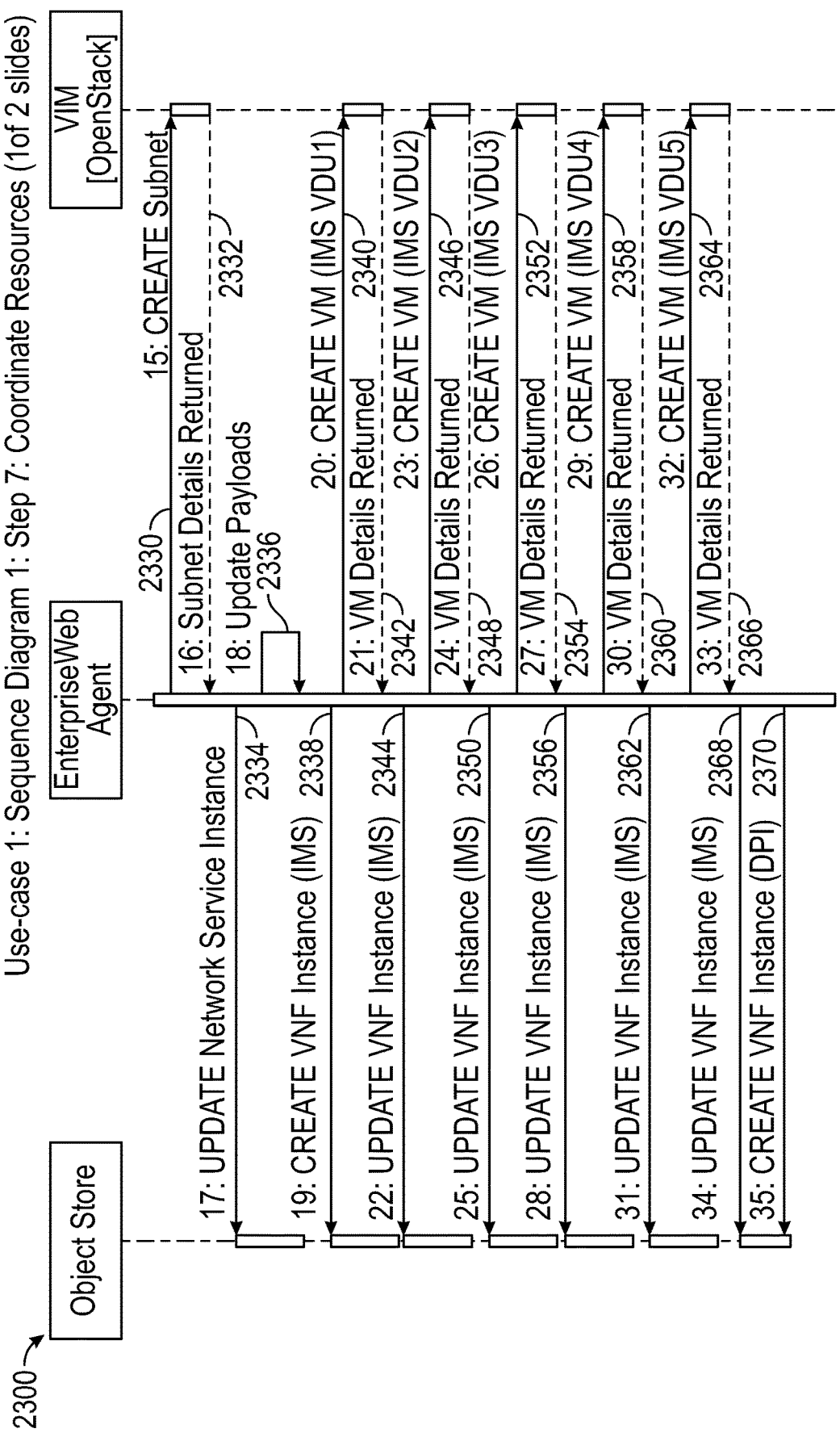
Figure 23C:
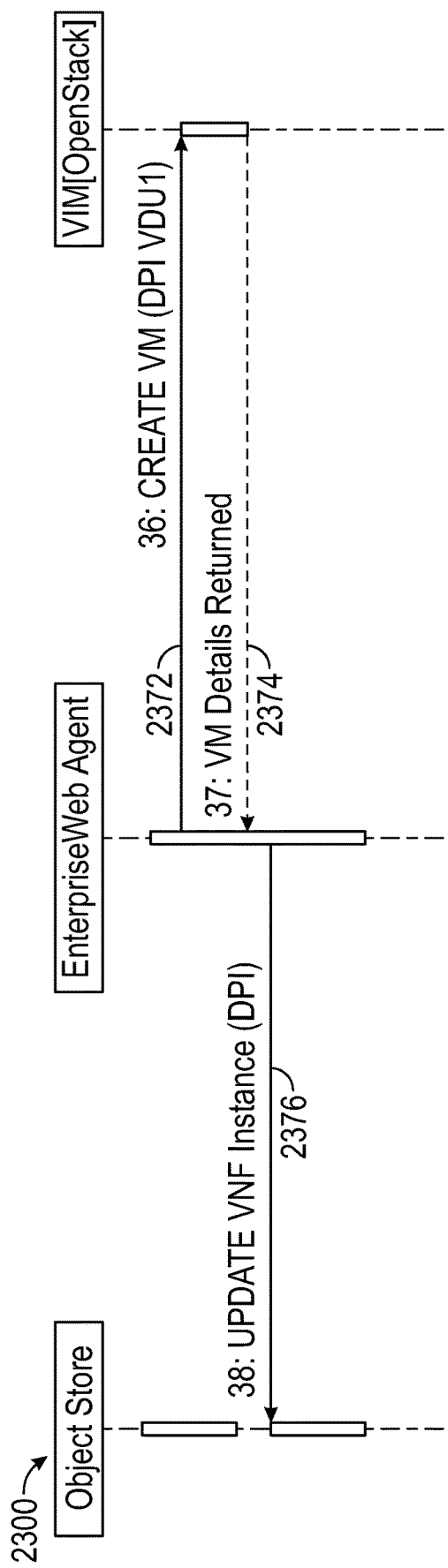

FIGS. 23A-C depict sequence diagrams 2300 of an example method of coordinating resources according to some embodiments. In the sequence diagram the step is labeled "Issue OpenStack Commands VIA REST API", but more generally the interaction is to "Coordinate Resources" for the deployment of VNFs, Networking, and/or the like.

In this interaction, at an operational level, EnterpriseWeb requires VMs/VDUs to be created for each VNF via OpenStack VIM, and for VLs to be established providing networking to each VM/VDU. Further, EnterpriseWeb determines there is no subnet for the new service, and adds corresponding subnet and VXLAN SDN configurations to the set of requirements. EnterpriseWeb uses a model of the VIM to translate standard LCM operations to create and instantiate VMs (e.g., for both IMS and DPI) and networks into specific commands—in this case issued using HTTP/REST/JSON. This initiates an independent set of actions in OpenStack as part of the choreography.

Each step in the sequence diagram corresponds to an operation involved in the realization of the interaction. In some embodiments, the object store is not an EnterpriseWeb module, it is a backing service utilized for persistence, acting as a shared memory/state space for the EnterpriseWeb Agent. All interactions between the object store and the EnterpriseWeb Agent are non-blocking, and represent in-process communications. All communications between EnterpriseWeb the VIM (e.g., OpenStack) represent inter-process communications.

In step 2302, cache and memoized state is checked. In some embodiments, to carry out the interaction, EnterpriseWeb first checks if the needed objects are in memory to minimize the set of required operations required, even with its own object store. In this case, the network service object, referenced VNF packages (e.g., IMS and DPI), network service instance object will be needed but have already been cached as a result of earlier interactions, and the network service instantiation plan will be required but is already in memory (e.g., it is a part of the memoized state being maintained by the Agent as it carries out the transaction), so no additional data needs to be fetched to start carrying out the interaction.

In step 2304, communication requirements are determined. In some embodiments, the VIM object is queried to determine the correct management ports and connection policies. In this case, HTTP/REST will be used for the communication protocol, JSON will be the payload format and an XAuth authentication scheme is in place.

In step 2306, an interaction model is determined. In some embodiments, based on the earlier generated plan and the VIM object, it is determined that the interaction model will consist of an initiate authentication request directed by the XAuth authentication scheme using REST, then a series of API calls translated directly from the network service instantiation plan configured per the details of each related VNF package object.

In step 2308 a REST/HTTP protocol model is obtained. In some embodiments, since the REST/HTTP protocol model object has not previously been used in the transaction, it will be fetched from the object store.

In step 2310, an XAUTH Process Model is obtained. In some embodiments, since the XAUTH Process Model Protocol has not previously been used in the transaction, it will be fetched from the object store.

In step 2312, an AUTH Token is requested. In some embodiments, a REST request (POST) is sent to the management port of OpenStack to generate a token for all further API interactions with OpenStack. It is parameterized with the login credentials, tenant ID and auth-codes found in the VIM object.

In step 2314, the AUTH Token is returned. In some embodiments, the response token is memoized in the EnterpriseWeb Agent so it can be used in future operations.

In step 2316, payloads are calculated. In some embodiments, JSON payloads to create the Subnet, 5 VMs for the IMS VDUs with VLs connecting to the Subnet, and 1 VM for the DPI VDUs with VLs connecting to the Subnet are generated by transforming the Resource Requirements found in the network service instance object.

In step 2318, additional required state is determined. In some embodiments, the resulting JSON payloads are "underspecified" in that they require specific IDs and other properties from the target VIM to be executable/to be used in API calls with the VIM. Further, based on the interaction model it is determined that a callback mechanism exists in OpenStack to report the completion of asynchronous actions. Details about callbacks related to EnterpriseWeb need to be determined, and lists (e.g., catalogs) of flavors, images and networks are required to contextualized the payloads.

In step 2320, event subscription details are obtained. In some embodiments, a REST request (GET) is sent to the management port of OpenStack to get a list of Events subscribed to by EnterpriseWeb. This request has the attached auth-token returned in step 2312. The resulting information shows EnterpriseWeb is already subscribed, otherwise an interaction to add its subscription would be placed. These requests for additional state (steps 2322-2328) are performed in parallel.

In step 2322, a flavors list is obtained. In some embodiments, a REST request (GET) is sent to the management port of OpenStack to get a list of Flavors. This request has the attached auth-token returned in step 2312. These results are memoized within the EnterpriseWeb Agent for further processing of context.

In step 2324, an images list is obtained. In some embodiments, a REST request (GET) is sent to the management port of OpenStack to get a list of images. This request has the attached auth-token returned in step 2312. These results are memoized within the EnterpriseWeb agent for further processing of context.

In step 2326, a networks list is obtained. In some embodiments, a REST request (GET) is sent to the management port of OpenStack to get a list of networks. This request has the attached auth-token returned in step 2312. These results are memoized within the EnterpriseWeb agent for further processing of context.

In step 2328, payloads are updated. In some embodiments, the memoized results of steps 2322-2326 are used to update the JSON payloads for ordering the Subnet by substituting in the proper access/external network. The JSON payloads for ordering the VMs are updating to include best match image and Flavor references available (e.g., calculated via a constraint satisfaction algorithm matching the VNF package object requirements to the specifications of the available flavors). However, the VM orders are still incomplete as the subnet does not yet exist.

In step 2330, a subnet is created. As the only complete operation available, the order to create the Subnet is executed. A REST request (POST) is sent to the management port of OpenStack to create the subnet per the payload completed in step 2328. This request has the attached auth-token returned in step 2312.

In step 2332, subnet details are returned. In some embodiments, the subnet is created independently/asynchronously in OpenStack as a result of step 2330 (e.g., coordination of the external actor), however the ID of the subnet is returned synchronously while it is being created, which the EnterpriseWeb agent memoizes and can use to complete the other payloads.

In step 2334, the network service instance is updated. In some embodiments, the network service instance object is updated to reflect the ID of the Subnet being created. This is a non-blocking write which will occur in parallel with the next operation.

In step 2336, payloads are updated. In some embodiments, the memoized results of step 2332, in particular, the ID of the subnet, is substituted into the JSON payloads for the VMs to be created, completing their orders. At this time, all other orders (e.g., and connected operations) will be placed in parallel.

In step 2338, a VNF instance (IMS) is created. In some embodiments, creating the first VDU is the start of the Lifecycle for the VNF instance, so a VNF instance object is created/persisted so that a history of interactions related to the instance can be recorded against it. It includes references to the VNF package object (IMS) and the associated network service instance object.

In step 2340, a VM (IMS VDU1) is created. In some embodiments, a REST request (POST) is sent to the management port of OpenStack to create the VDU per the payload completed in step 2336. This request has the attached auth-token returned in step 2312.

In step 2342, VM details are returned. In some embodiments, the VM is created independently/asynchronously in OpenStack as a result of step 2330 (coordination of the external actor), however the ID of the VM is returned synchronously while it is being created.

In step 2344, the VNF instance (IMS) is updated.

In step 2346, a VM (IMS VDU2) is created. In some embodiments, a REST request (POST) is sent to the management port of OpenStack to create the VDU per the payload completed in step 2336. This request has the attached auth-token returned in step 2312.

In step 2348, VM details are returned. In some embodiments, the VM is created independently/asynchronously in OpenStack as a result of step 2330 (coordination of the external actor), however the ID of the VM is returned synchronously while it is being created.

In step 2350, the VNF instance (IMS) is updated. In some embodiments, the VNF instance is updated with the ID of the VM corresponding to the instantiated VDU.

In step 2352, a VM (IMS VDU3) is created. In some embodiments, a REST request (POST) is sent to the management port of OpenStack to create the VDU per the payload completed in step 2336. This request has the attached auth-token returned in step 2312.

In step 2354, VM details are returned. In some embodiments, the VM is created independently/asynchronously in OpenStack as a result of step 2330 (coordination of the external actor), however the ID of the VM is returned synchronously while it is being created.

In step 2356, the VNF instance (IMS) is updated. In some embodiments, the VNF instance is updated with the ID of the VM corresponding to the instantiated VDU.

In step 2358, a VM (IMS VDU4) is created. In some embodiments, a REST request (POST) is sent to the management port of OpenStack to create the VDU per the payload completed in step 2336. This request has the attached auth-token returned in step 2312.

In step 2360, VM details are returned. In some embodiments, the VM is created independently/asynchronously in OpenStack as a result of step 2330 (coordination of the external actor), however the ID of the VM is returned synchronously while it is being created.

In step 2362, the VNF instance (IMS) is updated. In some embodiments, the VNF instance is updated with the ID of the VM corresponding to the instantiated VDU.

In step 2364, a VM (IMS VDU5) is created. In some embodiments, a REST request (POST) is sent to the management port of OpenStack to create the VDU per the payload completed in step 2336. This request has the attached auth-token returned in step 2312.

In step 2366, VM details returned. In some embodiments, the VM is created independently/asynchronously in OpenStack as a result of step 2330 (coordination of the external actor), however the ID of the VM is returned synchronously while it is being created.

In step 2368, the VNF instance (IMS) is updated. In some embodiments, the VNF instance is updated with the ID of the VM corresponding to the instantiated VDU.

In step 2370, a VNF instance (DPI) is created. In some embodiments, creating the first VDU is the start of the Lifecycle for the VNF instance, so a VNF instance object is created/persisted so that a history of interactions related to the instance can be recorded against it. It includes references to the VNF package object (DPI) and the associated network service instance object.

In step 2372, a VM (DPI VDU1) is created. In some embodiments, a REST request (POST) is sent to the management port of OpenStack to create the VDU per the payload completed in step 2336. This request has the attached auth-token returned in step 2312.

In step 2374, VM details are returned. In some embodiments, the VM is created independently/asynchronously in OpenStack as a result of step 2330 (coordination of the external actor), however the ID of the VM is returned synchronously while it is being created.

In step 2376, the VNF instance (DPI) is updated. In some embodiments, the VNF instance is updated with the ID of the VM corresponding to the instantiated VDU.

Figure 24A:
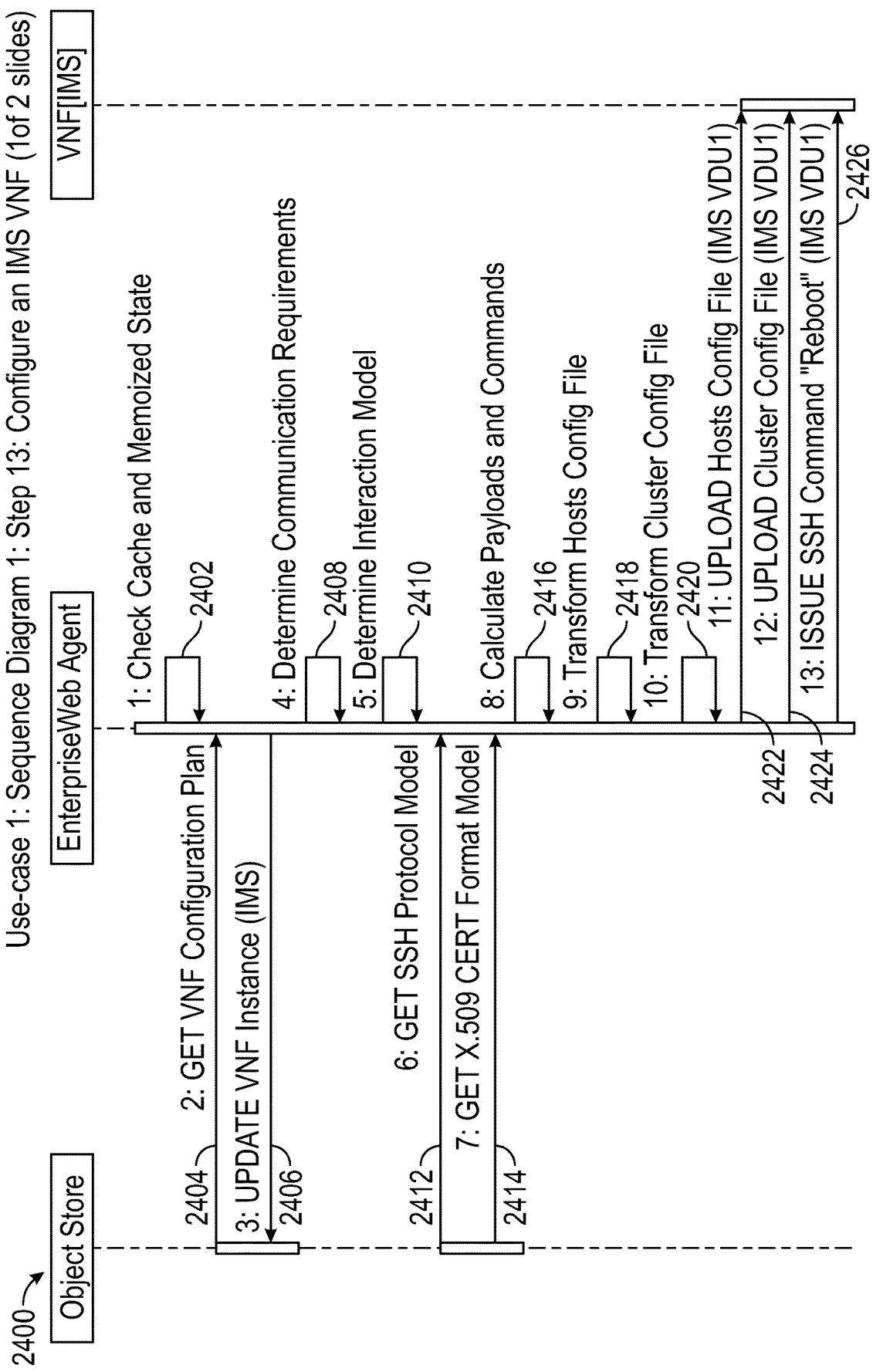
FIGS. 24A-B depict sequence diagrams of an example method of configuring an IMS VNF according to some embodiments.
Figure 24B:
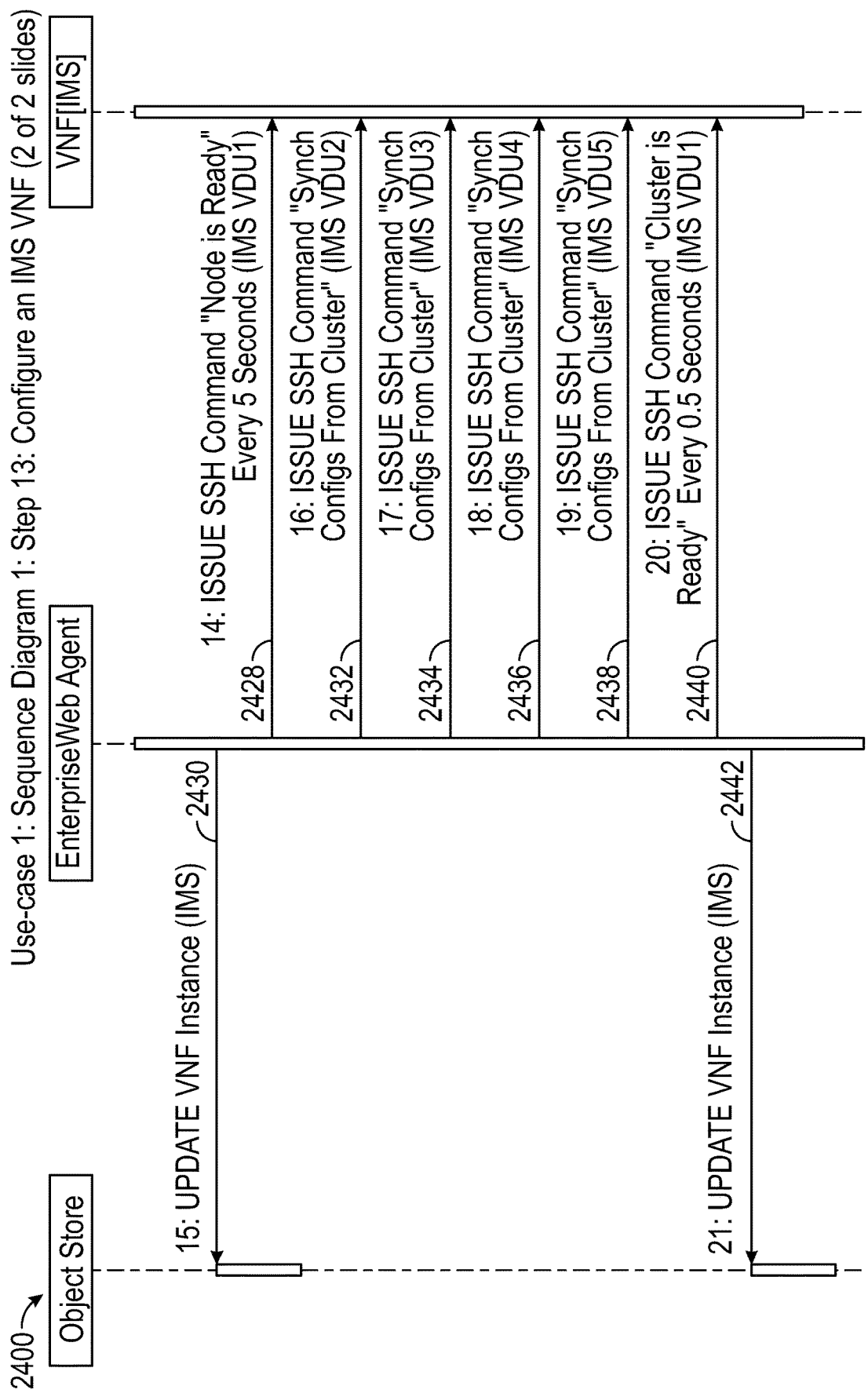

FIGS. 24A-B depict sequence diagrams 2400 of an example method of configuring an IMS VNF according to some embodiments. In the sequence diagram the step is labeled "Issue Config Commands", an interaction to Configure an IMS VNF.

In this interaction, at an operational level, EnterpriseWeb uses a model of the IMS VNF package to translate standard LCM operations to configure the VNF into specific commands via a format and protocol specific to the VNF—in this case issuing commands using SSH to send configuration files to the IMS VMs.

Each step in the sequence diagram corresponds to an operation involved in the realization of the interaction. In some embodiments, the object store is not an EnterpriseWeb module, it is a backing service utilized for persistence, acting as a shared memory/state space for the EnterpriseWeb agent. All interactions between the object store and the EnterpriseWeb agent are non-blocking, and represent in-process communications. All communications between EnterpriseWeb and the VNF [IMS] represent inter-process communications.

In step 2402, the cached and memoized state are checked. In some embodiments, to carry out the interaction, EnterpriseWeb first checks if the needed objects are in memory to minimize the set of required operations required, even with its own object store. In this case, the network service object, referenced VNF package (DPI), network service instance object will be needed but have already been cached as a result of earlier interactions, and the network service instantiation plan will be required but is already in memory (e.g., it is a part of the memoized state being maintained by the agent as it carries out the transaction), so no additional data needs to be fetched to start carrying out the interaction.

In step 2404, a VNF configuration plan is obtained. In some embodiments, the VNF package object has attached plans for normalized LCM operations, in this case the configuration plan will be fetched. It is an EnterpriseWeb dataflow (e.g., intent-based) process object describing the high-level steps required, and will be used as a prototype to guide the concrete interaction to configure the VNF.

In step 2406, the VNF instance (IMS) is updated. In some embodiments, the VNF instance object is updated to reflect that a configuration process has been initiated.

In step 2408, communication requirements are determined. In some embodiments, the VNF instance object is queried to determine the correct management ports (e.g., mapping to the VL specified in the related VNF package object), and based on the related VNF package it is determined that SSH will be used to communicate with the VNF instance, and that each instance is secured using an X.509 Cert.

In step 2410, an interaction model is determined. For example, based on the configuration plan and the related VNF package, it is determined that the interaction model will consist of the generation of a host config file (e.g., to map cluster node names to IP addresses), the generation of a cluster config file (e.g., to point the instance to an HSS specified in the original product order object) and to carry out a set of SSH commands to upload these files to specific VDUs in the cluster and execute commands so they are synchronized throughout.

In step 2412, an SSH protocol model is obtained. In some embodiments, objects for the XML format, JSON Format and other dependencies are already in the Cache, but an SSH protocol model object and an X.509 CERT format model object are both required and are fetched from the object store in parallel in this and step 2414.

In step 2414, an X.509 CERT format model is obtained. May be fetched in parallel with step 2412 to complete the dependency graph required for the interaction.

In step 2416, payloads and commands are calculated. For example, using the protocol model objects, the interaction model of step 2410 is translated into specific operations to generated the needed config files steps 2418 and 2420) and then a set of commands (steps 2420-2440) which are issued in a logical sequence to minimize the number of system-to-system operations required to complete the configuration.

In step 2418, a hosts config file is transformed. In some embodiments, when the hosts config file is generated, it is an XML file created through application of an XSLT to the network service instance, mapping its properties to a format consumable by the IMS.

In step 2420, a cluster config file is transformed. In some embodiments, when the cluster config file is generated, it is an XML file created through application of an XSLT to the network service instance, mapping its properties to a format consumable by the IMS.

In step 2422, the hosts config file (IMS VDU1) is uploaded. In some embodiments, an SSH (SFTP) command generated in step 2416 is sent to the management port of IMS VDU1 to upload the Host Config File generated in step 2418, using the Cert found in the VNF instance object per the X.509 CERT Format object fetched in step 2414.

In step 2424, the cluster config file (IMS VDU1) is uploaded. In some embodiments, an SSH (SFTP) command generated in step 2416 is sent to the management port of IMS VDU1 to upload the Cluster Config File generated in step 2418, using the Cert found in the VNF instance object per the X.509 CERT Format object fetched in step 2414.

In step 2426, an SSH Command "Reboot" (IMS VDU1) is issued. In some embodiments, an SSH command generated in step 2416 is sent to the management port of IMS VDU1 to reboot the node, per the interaction flow indicated by the VNF configuration plan object, using the Cert found in the VNF instance object per the X.509 CERT Format object fetched in step 2414.

In step 2428, an SSH command "Node Is Ready" is issued (e.g., every 5 seconds (IMS VDU1)). In some embodiments, since the IMS has no native callback mechanism, the interaction flow indicated by the VNF configuration plan object requires it to be polled, this is done by issuing an SSH command generated in step 2416 to the management port of IMS VDU1 which returns true when the node is back to operational state, using the Cert found in the VNF instance object per the X.509 CERT format object fetched in step 2414. This is checked every 5 seconds per the configuration plan (e.g., with thresholds for error conditions present to know when/if to abandon and apply compensations), the subsequent operations then resume when this polling indicates the previous operations have completed.

In step 2430, the VNF instance (IMS) is updated. In some embodiments, the network service instance Object is updated to reflect the process of the configuration (e.g., because at this point, if a failure were to occur rollback of the deployed configuration may be required). This is a non-blocking write which will occur in parallel with the next operation.

In step 2432, an SSH command "Synch Configs From Cluster" (IMS VDU2) is issued. In some embodiments, an SSH command generated in step 2416 is sent to the management port of IMS VDU2 to synchronize the node (e.g., this forces it to download the configuration files from VDU1), per the interaction flow indicated by the VNF configuration plan object, using the Cert found in the VNF instance object per the X.509 CERT format object fetched in step 2414.

In step 2434, an SSH command "Synch Configs From Cluster" (IMS VDU3) is issued. In some embodiments, an SSH command generated in step 2416 is sent to the management port of IMS VDU3 to synchronize the node (e.g., this forces it to download the configuration files from VDU1), per the interaction flow indicated by the VNF configuration plan object, using the Cert found in the VNF instance object per the X.509 CERT format object fetched in step 2414.

In step 2436, an SSH command "Synch Configs From Cluster" (IMS VDU4) is issued. In some embodiments, an SSH command generated in step 2416 is sent to the management port of IMS VDU4 to synchronize the node (e.g., this forces it to download the configuration files from VDU1), per the interaction flow indicated by the VNF configuration plan object, using the Cert found in the VNF instance object per the X.509 CERT format object fetched in step 2414.

In step 2438, an SSH command "Synch Configs From Cluster" (IMS VDU5) is issued. In some embodiments, an SSH command generated in step 2416 is sent to the management port of IMS VDU5 to synchronize the node (e.g., this forces it to download the configuration files from VDU1), per the interaction flow indicated by the VNF configuration plan object, using the Cert found in the VNF instance object per the X.509 CERT format object fetched in step 2414.

In step 2440, an SSH Command "Cluster Is Ready" (e.g., every 0.5 seconds) (IMS VDU1) is issued. In some embodiments, since the IMS has no native callback mechanism, the interaction flow indicated by the VNF configuration plan object requires it to be polled, this is done by issuing an SSH command generated in step 2416 to the management port of IMS VDU1 which returns true when the cluster is back to operational state, using the Cert found in the VNF instance object per the X.509 CERT format object fetched in step 2414. This is checked every 0.5 seconds per the Configuration Plan (e.g., with thresholds for error conditions present to know when/if to abandon and apply compensations), the subsequent operations then resume when this polling indicates the previous operations have completed.

In step 2442, the VNF instance (IMS) is updated. In some embodiments, when cluster polling completes successfully the state of the VNF instance object is updated to "configured"/"ready".

Figure 25:
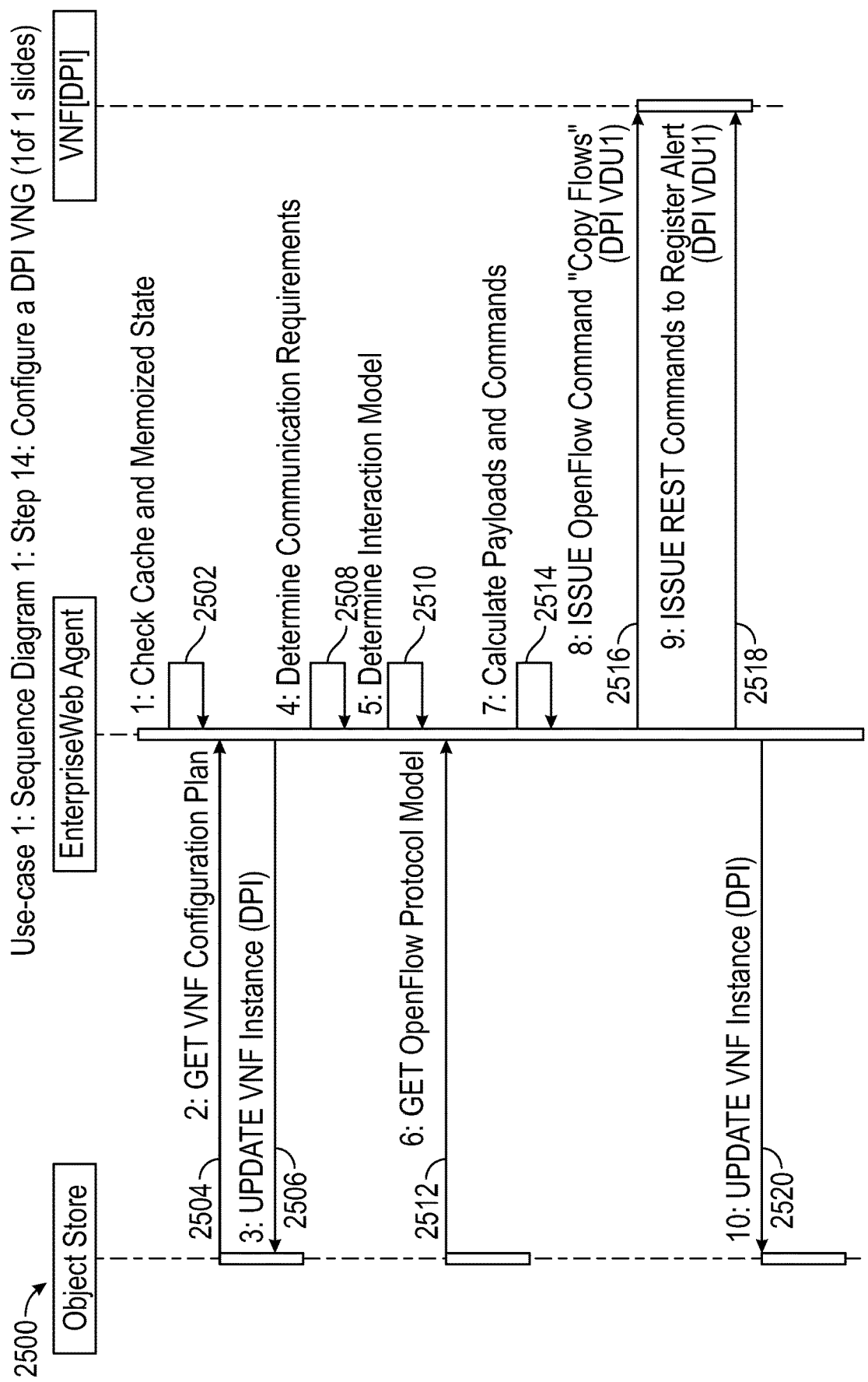
FIG. 25 depicts a sequence diagram of an example of a method of configuring a Deep Packet Inspection (DPI) VNF according to some embodiments.

FIG. 25 depicts a sequence diagram 2500 of an example of a method of configuring a Deep Packet Inspection (DPI) VNF according to some embodiments. In the sequence diagram the step is labeled "Issue Config Commands—To Monitor the Traffic of IMS=Add Policy to Copy Flows via OpenFlow/Register Policy Based Callback", referring to an interaction to Configure a DPI VNF.

In this interaction, at an operational level, EnterpriseWeb, in some embodiments, uses a model of the DPI VNF package to translate standard LCM operations to configure the VNF into specific commands via a format and protocol specific to the VNF—in this case issuing OpenFlow (SDN) commands to the underlying VM, and choreographing the VNF (e.g., via REST) to alert EnterpriseWeb if it detects video traffic for the purposes of enforcing scaling and billing policies.

Each step in the sequence diagram corresponds to an operation involved in the realization of the interaction. The object store is not an EnterpriseWeb module, it is a backing service utilized for persistence, acting as a shared memory/state space for the EnterpriseWeb agent. All interactions between the object store and the EnterpriseWeb agent are non-blocking, and represent in-process communications. All communications between EnterpriseWeb and the VNF [DPI] represent inter-process communications.

In step 2502, the cache and/or memoized state is checked. For example, to carry out the interaction, EnterpriseWeb first checks if the needed Objects are in memory to minimize the set of required operations required, even with its own object store. In this case, the network service object, referenced VNF package (DPI), network service instance Object will be needed but have already been cached as a result of earlier interactions, and the network service instantiation plan will be required but is already in memory (e.g., it is a part of the memoized state being maintained by the agent as it carries out the transaction), so no additional data needs to be fetched to start carrying out the interaction.

In step 2504, a VNF configuration plan is obtained. For example, the VNF package object has attached plans for normalized Lifecycle Management Operations, in this case the configuration plan will be fetched. It is an EnterpriseWeb dataflow (e.g., intent-based) Process Object describing the high-level steps required, and will be used as a prototype to guide the concrete interaction to configure the VNF.

In step 2506, the VNF instance (DPI) is updated. For example, the VNF instance object is updated to reflect that a configuration process has been initiated.

In step 2508, a communication requirements is determined. For example, the VNF instance object is queried to determine the correct management port (e.g., mapping to the VL specified in the related VNF package object), and based on the related VNF package it is determined that both OpenFlow and REST/HTTP will be used to communicate with the VNF instance.

In step 2510, an interaction model is determined. For example, based on the configuration plan and the related VNF package, it is determined that the interaction model will consist of an OpenFlow command to copy flows from the established subnet with the function under test (IMS) to the DPI instance, and then a callback must be registered in the DPI so that it monitors the right KPI (e.g., presence of video traffic in the packets) and sends an event back to EnterpriseWeb.

In step 2512, an OpenFlow protocol model is obtained. For example, objects for the REST/HTTP Protocol, the JSON Format and other dependencies are already in the Cache, but an OpenFlow Protocol Model Object is required and is fetched from the object store.

In step 2514, payloads and commands are calculated. For example, using the protocol model objects, the Interaction Model of 5 is translated into specific commands (step 2516 and step 2518) which are issued in parallel.

In step 2516, an OpenFlow command "Copy Flows" (DPI VDU1) is issued. For example, the OpenFlow command generated in step 2514 is sent to the management port of DPI VDU.

In step 2518, a REST commands to register alert (DPI VDU1) is issued. For example, a REST PUT is performed against DPI VDU1, on the management port, sending an order to report when the "Video Present" KPI switches from FALSE to TRUE by sending an event to the EnterpriseWeb agent.

In step 2520, the VNF instance (DPI) is updated. For example, when all issued commands complete successfully (e.g., in any order) the state of the VNF instance object is updated to "configured"/"ready".

Figure 26:
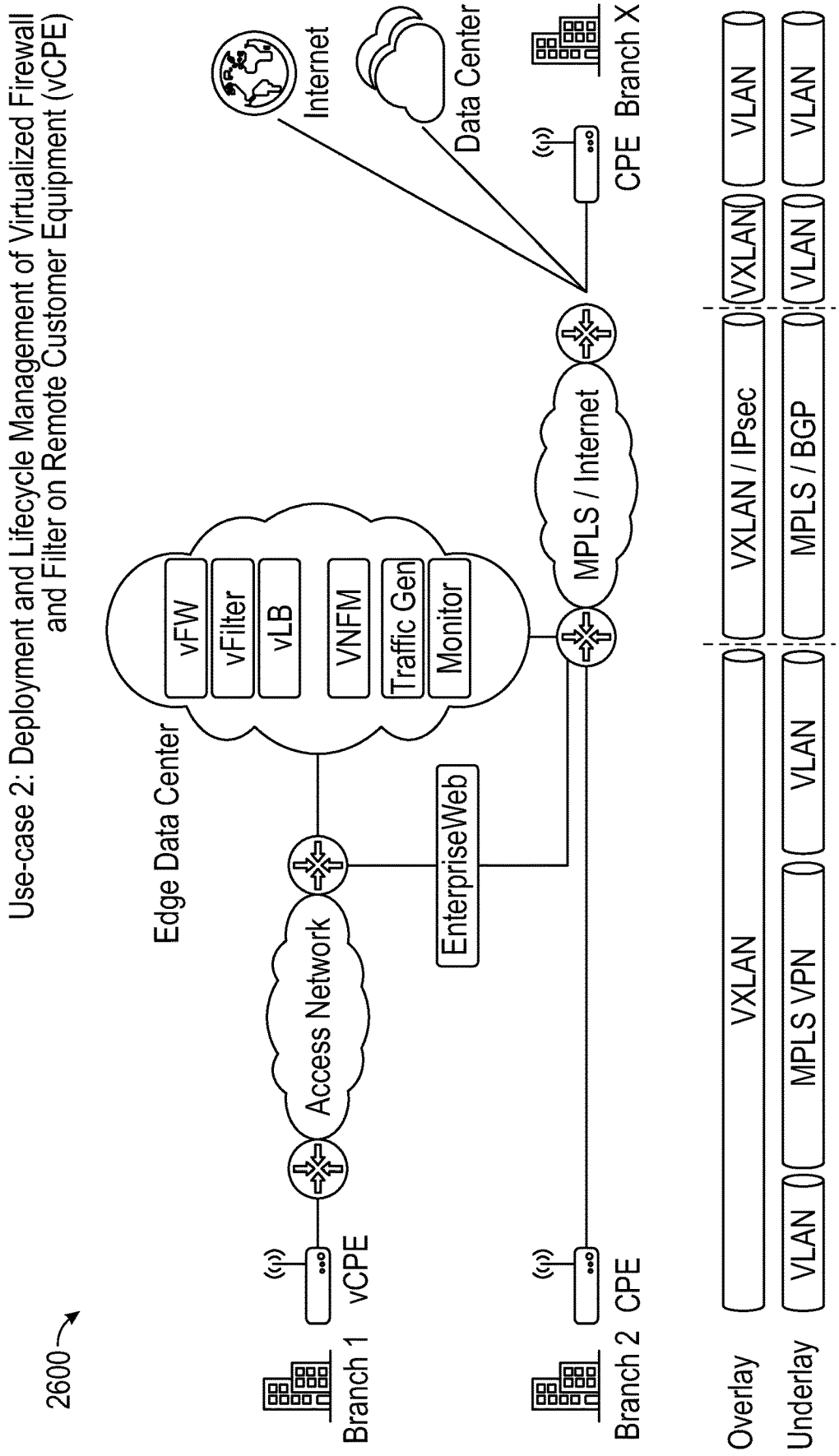
FIG. 26 depicts a diagram of an example system for deployment and lifecycle management if virtualized firewalls and filters on remote customer equipment (vCPE) according to some embodiments.

FIG. 26 depicts a diagram 2600 of an example system for deployment and lifecycle management if virtualized firewalls and filters on remote customer equipment (vCPE) according to some embodiments.

This use-case automates the creation of a vCPE instance for a branch office. It configures the networking for the vCPE device and manages the lifecycle of VNFs components (e.g., the virtual services utilized by the device) within the edge network, including the licensing of components and testing of the end-to-end service.

In some embodiments, an instance of EnterpriseWeb provides an OSS, which can be used to order products, in this case a "vCPE with Firewall and Filter". The product is realized as a network service chain comprised of a virtual Firewall (VNF) and virtual Filter (VNF) with paired virtual Load Balancer to manage scale. The service chain is deployed into an edge data center. An Access Network connects the data center to the vCPE device.

In some embodiments, EnterpriseWeb choreographs the deployment of all service elements, including the federated use of 3rd Party Controllers (NFVO and VNFM) to manage VNF instances, the configuration of each VNF, the configuration of the underlying SDN-controllers, and automated testing/verification of the end-to-end vCPE before it is released for use by the customer. EnterpriseWeb also acts as a model-based event-listener to respond intelligently to all events related to the service, and through the entire lifecycle of the service acts as a Executive Transaction Manager to make sure all interactions have guarantees, compensations and rollback as required.

In the diagram, the vCPE appears attached to Branch 1, connecting it through the service chain with the Internet, and potentially other data centers or branch offices.

Examples and Example Implementations

| | |
|---|---|
| Application and Computing Resources | VIM Adaptor (OpenStack) |
| | vCPE Device Adaptor |
| Each is onboard to the system using a model-based process: mapping properties/behaviors to the metamodel, and defining standards-based LCM operations. | SDN Controller Adaptor |
| | vFW VNF Package |
| | vFilter VNF Package |
| | vLB VNF Package |
| | VNFM Adaptor ($3^{rd}$ Party Controller) |
| | Traffic Generator Interface |
| | Resource Monitor Interface |
| Micro-capabilities Set of business/IT functions and middleware/platform services enabling the set of desired/necessary operations over other objects to connect, configure, control, coordinate. | Service Orchestration Functions (Coordinate Actors, Route Events/Messages, Coordinate Component Licenses) |
| | VIM interface (Instantiate VM/VDU, Terminate VM/VDU, Scale VM/VDU, etc.) |
| | VNFM interface (Deploy VNF, Start VNF, Stop VNF, etc.) |
| | Product Order interface (List Products, Get Product Spec, Place Order, etc.) |
| | Catalog interface (List Objects, Get Object, Add Object, etc.) |
| | Configure VNF (Adjust Config Files, Transfer Configs, Execute Scripts, Install License) |
| | SDN Interface (Configure Virtual Links, Establish Service Chain, Install Routing Policy) |
| | Testing interface (Configure Test Plan, Execute Test Plan) |
| | Protocol/Format translation and transformation |
| | Distributed Transaction Management |
| Composed Models | Network Service = vCPE + vFW VNF Package + vFilter VNF Package + vLB VNF Package + Network Connection Graph + Network Service Chain + SLA Model (Filter CPU Consumption) |
| | SLA (Filter CPU Consumption): |
| |   KPI: average CPU of all Filter VMs > threshold |
| |     KPI measured via Resource Monitor |
| |     Resource Monitor reports event (Fault) to EnterpriseWeb if KPI violated. |
| |     Resource Monitor also available to query for compliance. |
| |     LCM Operation: scale out filter |
| |   Constraint: service state cannot be set to active until SLA is in compliance. |

Figure 27A:
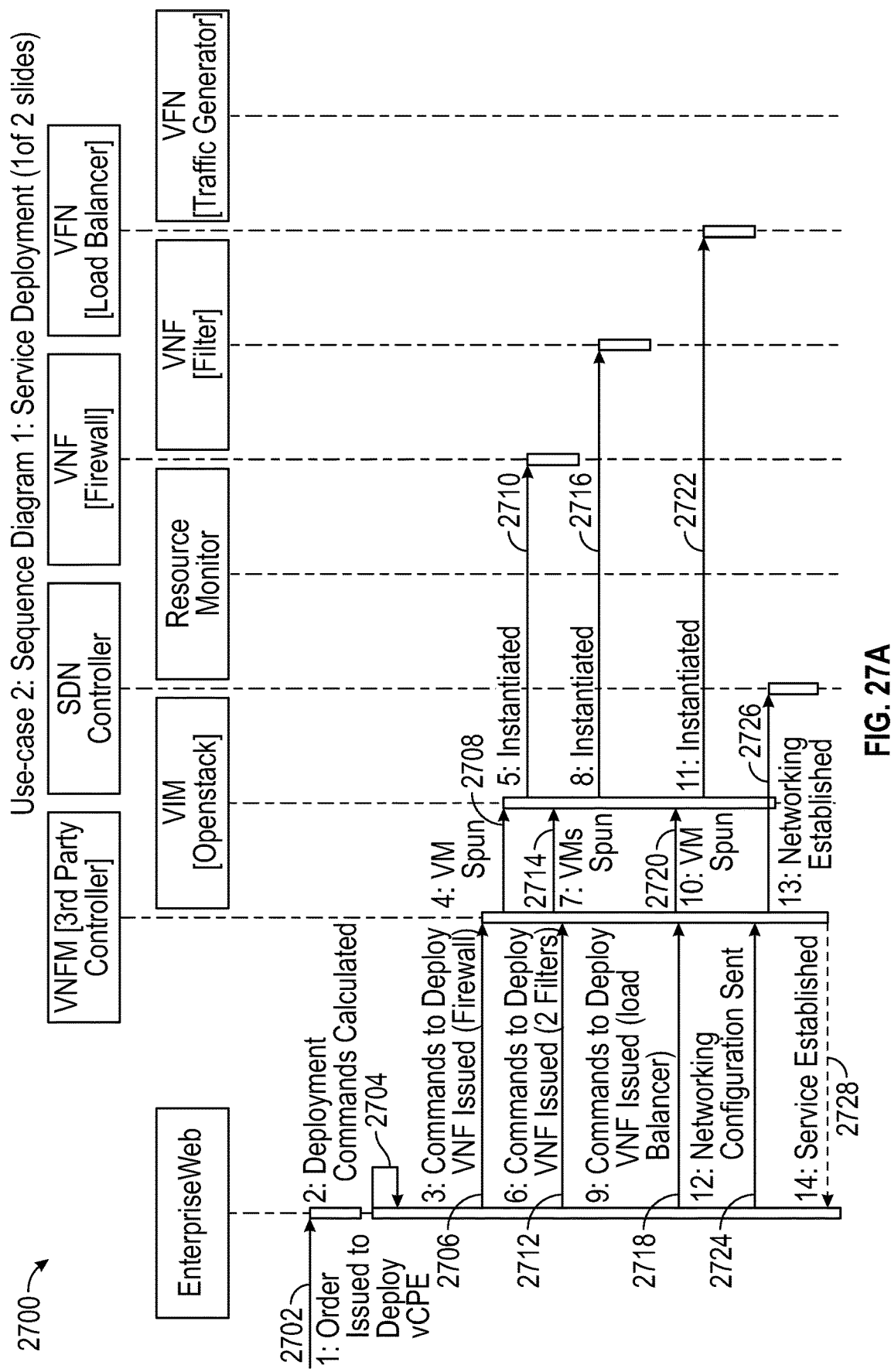
FIGS. 27A-B depict sequence diagrams of an example method of service deployment according to some embodiments.
Figure 27B:
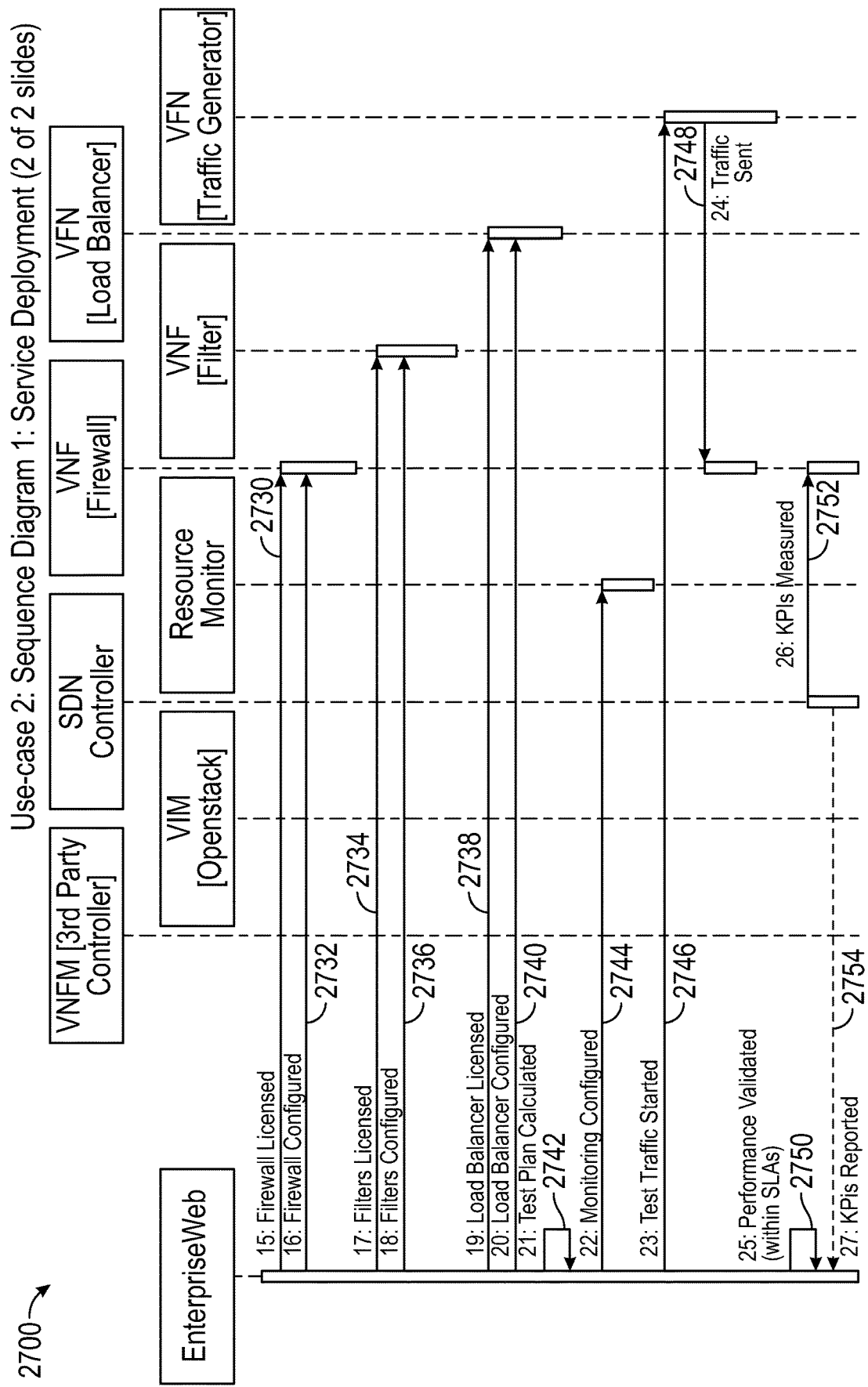

FIGS. 27A-B depict sequence diagrams 2700 of an example method of service deployment according to some embodiments. The sequence diagram of FIGS. 27A-B represent a single transaction, wherein EnterpriseWeb responds to an event, calculates an optimal plan in response, and acts as an Executive Transaction Manager ensuring the completion of the set of parallel and sequential interactions required by the plan, and if needed applies compensations or rollback in case of failure.

In some embodiments, acting as an OSS, EnterpriseWeb receives an order for a vCPE. It proceeds to choreograph the instantiation of VNFs for the required service chain via federated 3rd Party Controllers (NFVO and VNFM), deployment of network policies via the SDN Controller, the activation (configuration and licensing) of all involved VNFs, and an end-to-end test of SLA compliance is performed before releasing the service to the customer.

Each step in the sequence diagram corresponds to an interaction which is elaborated at an operational level below. FIGS. 22-28 provide an elaboration of the lower-level implementation details of like-similar interactions in another use-case/sequence diagram, which are indicative of the complexity and breadth of EnterpriseWeb capabilities rendered by each step.

In step 2702, an order is issued to deploy a vCPE. For example, a human user of the system through a portal, or a system through an API, places an order for a vCPE to EnterpriseWeb, which includes physical details of the vCPE device and the network service chain required (vFW+vFilter).

In step 2704, deployment commands are calculated. For example, the product order is an event evaluated based on context. Resource requirements and configurations for vCPE device, VNFs and Networks are determined based on the Network Service Model including chaining requirements, VNF packages involved (vFW, vFilter) and any connected Policies (SLAs for performance), and an optimized plan is generated for subsequent interactions. Note: as part of the evaluation, a Load Balancer is determined to be needed based on the requirements of the service to deal with scale, and is added to the network service graph dynamically.

In step 2706, commands to deploy a VNF are issued (Firewall). For example, EnterpriseWeb may require instances to be created of each VNF via a 3rd Party VNFM (controller) and 3rd Party NFVO (resource orchestrator). EnterpriseWeb uses models of the VNFM and NFVO to translate standard LCM operations to instantiate the VNF (vFW) into specific commands—in this case issued using HTTP/REST/JSON. This initiates an independent set of actions in the NVFO/VNFM pairing as part of the choreography.

In step 2708, a VM is spun. For example, VMs for the vFW VNF are created independently by the VNFM in a connected VIM. VLs are instantiated for each required network port per the order but are not attached to any network as this will be late bound as part of the service chain.

In step 2710, VMs for the vFW VNF are instantiated. For example, they may may be independently instantiated by the NFVO based on the optimized LCM operations sent to the NFVO by EnterpriseWeb.

In step 2712, commands to deploy the VNF are issued (e.g., 2 Filters). For example, EnterpriseWeb requires instances to be created of each VNF via a 3rd Party VNFM (controller) and 3rd Party NFVO (resource orchestrator). EnterpriseWeb uses models of the VNFM and NFVO to translate standard LCM operations to instantiate the VNF (vFilter) into specific commands—in this case issued using HTTP/REST/JSON. This initiates an independent set of actions in the VNFM as part of the choreography.

In step 2714, VMs are spun. For example, VMs for the vFilter VNF are created independently by the VNFM in a connected VIM. VLs are instantiated for each required network port per the order but are not attached to any network as this will be late bound as part of the service chain.

In step 2716, VMs for the vFilter VNF are instantiated (e.g., independently by the NFVO based on the optimized LCM operations sent to the NFVO by EnterpriseWeb).

In step 2718, commands to deploy VNF are issued (e.g., Load Balancer). For example, EnterpriseWeb requires instances to be created of each VNF via a 3rd Party VNFM (controller) and 3rd Party NFVO (resource orchestrator). EnterpriseWeb uses models of the VNFM and NFVO to translate standard LCM operations to instantiate the VNF (vLB) into specific commands—in this case issued using HTTP/REST/JSON. This initiates an independent set of actions in the VNFM as part of the choreography.

In step 2720, VMs are spun. For example, VMs for the vLB VNF are created independently by the VNFM in a connected VIM. VLs are instantiated for each required network port per the order but are not attached to any network as this will be late bound as part of the service chain.

In step 2722, VMs for the vLB VNF are instantiated (e.g., independently by the NFVO based on the optimized LCM operations sent to the NFVO by EnterpriseWeb).

In step 2724, a networking configuration is sent. For example, EnterpriseWeb may require specific network updates to establish the required Service Chain between the VNFs, and does this via a 3rd Party SDN (controller). When all information about allocated VDUs/VLs is returned from the VNFMs, EnterpriseWeb uses a model of the SDN to translate network policies into specific commands, binding the VLs into policies for a specific service chain—in this case issued using HTTP/REST/JSON. This initiates an independent set of actions in the SDN controller as part of the choreography.

In step 2726, networking is established. For example, SDN polices are applied independently by the SDN Controller. Binding VLs as created by the NFVO/VNFM in the earlier steps.

In step 2728, a service is established. For example, the NFVO and SDN Controllers sends alerts to EnterpriseWeb as each operation is completed. The events are interpreted and when all operations are reported complete EnterpriseWeb determines the service is established and determines that licensing and configuration of the components is required.

In step 2730, a firewall is licensed. In some embodiments, EnterpriseWeb uses a model of the vFW VNF package to translate standard LCM operations to license the VNF into specific commands via a format and protocol specific to the VNF—in this case issuing commands using REST to register the VNF in a central licensing server provided by the VNF vender.

In step 2732, the firewall is configured. In some embodiments, EnterpriseWeb uses a model of the vFW VNF package to translate standard LCM operations to configure the VNF into specific commands via a format and protocol specific to the VNF—in this case issuing commands using REST to send a base configuration file to the vFW VMs.

In step 2734, a filter is licensed. In some embodiments, EnterpriseWeb uses a model of the vFilter VNF package to translate standard LCM operations to license the VNF into specific commands via a format and protocol specific to the VNF—in this case issuing commands using REST to register the VNF in a central licensing server provided by the VNF vender.

In step 2736, the filter is configured. In some embodiments, EnterpriseWeb uses a model of the vFilter VNF package to translate standard LCM operations to configure the VNF into specific commands via a format and protocol specific to the VNF—in this case issuing commands to register a custom set of White listed URLs via SSH to the vFilter VMs.

In step 2738, a load balancer is licensed. In some embodiments, EnterpriseWeb uses a model of the vLB VNF package to translate standard LCM operations to license the VNF into specific commands via a format and protocol specific to the VNF—in this case issuing commands using REST to register the VNF in a central licensing server provided by the VNF vender.

In step 2740, the load balancer is configured. In some embodiments, EnterpriseWeb uses a model of the vLB VNF package to translate standard LCM operations to configure the VNF into specific commands via a format and protocol specific to the VNF—in this case issuing commands using REST to register the addresses of each vFilter to the vLB VMs.

In step 2742, a test plan is calculated. For example, when all licensing and configuration is complete, EnterpriseWeb determines the presence of an SLA to maintain a threshold of CPU consumption in the vFilter, this requires monitoring. A plan is calculated to choreograph testing so the SLA can be measured.

In step 2744, monitoring is configured. In some embodiments, EnterpriseWeb uses a model of the resource monitoring service present in the domain where the VNFs were deployed, combined with models for required metrics/KPIs from the VNF package models, to generate specific commands via a format and protocol specific to the reporting tool, so that it will collect and report KPIs required by the SLA—in this case it issues commands using REST so that the CPU usage is measured for each vFilter deployed.

In step 2746, test traffic is started. In some embodiments, EnterpriseWeb uses a model of the traffic generator service present in the domain where the VNFs were deployed, combined with models for required metrics/KPIs from the VNF package models, to generate specific commands via a format and protocol specific to the traffic generator, so that KPI can be measured prior to external use—in this case it issues commands using REST so that an average load of HTTP traffic is directed to the service chain.

In step 2748, traffic is sent. In some embodiments, traffic is sent independently by the traffic generator for a set amount of time, and then terminated. This provides an initial test of the service configuration.

In step 2750, performance is validated (e.g., within SLAs). In some embodiments, the SLA identifies the KPIs which requirement measurement.

In step 2752, KPIs are measured. In some embodiments, KPIs are being continuously monitored by the resource monitor independently.

In step 2754, the KPIs are reported. In some embodiments, EnterpriseWeb queries the resource monitor and determines if KPIs are within the SLA range. In this case recognizing compliance of all SLAs and releasing the service for use.

Use-ease 2: Related Use-cases/Alternate Implementations

ONAP Use-ease: Enterprise vCPE (wiki.onap.org/pages/viewpage.action?pageID=6593376)

Figure 28:
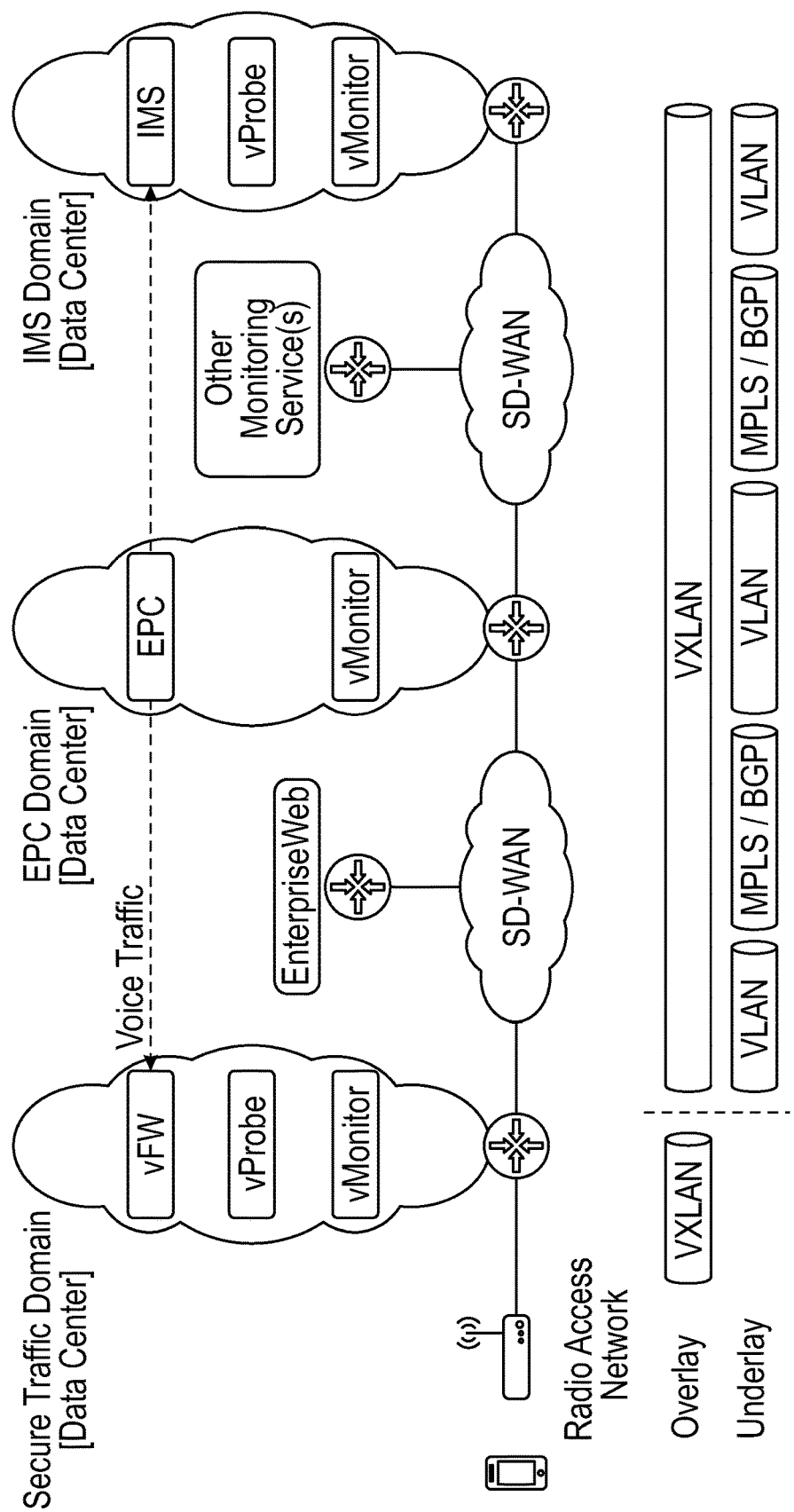
FIG. 28 depicts a diagram of an example system for assured secure voice (VoIP) for cellular devices according to some embodiments.

FIG. 28 depicts a diagram 2800 of an example system for assured secure voice (VoIP) for cellular devices according to some embodiments.

This use-case configures and manages the collective lifecycle of Firewall, EPC and IMS VNFs deployed across multiple domains/PoPs (physically and locally separate) and extends with additional services for zero-touch assurance (SLA enforcement).

In some embodiments, an instance of EnterpriseWeb provides an OSS, which can be used to order products, in this case "Assured Secure Voice (VoIP) for Cellular Phones". The product is realized as a network service implemented across separate domains for Secure Traffic (implementing a virtual Firewall VNF), EPC (implementing an EPC VNF) and IMS (implementing an IMS VNF). Each domain is hosted in a separate data center. SD-WAN Networks connect each data center, and the Secure Traffic network is connected directly to a Radio Access Network which allows cell phones to consume the service.

In some embodiments, EnterpriseWeb choreographs the deployment of all service elements, including exchanging optimized orders for the various VNFs with each domain, and the configuration of the underlying SDN-controllers. Further, policies modeled for SLA management (to enforce a Call Quality Metric) require the deployment of virtual probes (VNFs) and virtual monitors (VNFs) to allow monitoring of referenced KPIs, and the configuration of fault management policies to produce alerts back to EnterpriseWeb if the SLA is violated, enabling closed-loop modification of the service to maintain that SLA. Throughout the entire lifecycle of the service, EnterpriseWeb also acts as a model-based event-listener to respond intelligently to all events related to the service, including enforcing the SLA, and acts as an Executive Transaction Manager to make sure all interactions have guarantees, compensations and rollback as required.

Examples and Example Implementations

| | |
|---|---|
| Application and Computing Resources | VIM Adaptor |
| | SDN Controller Adaptor |
| Each is onboard to the system | vFW VNF Package |
| using a model-based process: | IMS VNF Package |
| mapping properties/behaviors | EPC VNF Package |
| to the metamodel, and | vProbe VNF Package |
| defining standards-based LCM | vMonitor VNF Package |
| operations. | Secure Traffic Domain Interface |
| | IMS Domain Interface |
| | EPC Domain Interface |
| | Resource Monitor Interface |
| | Service Monitor Interface |
| Micro-capabilities | Service Orchestration Functions (Calculate Optimized |
| Set of business/IT functions | Deployment Plan, Coordinate Actors, Route |
| and middleware/platform | Events/Messages) |

-continued

| | |
|---|---|
| services enabling the set of desired/necessary operations over other objects to connect, configure, control, coordinate. | VIM interface (Instantiate VM/VDU, Terminate VM/VDU, Scale VM/VDU, etc.)<br>VNFM interface (Deploy VNF, Start VNF, Stop VNF, etc.)<br>Domain interface (Deploy VNF/Service, Start VNF/Service, Stop VNF/Service, etc.)<br>Product Order interface (List Products, Get Product Spec, Place Order, etc.)<br>Catalog interface (List Objects, Get Object, Add Object, etc.)<br>Configure VNF (Adjust Config Files, Transfer Configs, Execute Scripts, Install License)<br>Testing interface (Configure Test Plan, Execute Test Plan)<br>SDN Interface (Configure Virtual Links, Establish Service Chain, Install Routing Policy)<br>Performance Management interface (Configure KPI collection, Translate/Normalize Metrics)<br>Fault Management interface (Configure Policies, Issue Alerts)<br>Protocol/Format translation and transformation<br>Distributed Transaction Management |
| Composed Models | Network Service = vFW VNF Package + EPC VNF Package + IMS VNF Package + Network Connection Graph + Domain Models + SLA Model (Call Quality)<br>SLA (Call Quality):<br>    KPI 1: Call Quality Indicator < threshold<br>        KPI measured via 2 vProbes<br>        vProbe 1 is deployed with the first network function in the service chain<br>        vProbe 2 is deployed with the last network function in the service chain<br>        vProbe 1 sends voice traffic to the start of the chain<br>        vProbe 2 measures KPI of received call at the end of the chain<br>        KPI is streamed to Service Monitor<br>        Resource Monitor reports event (Fault) to EnterpriseWeb if KPI violated.<br>        Resource Monitor also available to query for compliance.<br>    KPI 2: CPU > threshold + Memory (RAM) > threshold<br>        Metrics measured via 2 vMonitors<br>        Metrics aggregated from all vMonitors in Resource Monitor<br>        KPI can be queried on demand by EnterpriseWeb to measure current state<br>Policy:<br>    Call Quality Indictor Event causes evaluation of SLA<br>    CPU and Memory KPI 2 is evaluated on demand from each domain to determine root cause (non-compliant domain)<br>    LCM Operation: scale out is issued to domain violating KPI 2<br>    SLA is reevaluated |

Each sequence diagram represents a single transaction, wherein EnterpriseWeb responds to an event, calculates an optimal plan in response, and acts as an Executive Transaction Manager ensuring the completion of the set of parallel and sequential interactions required by the plan, and if needed applies compensations or rollback in case of failure.

Generally, the sequence diagrams associated with FIG. 25 cover three transactions: Service Deployment (FIG. 29), Assurance Configuration (FIGS. 30A-B), and Enforcement of an SLA for Call Quality (FIGS. 31A-B).

Figure 29:
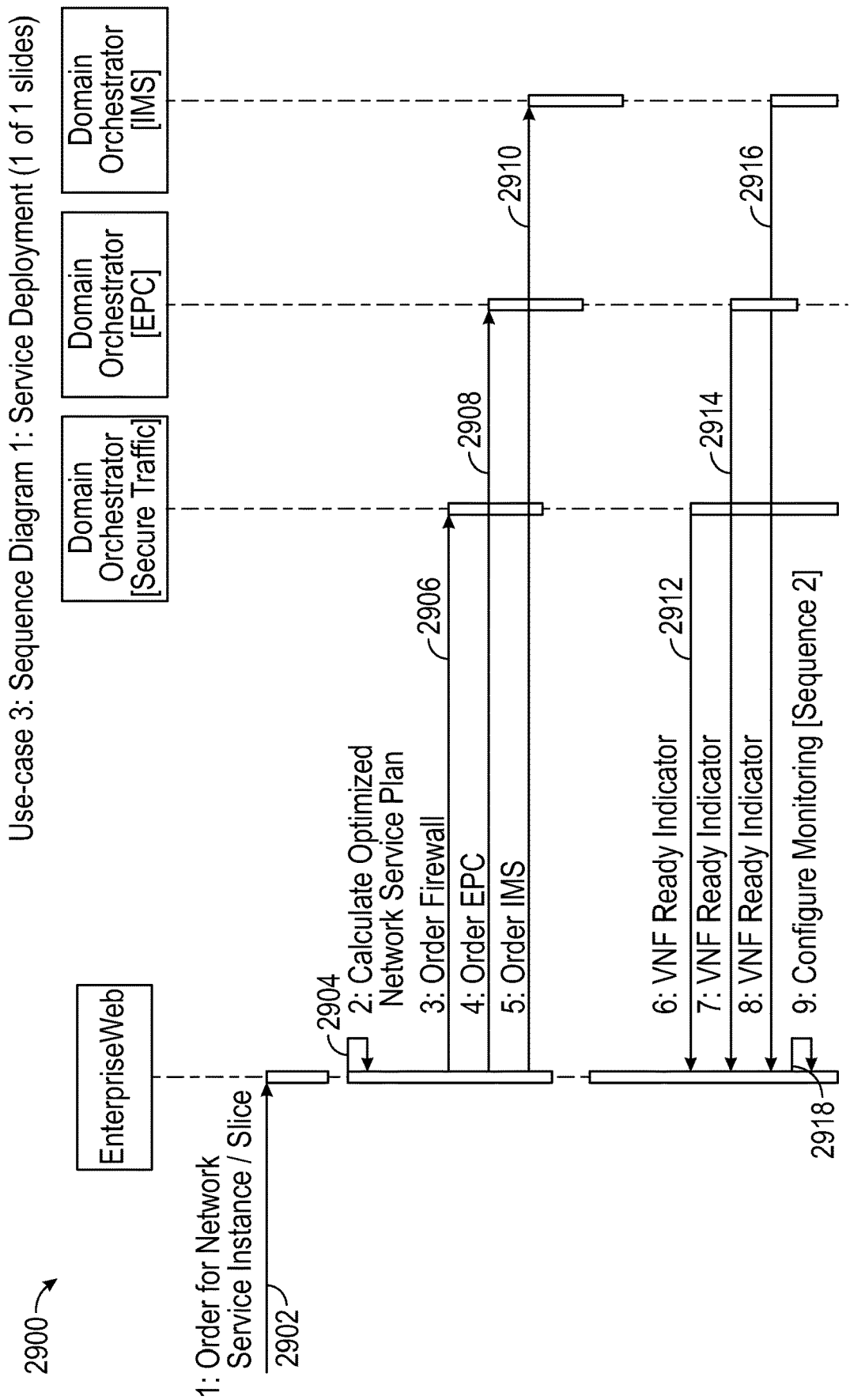
FIG. 29 depicts a sequence diagram of an example of a method of service deployment according to some embodiments.

FIG. 29 depicts a sequence diagram 2900 of an example of a method of service deployment according to some embodiments.

Acting as an OSS, EnterpriseWeb receives an order for the service, it is instantiated by choreographing optimized orders for each function (e.g., and related networking) across the 3 domains.

Each step in the sequence diagram corresponds to an interaction which is elaborated at an operational level below. Step 2908 is expanded on below, elaborating lower-level implementation and choreography details indicative of the complexity and breadth of EnterpriseWeb capabilities found in each domain.

In step 2902, an order for a network service instance/slice is placed. For example, a human user of the system through a portal, and/or a system through an API, places an order for the network service to EnterpriseWeb.

In step 2904, an optimized network service plan is calculated. In some embodiments, the product order is an event evaluated based on context. Resource requirements and configurations for domain-based Firewall, EPC and IMS VNFs and domain-to-domain networking may be determined based on the Network Service Model, VNF packages involved (e.g., vFW, EPC, IMS), the domain models present (e.g., secure traffic domain, EPC domain, IMS domain) and any connected Policies (e.g., SLAs for performance), and an optimized plan is generated for subsequent interactions.

In step 2906, a firewall is ordered. In some embodiments, EnterpriseWeb requires instances to be created of each VNF via a compatible domain. EnterpriseWeb uses models of the VNF packages, and models of the domains, to determine where each VNF can be instantiated, then to translate standard LCM operations to instantiate the VNF (vFW) and establish networking (SD-WAN) and establish a Service Chain with the other domains into specific commands—in this case issued using HTTP/REST/JSON. EnterpriseWeb sends an optimized order to the secure traffic domain interface initiating an independent set of actions in the domain as part of the choreography.

In step 2908, an EPC is ordered. In some embodiments, EnterpriseWeb requires instances to be created of each VNF via a compatible domain. EnterpriseWeb uses models of the VNF packages, and models of the domains, to determine where each VNF can be instantiated, then to translate standard LCM operations to instantiate the VNF (EPC), establish networking (SD-WAN), and establish a Service Chain with the other domains into specific commands—in this case issued using HTTP/REST/JSON. EnterpriseWeb sends an optimized order to the EPC domain interface initiating an independent set of actions in the domain as part of the choreography.

In step 2910, an IMS is ordered. In some embodiments, EnterpriseWeb requires instances to be created of each VNF via a compatible domain. EnterpriseWeb uses models of the VNF packages, and models of the domains, to determine where each VNF can be instantiated, then to translate standard LCM operations to instantiate the VNF (IMS) and establish networking (SD-WAN) and establish a Service Chain with the other domains into specific commands—in this case issued using HTTP/REST/JSON. EnterpriseWeb sends an optimized order to the IMS domain interface initiating an independent set of actions in the domain as part of the choreography.

In step 2912, an indicator (e.g., a VNF ready indicator) is sent. In some embodiments, each domain sends an alert to EnterpriseWeb that VNFs and Networking are ready.

In step 2914, an indicator (e.g., a VNF ready indicator) is sent. In some embodiments, each domain sends an alert to EnterpriseWeb that VNFs and Networking are ready.

In step 2916, an indicator (e.g., a VNF ready indicator) is sent. In some embodiments, each domain sends an alert to EnterpriseWeb that VNFs and Networking are ready.

In step 2918, monitoring is configured. For example, when it is determined that the service is ready across the domain, SLAs are evaluated and it is determined that additional components need to be instantiated to allowing the enforcement of SLAs. An event is generated that though the service if functionally complete, it needs further revision to support assurance.

Figure 30A:
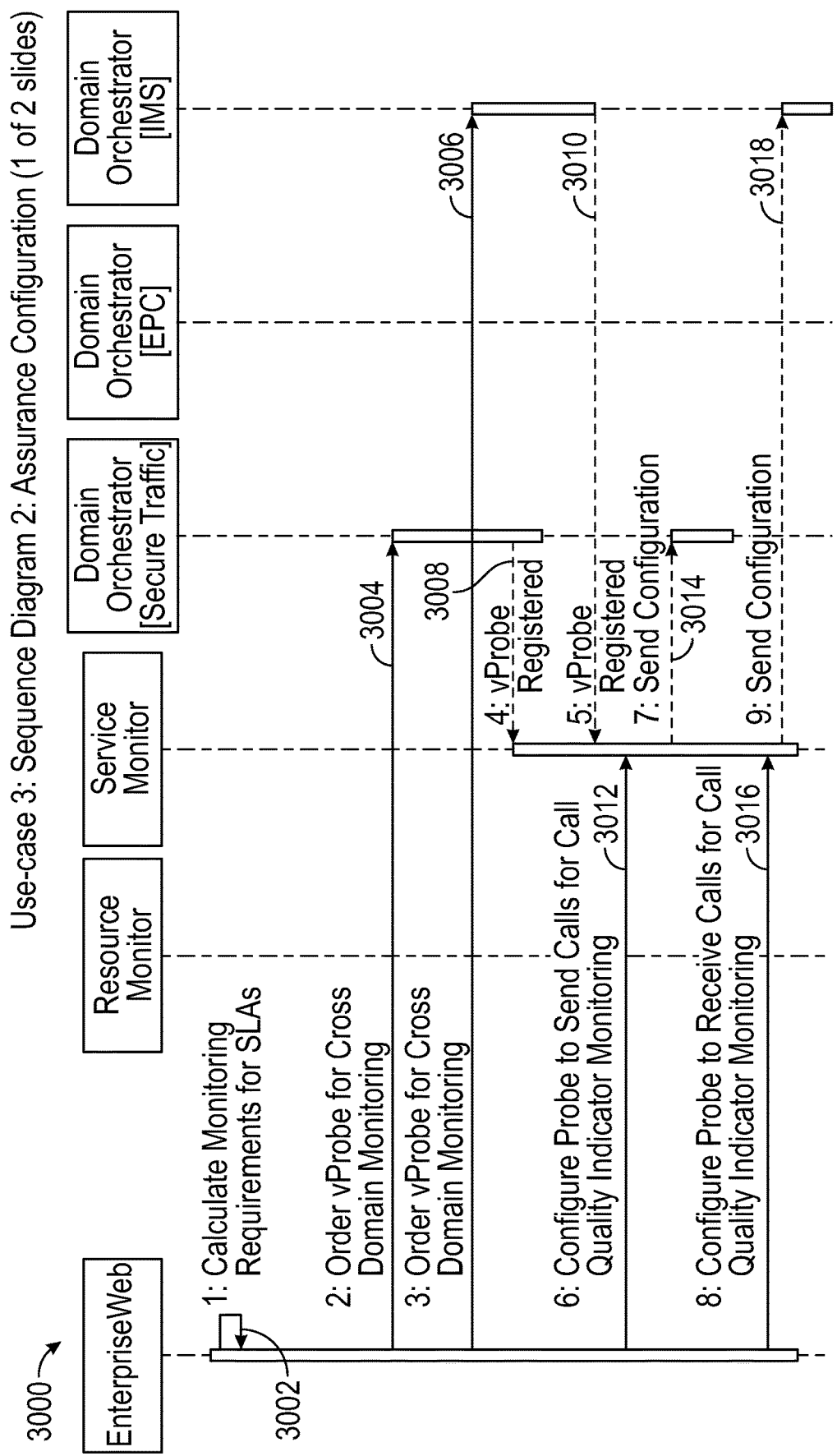
FIGS. 30A-B depict sequence diagrams 3100 of an example method of assurance configuration according to some embodiments.
Figure 30B:
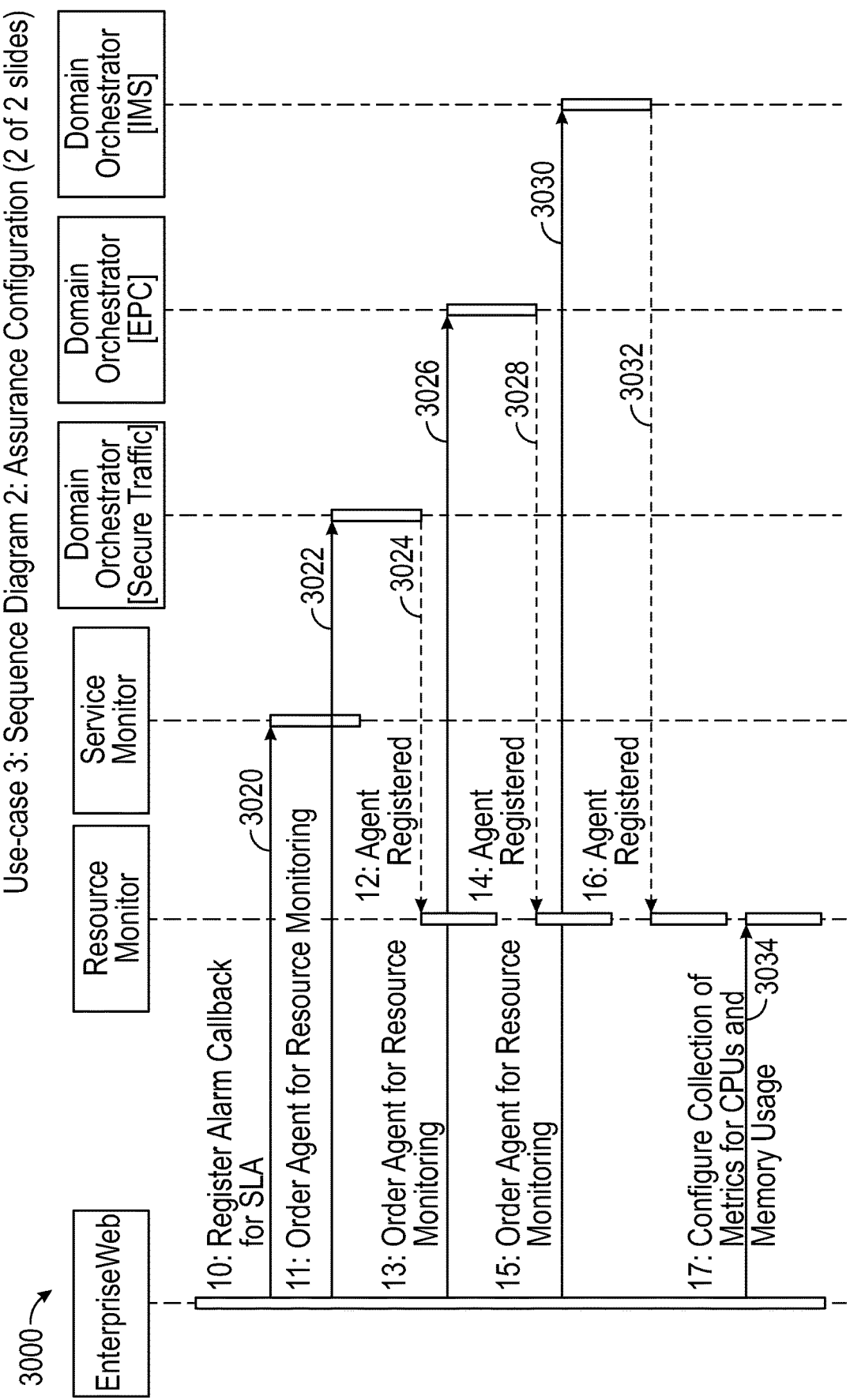
Figure 31A:
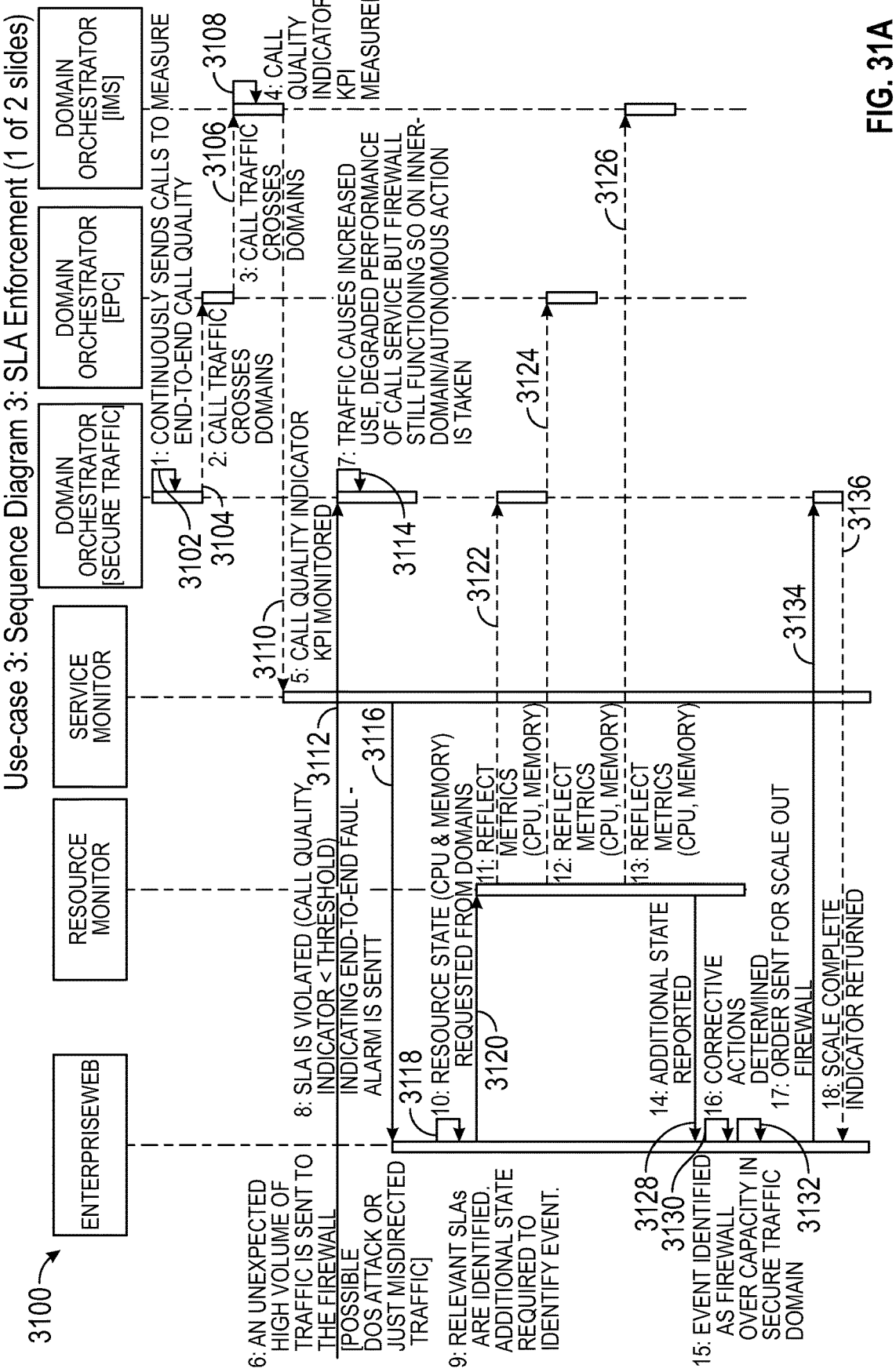
FIGS. 31A-B depict sequence diagrams of an example method of enforcement of a Service License Agreement (SLA) for call quality according to some embodiments.
Figure 31B:
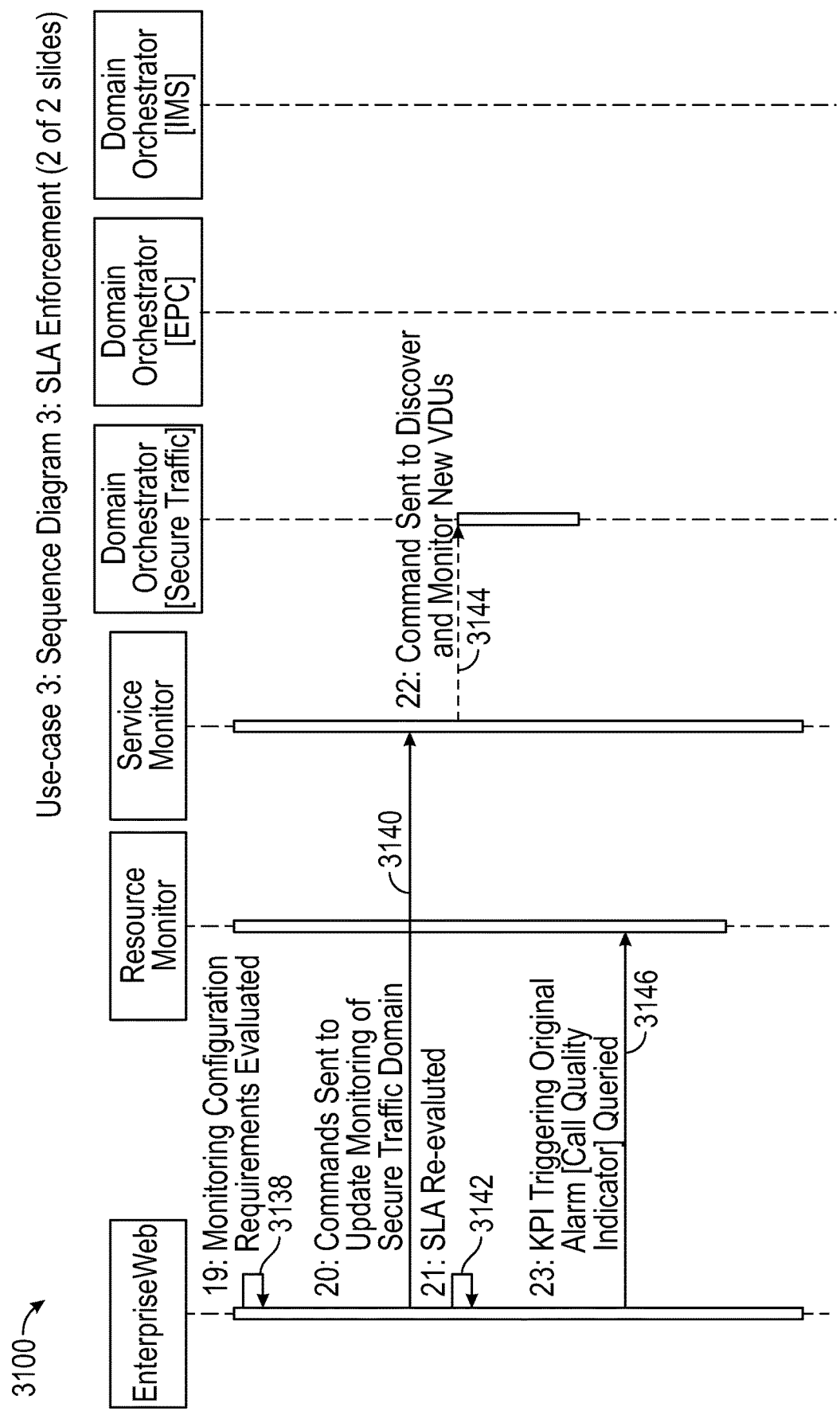

FIGS. 30A-B depict sequence diagrams 3100 of an example method of assurance configuration according to some embodiments.

In some embodiments, after instantiating the base service, EnterpriseWeb evaluates any associated SLAs. An SLA related to "Call Quality" is found, to enforce it additional assurance components are required, which are installed/configured across the 3 domains.

Each step in the sequence diagram corresponds to an interaction which is elaborated at an operational level below. Section 3.4 provides an elaboration of the lower-level domain implementation and choreography details indicative of the complexity and breadth of EnterpriseWeb capabilities found in each step.

In step 3002, monitoring requirements for SLAs are calculated. In some embodiments, EnterpriseWeb responds to the event, and determines that it corresponds to an SLA required to maintain Call Quality, a specific KPI measured via a vProbe. This SLA also requires the ability to measure KPIs for CPU and Memory usage in each domain to determine the root cause of any alarms. An optimized plan is calculated to choreograph the deployment of components required to enforce this SLA, realized by the subsequent interactions.

In step 3004, a vProbe is ordered for cross domain monitoring. In some embodiments, EnterpriseWeb requires an instance of the vProbe to be created in the first domain in the service chain, where calls will originate. EnterpriseWeb uses models of the vProbe VNF package, and a model of the domain to translate standard LCM operations to instantiate the VNF (vProbe) into specific commands—in this case issued using HTTP/REST/JSON to the secure traffic domain. This initiates an independent set of actions in the domain as part of the choreography.

In step 3006, a vProbe is ordered for cross domain monitoring. In some embodiments, EnterpriseWeb requires an instance of the vProbe to be created in the last domain in the service chain, where calls will terminate. EnterpriseWeb uses models of the vProbe VNF package, and a model of the domain to translate standard LCM operations to instantiate the VNF (vProbe) into specific commands—in this case issued using HTTP/REST/JSON to the IMS domain. This initiates an independent set of actions in the domain as part of the choreography.

In step 3008, the vProbe is registered. In some embodiments, each vProbe independently registers itself with a central Service Monitor, per the order sent by EnterpriseWeb to the domain.

In step 3010, the vProbe is registered. In some embodiments, each vProbe independently registers itself with a central Service Monitor, per the order sent by EnterpriseWeb to the domain.

In step 3012, the probe is configured to send calls for call quality indicator monitoring. In some embodiments, EnterpriseWeb uses models of the vProbe VNF package, and a model of the KPI required (Call Quality) to generate specific commands to the Service Monitor to send the right traffic from the secure traffic domain—in this case issued using HTTP/REST/JSON. This initiates an independent set of actions in the Service Monitor as part of the choreography.

In step 3014, the configuration is sent. In some embodiments, the central Service Monitor sends an appropriate configuration to the vProbe independently.

In step 3016, the probe is configured to receive calls for call quality indicator monitoring. In some embodiments, EnterpriseWeb uses models of the vProbe VNF package, and a model of the KPI required (e.g., call quality) to generate specific commands to the Service Monitor to receive traffic in the IMS domain—in this case issued using HTTP/REST/JSON. This initiates an independent set of actions in the Service Monitor as part of the choreography.

In step 3018, the configuration is sent. In some embodiments, the central Service Monitor sends an appropriate configuration to the vProbe independently.

In step 3020, an alarm callback for SLA is registered. In some embodiments, EnterpriseWeb uses models of the vProbe VNF package, and a model of the KPI required (call quality) to generate specific commands to the Service Monitor to report alarms when the KPI drops below a certain threshold—in this case issued using HTTP/REST/JSON. This initiates an independent set of actions in the Service Monitor as part of the choreography, so it will detect and report faults (violations of the SLA) to EnterpriseWeb as they occur.

In step 3022, an agent is ordered for Resource Monitoring. In some embodiments, EnterpriseWeb requires an instance of the vMonitor agent to be created in each domain so that KPIs for CPU and Memory usage can be collected. EnterpriseWeb uses models of the vMonitor VNF package, and a model of each domain to translate standard LCM operations to instantiate the VNF (vMonitor) into specific commands—in this case issued using HTTP/REST/JSON to the secure traffic domain. This initiates an independent set of actions in the domain as part of the choreography.

In step 3024, an agent is registered. In some embodiments, each vMonitor independently registers itself with a central Resource Monitor, per the order sent by EnterpriseWeb to the domain.

In step 3026, and agent is ordered for resource monitoring. In some embodiments, EnterpriseWeb requires an instance of the vMonitor agent to be created in each domain so that KPIs for CPU and Memory usage can be collected. EnterpriseWeb uses models of the vMonitor VNF package, and a model of each domain to translate standard LCM operations to instantiate the VNF (vMonitor) into specific commands—in this case issued using HTTP/REST/JSON to the EPC domain. This initiates an independent set of actions in the domain as part of the choreography.

In step 3028, an agent is registered. In some embodiments, each vMonitor independently registers itself with a central Resource Monitor, per the order sent by EnterpriseWeb to the domain.

In step 3030, an agent is ordered for resource monitoring. In some embodiments, EnterpriseWeb requires an instance of the vMonitor agent to be created in each domain so that KPIs for CPU and Memory usage can be collected. EnterpriseWeb uses models of the vMonitor VNF package, and a model of each domain to translate standard LCM operations to instantiate the VNF (vMonitor) into specific commands—in this case issued using HTTP/REST/JSON to the IMS domain. This initiates an independent set of actions in the domain as part of the choreography.

In step 3032, an agent is registered. In some embodiments, each vMonitor independently registers itself with a central Resource Monitor, per the order sent by EnterpriseWeb to the domain.

In step 3034, a collection of metrics is configured for CPUs and memory usage. In some embodiments, EnterpriseWeb uses models of the vMonitor VNF package, and models of the KPIs required (CPU and Memory) to generate specific commands to the Resource Monitor to aggregate these KPIs—in this case issued using HTTP/REST/JSON. This initiates an independent set of actions in the Resource Monitor as part of the choreography, so it can be queried on demand by EnterpriseWeb web to determine the current state of resource consumption across the 3 domains.

FIGS. 31A-B depict sequence diagrams 3100 of an example method of enforcement of a Service License Agreement (SLA) for call quality according to some embodiments.

In some embodiments, an increase in traffic forces a violation of the SLA, and a series of interactions are automatically performed to auto-heal the service. Generally, monitoring of the End-to-End is continuous to Measure Call Quality [steps 3102-3110]. At step 3112, the Firewall is bombarded with traffic, and the overall call quality degrades as a result. At step 3114, the SLA is violated, trigged by the Call Quality KPI dropping below a threshold. At step 3116, the violation is observed, the Fault occurs, and an alarm is sent back to the EnterpriseWeb. The alarm is an event evaluated in the context of all modeled SLAs and Service state, in this instance additional state is needed and is queried from the individual domains [steps 3118-3136]. It is determined that the fault originates from the secure traffic domain, and the action to take is to Scale Out the Functions in that domain, commands are issued to the domain to do this [steps 3134-3138]. Once the service is scaled, monitoring is reconfigured so it is capturing metadata and state from the updated domain [steps 3140-3146]. The SLA is then re-evaluated by querying the state of the service to ensure it is back in compliance with the SLA.

Each step in the sequence diagram corresponds to an interaction which is elaborated at an operational level below. Discuss below provides an elaboration of the lower-level domain implementation and choreography details indicative of the complexity and breadth of EnterpriseWeb capabilities found in each step.

In step 3102, calls are continuously sent to measure end-to-end call quality. In some embodiments, per the already established assurance configuration, the vProbe in the secure traffic domain sends traffic through the vFW.

In step 3104, call traffic crosses domains. In some embodiments, traffic passes through the SD-WAN connection between the secure traffic domain and the EPC domain.

In step 3106, call traffic crosses domains. In some embodiments, traffic passes through the SD-WAN connection between the EPC domain and the IMS domain.

In step 3108, a call quality indicator KPI is measured. In some embodiments, the vProbe in the IMS domain measures the call quality KPI.

In step 3110, the call quality indicator KPI is monitored. In some embodiments, the service monitor continuously evaluates the call quality KPI to check if it is within thresholds per the SLA.

In step 3112, an unexpected high volume of traffic is sent to the firewall (e.g., possible DoS attack or just misdirected traffic). In some embodiments, an outside system starts sending excessive traffic at the vFW. The firewall maintains security of the service, but starts to utilize increased resources.

In step 3114, traffic causes increased use, degraded performance of call service but firewall still functioning so no inner-domain/autonomous action is taken. In some embodiments, the overall quality of the end-to-end calling service is impacted due to the increased resource use.

In step 3116, an SLA is violated (e.g., call quality indicator<threshold) indicating and end-to-end fault and an alarm is sent. In some embodiments, the service monitor detects that the Call Quality KPI is outside acceptable thresholds and issues an alert to EnterpriseWeb.

In step 3118, relevant SLAs are identified. In some embodiments, additional state may be required to identify event. In some embodiments, EnterpriseWeb interprets the event, associating the alarm with the SLA for Call Quality, but requires additional state to calculate an optimized plan to heal the service. It generates a plan to gather additional state from each domain.

In step 3120, resource state (e.g., CPU state and memory state) is requested from domains. In some embodiments, EnterpriseWeb queries the resource monitor for the current state of each domain.

In step 3122, metrics (e.g., CPU, memory) are reflected. In some embodiments, the resource monitor independently queries the vMonitor in the secure traffic domain to get the current value of CPU and Memory usage as required by the SLA.

In step 3124, metrics (e.g., CPU, memory) are reflected. In some embodiments, the Resource monitor independently queries the vMonitor in the EPC domain to get the current value of CPU and Memory usage as required by the SLA.

In step 3126, metrics (e.g., CPU, memory) are reflected. In some embodiments, the Resource monitor independently queries the vMonitor in the IMS domain to get the current value of CPU and Memory usage as required by the SLA.

In step 3128, additional state is reported. In some embodiments, when all state is current in the Resource Monitor, it is sent to EnterpriseWeb.

In step 3130, an event is identified as a firewall being over capacity in a secure traffic domain. In some embodiments, EnterpriseWeb interprets the new state of each domain along with the original event (alert indicating a low Call Quality Indicator) to determine the secure traffic domain is over capacity, per the model of the SLA.

In step 3132, corrective actions are determined. In some embodiments, EnterpriseWeb determines that to heal the service LCM operations to scale the identified domain (Secure Traffic) need to be issued, an optimized plan is calculated for the subsequent interactions.

In step 3134, an order is sent to scale out firewall. In some embodiments, EnterpriseWeb uses models of the VNF package (vFW) and a model of the domains (secure traffic) to translate standard LCM operations to scale the VNF (vFW) into specific commands—in this case issued using HTTP/REST/JSON. This initiates an independent set of actions in the domain as part of the choreography.

In step 3136, a scale complete indicator is returned. In some embodiments, the domain sends an alert to EnterpriseWeb that VNF has been scaled.

In step 3138, monitoring configuration requirements are evaluated. In some embodiments, EnterpriseWeb determines an updated configuration for the Resource Monitor is required so it can extend its monitoring over the newly allocated resources in the Secure Traffic domain.

In step 3140, commands are sent to update the monitoring of the secure traffic domain. In some embodiments, the configuration is sent to the resource monitor.

In step 3142, the SLA is re-evaluated. In some embodiments, the SLA is reevaluated by EnterpriseWeb to check if it is in compliance.

In step 3144, a command is sent to discover and monitor new VDUs. In some embodiments, the resource monitor independently updates the vMonitor in the domain.

In step 3146, the KPI triggering the original alarm (e.g., call quality indicator) is queried. In some embodiments, EnterpriseWeb queries the original KPI which caused the initial event, determines the conditions of the SLA are now met, and closes the transaction.

Figure 32A:
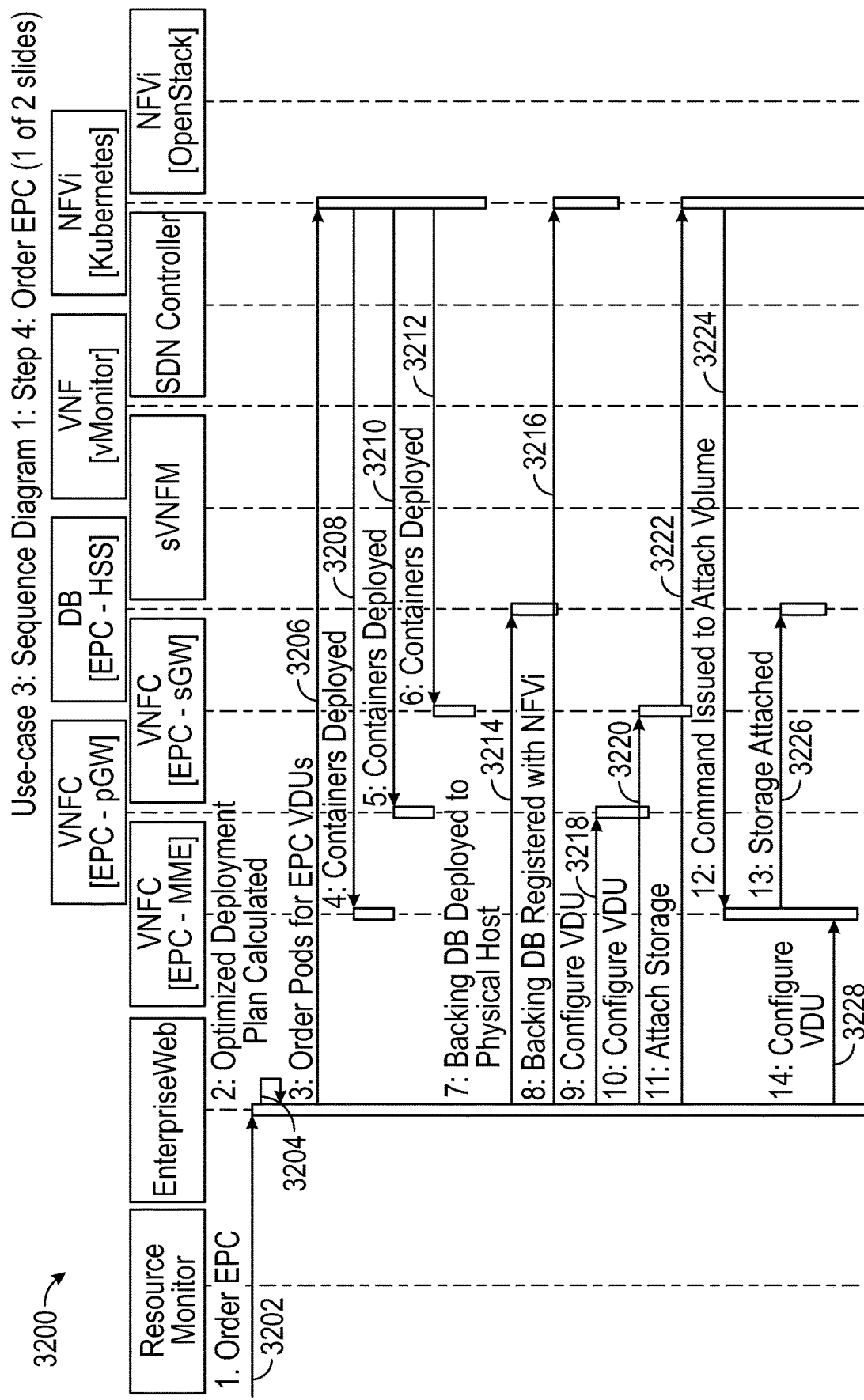
FIGS. 32A-B depict sequence diagrams of an example method of handling a service order event according to some embodiments.
Figure 32B:
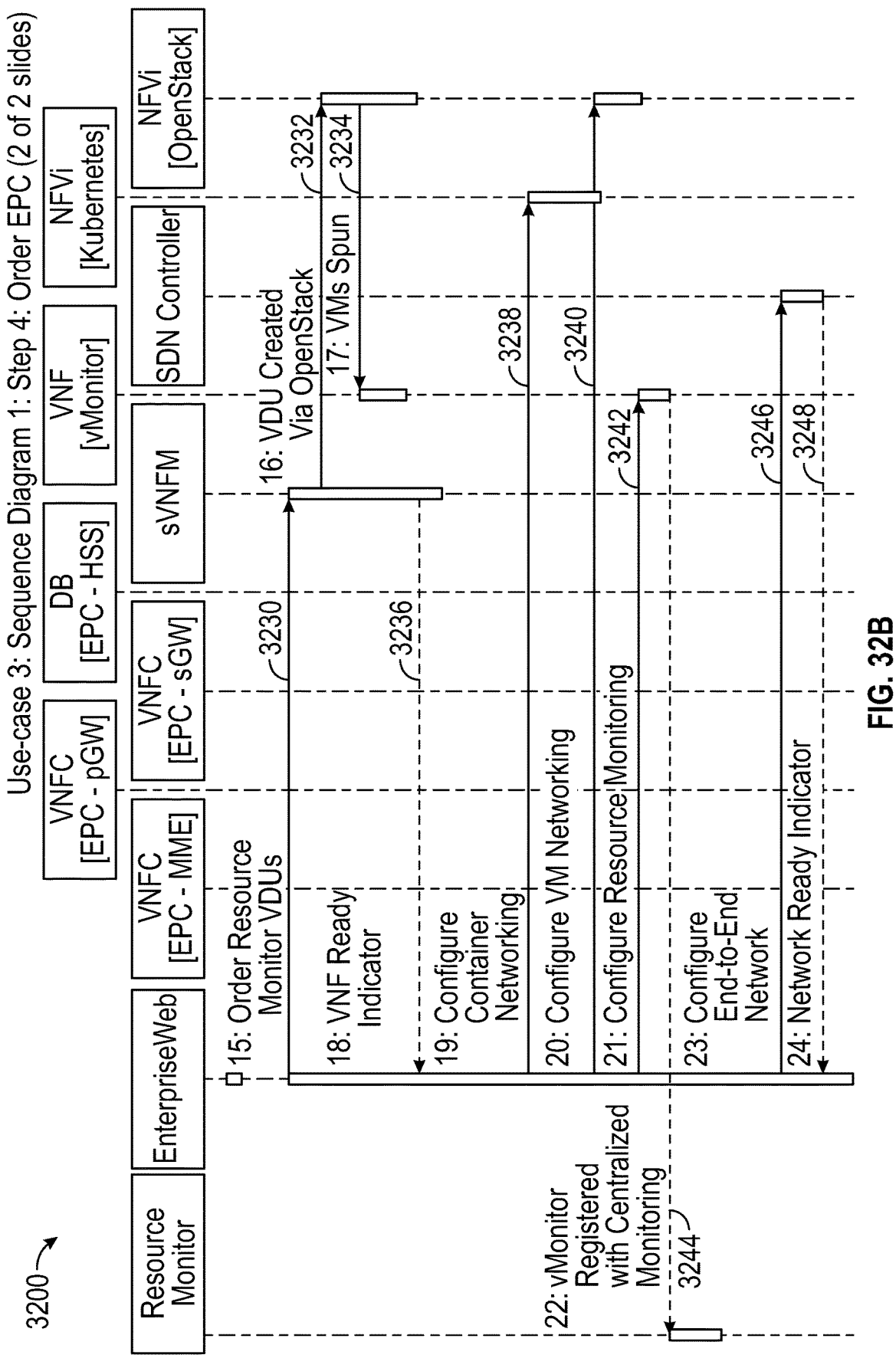

FIGS. 32A-B depict sequence diagrams 3200 of an example method of handling a service order event according to some embodiments.

In this interaction, at an operational level, a service order event (specifically an order for an EPC with monitoring to be deployed in a domain) is evaluated based on context. Resource requirements and configurations for VNFs and Networks are determined based on the Network Service Model, VNF packages involved (EPC and vMonitor) and any related SLA, and an optimized plan is generated for subsequent interactions. The cumulative result is an EPC configured for domain-to-domain networking (via SD-WAN) with a Kubernetes-based deployment of related VNFCs, paired with a persistent backing store to support stateful aspects of the VNF, and paired virtual resource monitoring to expose telemetry from the domain.

Each step in the sequence diagram corresponds to an interaction that takes place within the domain.

In step 3202, an EPC is ordered. In some embodiments, the EPC order is received by EnterpriseWeb through an exposed domain interface (API).

In step 3204, an optimized deployment plan is calculated. In some embodiments, the EPC order is an event evaluated based on context. Resource requirements and configurations for EPC VNFCs, vMonitor VNFCs and domain-to-domain networking are determined based on the Network Service Model and VNF packages involved (EPC, vMonitor) and an optimized plan is generated for subsequent interactions. The plan will need to: A) interface with a Kubernetes VIM to configure containers for each of the EPC components; B) perform DevOps processes to deploy a DB and bind it to the Kubernetes VIM to provide persistence storage for the EPC; C) bind the containers to the persistent storage for the EPC; D) deploy a vMonitor component via a 3rd-party VNFM (federated application controller—deploying to an OpenStack VIM); E) configure the networking of Kubernetes and OpenStack so that the vMonitor can report telemetry and state of the EPC VNF; and F) configure the overall networking so the service can be connected to/consumed from other domains via SD-WAN.

In step 3206, pods are ordered for EPC VDUs. In some embodiments, EnterpriseWeb requires Containers/VDUs to be created for each VNFC via the Kubernetes VIM, and for VLs to be established providing networking to each VM/VDU. EnterpriseWeb uses a model of the VIM to translate standard LCM operations to create and instantiate Pods (container clusters used by Kubernetes) for the three VNFCs required by the EPC (an MME, a pGateway and an sGateway)—in this case issued using HTTP/REST/JSON. This initiates an independent set of actions in Kubernetes as part of the choreography.

In step 3208, containers are deployed. In some embodiments, a Pod is deployed for the EPC VNFC independently by Kubernetes, establishing containers for the VDU, with VLs allocated for each required network port mapped from the Pod.

In step 3210, containers are deployed. In some embodiments, a Pod is deployed for the EPC VNFC independently by Kubernetes, establishing containers for the VDU, with VLs allocated for each required network port mapped from the Pod.

In step 3212, containers are deployed. In some embodiments, a Pod is deployed for the EPC VNFC independently by Kubernetes, establishing containers for the VDU, with VLs allocated for each required network port mapped from the Pod.

In step 3214, a backing DB is deployed to a physical host. In some embodiments, to enable persistence (i.e. stateful behavior) for the EPC, a DB needs to be deployed and mapped to Kubernetes. The VNF package for EPC is used to identify that a persistent Cassandra cluster is required across container instances. DevOps policies to deploy Cassandra are identified, which include packages to download to a physical host and a set of scripts to be executed for default deployment. The domain model contains such a host VM to be used as the "physical host" (in this case, defined as any non-ephemeral CentOS Linux deployment). EnterpriseWeb uses a model of CentOS to determine it can be accessed by SSH, downloads any needed certs, and initiates an SSH connection. It then executes CLI commands to download the packages required, and execute the shell scripts contained in the Cassandra package.

In step 3216, the backing DB is registered with a NFVi. In some embodiments, EnterpriseWeb uses a model of the Kubernetes VIM to translate standard LCM operations to bind a backing store, in this case issued using HTTP/REST/JSON. This initiates an independent set of actions in Kubernetes as part of the choreography to register the Cassandra instance as a persistence provider.

In step 3218, a VDU is configured. In some embodiments, while the backing store is being created and bound, VDUs which do not require persistence (it is only required by the MME VDU) can be configured in parallel. EnterpriseWeb uses a model of the EPC VNF package and pGW VNFC to translate standard LCM operations to configure the VNFC into specific commands via a format and protocol specific to the VDU—in this case issuing commands using SSH to configure the container cluster.

In step 3220, the VDI is configured. In some embodiments, while the backing store is being created and bound, VDUs which do not require persistence (it is only required by the MME VDU) can be configured in parallel. EnterpriseWeb uses a model of the EPC VNF package and sGW VNFC to translate standard LCM operations to configure the VNFC into specific commands via a format and protocol specific to the VDU—in this case issuing commands using SSH to configure the container cluster.

In step 3222, storage is attached. In some embodiments, EnterpriseWeb uses a model of the Kubernetes VIM and EPC VNF package to translate standard LCM operations to attach a persistent volume to the MME VNFC, in this case issued using HTTP/REST/JSON. This initiates an independent set of actions in Kubernetes as part of the choreography to attach a volume to the related Pod.

In step 3224, a command is issued to attach a volume. In some embodiments, Kubernetes signals the Pod to attach the volume.

In step 3226, storage is attached. In some embodiments, the storage is mapped to the containers in the Pod.

In step 3228, a VDU is configured. In some embodiments, once storage has been attached, EnterpriseWeb uses a model of the EPC VNF package and MME VNFC to translate standard LCM operations to configure the VNFC into specific commands via a format and protocol specific to the VDU—in this case issuing commands using SSH to configure the container cluster.

In step 3230, Resource Monitor VDUs are ordered. In some embodiments, EnterpriseWeb requires instances to be created of the vMonitor VNF via a 3rd Party sVNFM (controller). EnterpriseWeb may use a model of the sVNFM to translate standard LCM operations to instantiate the VNF (vMonitor) into specific commands—in this case issued using HTTP/REST/JSON. This may initiate an independent set of actions in the VNFM as part of the choreography.

In step 3232, a VDU is created via OpenStack. In some embodiments, the sVNFM signals OpenStack to create the required VMs/VDUs per the Order as a set of independent actions.

In step 3234, VMs are spun. In some embodiments, VMs for the vMonitor VNF are created independently by the sVNFM in a connected VIM. VLs are instantiated for each required network port per the order but are not attached to any network as this will be late bound as part of the network configuration.

In step 3236, EnterpriseWeb receives a notification when the VNF instance is ready from the sVNFM.

In step 3238, container networking is configured. In some embodiments, EnterpriseWeb configures Container networking, using a model of the Kubernetes VIM and the EPC VNF package to translate standard LCM operations to configure networking into specific commands via a format and protocol specific to the VIM—in this case issued using HTTP/REST/JSON. The commands connect the previously allocated VLs to OpenStack to allow external monitoring by the vMonitor VM.

In step 3240, VM networking is configured. In some embodiments, EnterpriseWeb configures OpenStack networking, using a model of the OpenStack VIM and the vMonitor VNF package to translate standard LCM operations to configure networking into specific commands via a format and protocol specific to the VIM—in this case issued using HTTP/REST/JSON. The commands bind the previously allocated VLs to ports accessible to the Centralized Monitoring service which they need to report to for aggregation.

In step 3242, resource monitoring is configured. In some embodiments, EnterpriseWeb uses a model of the vMonitor VNF package to translate standard LCM operations to configure the VNF into specific commands via a format and protocol specific to the VDU—in this case issuing commands using SSH to identify the address of the Centralized Monitoring service to the VM (so that it can register itself for aggregation), and issues individual commands for the KPIs to be monitored (CPU and Memory usage) so they are collected.

In step 3244, vMonitor is registered with centralized monitoring. In some embodiments, based on the configuration performed by EnterpriseWeb, the vMonitor self-registers with the Central Monitoring service using the network established in step 3240.

In step 3246, the end-to-end network is configured. In some embodiments, EnterpriseWeb requires an SD-WAN network to be available for the domain, and does this via a 3rd Party SDN (controller). Using the collective details from allocated VDUs/VLs, EnterpriseWeb uses a model of the SDN Controller to translate network policies into specific commands, binding the VLs from the EPC to SD-WAN interfaces—in this case issued using HTTP/REST/JSON. This initiates an independent set of actions in the SDN controller as part of the choreography.

In step 3248, EnterpriseWeb is alerted when the end-to-end networking is in place so that it can release the EPC service to be consumed by other domains.

Related Use-Cases/Alternate Implementations
ONAP use-case: VoLTE (wiki.onap.org/pages/viewpage.action?pageID=6593603)
OSM Use-case: Multi-Pop Emulation (osm.etsi.org/images/OSM-Whitepaper-TechContent-ReleaseTHREE-FINAL.PDF)
Referenced Software Contracts
Software Contracts may be inherited with Base Object Type in EnterpriseWeb. They may be enforced automatically. These are examples of micro-capabilities referenced herein:

| Category | Examples |
| --- | --- |
| Transaction Management | Consistency, Fault Management, Compensation, Traceability |
| Object Management | Immutable, append-only, log-style persistence, indexing, tagging, audit history, search, graph navigation, views, lifecycle management, views (graph, list, object, etc.) |
| Non-Functional Concerns | Security, Identity Management, Business Compliance, IT Governance |
| Pre-Conditions | Hooks for permissions (e.g. client privileges and access mechanisms to read, write, execute an object), which support the configuration and enforcement of security and identity policies |

-continued

| Category | Examples |
|---|---|
| Post-Conditions | Provide hooks for the configuration and enforcement of business compliance, IT governance and system control policies, as well as hooks for configuration and execution of Pub/Sub policies and transition policies for task flows based on hyperlinks |

Referenced Platform Services

Middleware capabilities inherited through the Type System and automatically linked to the Object graph. These are examples of micro-capabilities referenced herein:

| Category | Examples |
|---|---|
| Portal Services | Browser-based JSON portal (cross-platform), dynamic applications, work-lists, forms, enterprise search, UI-Integration (templates, content, mashups) |
| Security Services | Identity, role-based access control, single sign-on authentication/authorization protocols (Kerberos, Oauth, SAML, XACML, etc.), certification and credential management, encryption in-flight/at-rest, etc. |
| Gateway Services | Modeling/onboarding endpoints (service, API, system, database, device, etc.), protocol translation, data type transformations, entity mapping, proxy services, fault management |
| Controller Services | Automate configuration and control |
| Network Services | Network integration (virtual functions, orchestrators, target hosts, network resources) |
| M2M/IoT Services | Machine/Device Integration (sensors, actuators, gateways) |
| Entity Mgt Services | Lifecycle management of all system objects (models and instances, apps and data, nodes and machines/devices) |
| Application Services | Application integration (Services, APIs, Microservices, legacy systems, databases, etc.) |
| Data Services | Data integration (structured, semi-structured and un-structured) |
| Process Services | Service choreography and orchestration, system and human workflows, collaboration |
| Policy Services | Enforcement and execution of Declarative policies |
| Decision Services | Decision tables, decision trees |

Glossary of Acronyms/Terms

| Acronym | Name | Notes |
|---|---|---|
| API | Application Programming Interface | |
| ASIC | Application-Specific Integrated Circuit | Specialized/customized hardware |
| BGP | Border Gateway Protocol | Routing technology used in physical networks |
| BSS | Business Support System | |
| CLI | Command Line Interface | |
| CloudInit Script | | A script used to initialize an operation system running on a virtual host (typically by issuing CLI commands when the node is first booted) |
| CPE | Customer Premises Equipment | A device providing network access and a set of network functions (examples: firewalls, filters, etc.) to a customer site |
| C-RAN | Cloud Radio Access Network | A method for supplying cell phone services (via a Radio Access Network) where in the services are hosted virtually in the cloud (rather than in the radio device itself). |
| CSPs | Communications Service Provider | |
| DoS | Denial of Service | A type of attack performed by a malicious party, wherein they send a high-volume of traffic at a network to overwhelm its resources |
| Domain | | Physically and/or locally separated functional/implementation domains |
| DevOps | Development + Operations | Practice of unifying software development (dev) with software operations (Ops), focusing on automation. |
| DPI | Deep Packet Inspection | VNF for analyzing/classifying network traffic (packets) |
| EPC | Evolved Packet Core | VNF providing handoff of mobile traffic (packets) across access sites |
| ETSI | European Telecommunications Standards Institute | |
| Host | | Infrastructure where an application or function executes. Typically refers to a VIM (i.e., OpenStack, VMWare, etc.) or Cloud Host (i.e., AWS, GCP, |

-continued

| Acronym | Name | Notes |
| --- | --- | --- |
| | | Azure, etc.) where VMs or containers are deployed. |
| IMS | IP Multimedia Subsystem | VNF providing voice and video calling functions |
| IPsec | Internet Protocol Security | Security protocol used in virtual networks |
| JSON | JavaScript Object Notation | |
| KPI | Key Performance Indicator | |
| LAN | Local Area Network | |
| MEF | Metro Ethernet Forum | Standards body |
| MEF LSO | MEF Lifecycle Service Orchestration | A MEF based set of APIs and requirements for a Lifecycle Service Orchestrator |
| MPLS | Multiprotocol Label Switching | Routing technology used in physical networks |
| NFV | Network Function Virtualization | |
| NFVO | NFV Orchestrator | Single orchestrator or could be decomposed into separate Service and Resource Orchestrators |
| OASIS | Organization for the Advancement of Structured Information Standards | Standards body |
| OASIS TOSCA | Topology and Orchestration Specification for Cloud Applications | Modeling Language for Cloud based applications |
| OpenFlow | | Language for Describing Software Defined Network Policies |
| OpenStack | | Example VIM (Virtual Infrastructure Manager) |
| OSS | Operational Support System | |
| Overlay | | Virtual Network built on top of the Underlay (i.e. physical network) |
| PNF | Physical Network Function | |
| PoP | Point of Presence | Physical access domain |
| RDF | Resource Description Framework | |
| REST | Representational State Transfer | Architectural style of the web, used to categorize a specific type of HTTP-based communication |
| SDN | Software Defined Networking | |
| SDN Controller | | Application controller for the management of Software Defined Networks |
| SD-WAN | Software Defined WAN | |
| Service Slice | | Term for a service instance utilized in the delivery of 5G networks |
| SID | The Information Framework (TM Forum) | Information model used by the TM Forum |
| SLA | Service Level Agreement | |
| SSH | Secure Shell | Method for running CLI commands remotely |
| TM Forum | | Standards body |
| TMF OpenAPIs | TM Forum OpenAPIs | Set of APIs for telecom related functions. |
| Traffic Generator | | VNF to produce traffic for test purposes |
| UML | Unified Modeling Language | |
| Underlay | | Underlying (Physical) Network Infrastructure |
| vCPE | Virtual Customer Premises Equipment | A lightweight device providing network access to a customer site, wherein all other CPE functions (examples: firewalls, filters, etc.) are implemented remotely/virtually in a data center |
| VDU | Virtual Deployment Unit | A VM or container used to host elements of a VNF. |
| VLAN | Virtual Local Area Network | Protocol for virtual LAN |
| vLB | Virtual Load Balancer | VNF |
| vEPC | Virtual Evolved Packet Core | VNF providing handoff of mobile traffic (packets) across access sites |
| vFilter | Virtual Filter | VNF for policy-based filtering of web traffic |
| vFW | Virtual Firewall | VNF |
| vIMS | Virtual IP Multimedia Subsystem | VNF providing voice and video calling functions |

-continued

| Acronym | Name | Notes |
| --- | --- | --- |
| VIM | Virtual Infrastructure Manager | Application controller for the management of infrastructure |
| VL | Virtual Link | |
| VM | Virtual Machine | |
| vMonitor | Virtual Monitor | VNF for general resource monitoring |
| VNF | Virtual Network Function | |
| VNFC | Virtual Network Function Component | Supports distribution of functionality in a VNF over multiple VDUs |
| VNFD | Virtual Network Function Descriptor | |
| VNFM | Virtual Network Function Manager | Application controller for the management of VNFs |
| VNF Package | | Extended Object Model for a VNF supporting full automation (Lifecycle Management, Configuration, etc.) |
| VoLTE | Voice over LTE | A network service used to provide Voice calls for cellular phones using a (virtual) data network. |
| vProbe | Virtual Probe | VNF for detecting faults and/or specialized metrics within a domain or data center |
| VPN | Virtual Private Network | |
| VXLAN | Virtual Extensible Local Area Network | Protocol for virtual LAN |
| WAN | Wide Area Network | |
| XML | Extensible Markup Language | |
| YANG | | A data modeling language |
| YAML | Yet Another Markup Language | A data modeling language typically used with TOSCA |

Example Business-Case for Network Function Virtualization (NFV)

Every major CSP wants to transform to a digital business so they can leverage automation, improve service velocity and achieve agility. Just as brick-and-mortar retailers haltingly transitioned to e-commerce over a decade ago to compete against online giants, CSPs are now pursuing platform business models to offer configurable network services to customers via self-service portals to fend off, in some cases, the same online giants. Once again there is an existential battle between digital natives and an old established industry they seek to disrupt.

In the end, many retailers, including prominent brands, failed to make the transition and the body count is still growing. Their organizations were fine-tuned to monetize and compete in an old world that was disappearing. While they grasped at new technologies in the wake of online retailers, they struggled to truly understand or embrace them; their ingrained business cultures resisted the change. They couldn't catch-up let alone beat the digital-natives at being digital businesses. It's too early to tell if the Telecoms will fare any better or simply fall into the same trap.

Traditional networks based on physical appliances, which supported profitable Telecom business models for decades, now hamstring CSPs in their fight with these nimbler and largely unregulated competitors. Legacy infrastructure based on Physical Network Functions (PNFs) is expensive to deploy, hard to change and its capabilities are not flexibly composable into new services. Gold-plated and over-provisioned, they were built to last, not for agility. To compete against the Over-the-Top (OTT) providers, CSPs must transform or they risk being relegated to commodity bit-pipe operators. As the retail example illustrates, you can't lead by following—transformation favors the bold.

Telecom at a Crossroads

Transformation, by definition, means a break from the past. New business requirements demand new practices and tools. If Carrier Virtualization is a strategic imperative, then platforms are a foundational requirement. Platform design decisions made today will enable and constrain how CSPs operate in the future; it may shape the industry and its prospects.

It is no surprise then that Network Function Virtualization (NFV) has become a movement with widespread support from standards bodies, open-source communities and vendors. The central thesis is that by liberating network functions from network appliances CSPs can adopt Cloud-style infrastructure with commodity hardware for improved CapEx, while gaining Operational benefit by opening a market for Virtual Network Functions (VNFs), which could be flexibly orchestrated as software applications.

The development of multi-vendor VNF marketplaces could breakdown the near monopolies of a handful of Telecom vendors allowing competition and innovation. These marketplaces may be a pipeline for CSPs to rapidly on-board new capabilities, feeding their digital platforms. Software-centric network functions may enable an app-store paradigm, with CSP customer portals providing choice and self-service allowing customers to flexibly design and configure their own virtual networks on-demand.

As it turns out four years later, virtualization of network functions was the easy part. In various embodiments, the Network Functions may be abstracted from Network Appliances. While most VNFs are not disaggregated, Cloud-native, Microservices at this point, there are an ever growing number of VNFs being made available from both incumbent and new vendors. De-coupling network functions from network appliances is not rocket science. Deploying these virtual functions as distributable software applications on commercially-off-the-shelf hardware was demonstrated early on by the first wave of ETSI NFV proofs-of-concepts.

However, proving one-off use-cases does not net a platform. Virtualization of Network Functions is a step, but there is a need to enable technology to integrate, orchestrate, configure and manage all these moving pieces in a secure, scalable and resilient manner.

The Interoperability Challenge

While industry talks and vendor presentations routinely refer to VNFs as Lego® bricks, which can be flexibly combined and interchanged to form Network Services, the reality is quite different. Instead of seamless standards-based interoperability, CSPs are reporting that the on-boarding process for a single VNF can take 4-6 cross-functional teams 4-6 weeks.

The NFV vision depends on being able to easily on-board VNFs into digital business platform in a timely and cost-effective way to achieve critical mass for a marketplace. However, to date, on-boarding has largely been bogged down as the custom process of manually-integrating each VNF to the platform tooling on a one-off basis, which is time-consuming and expensive and the resulting tightly-coupled solution is difficult to change. Conceptually, hard-coding software is akin to hard-wiring network appliances, and the results are equally static—the old methods work against the new goals.

To address this interoperability challenge, the breadth and depth of the domain problem should be understood. VNFs are not homogeneous Lego® bricks; they are complex software applications with unique properties, constraints, behaviors and dependencies. No two VNFs, even of the same type, may be architected the same way.

Beyond capturing the Functional attributes, the on-boarding process may 'wrap' each VNF with relevant Non-Functional metadata and metrics (e.g. security, identity, licensing, testing, catalog, design studio, orchestration, policy management, etc.), so they can be consistently managed within a platform.

Lastly, CSP platforms may support the dynamic nature of the NFV environment itself and adapt as VNFs are updated, upgraded and replaced, as deployment technologies change, and as standards evolve.

While it may be easier conceptually to isolate each of these aspects and address them individually, the reality is that they may be interrelated, if not interdependent. In some embodiments, a successful platform technologies will require a holistic solution.

Unfortunately, narrow, overlapping and incomplete standards have resulted in siloed use-cases which generally fail to demonstrate how all elements of an NFV platform come together as a coherent system. CSPs are still far from seamlessly juggling diverse VNFs through CSP processes at this point.

It appears that the industry may have under-estimated the problem space. There is a big gap between standardizing some industry terms and automating interoperability as is suggested by vision statements of Telecom executives. The former facilitates some interoperability between components, but the standards are generally the tip of the iceberg. They neither have the breadth or depth to describe technical integration, let alone automate it for dynamic composition.

Of course, there have been lots of standards-based models developed over the years, but like government regulations, they proliferate, addressing narrow domains and generally avoiding lower-level implementation details. This results in islands of automation; the gaps and overlaps are all manually integrated. Individually, they may each add value, but collectively they create greater complexity, which is being revealed as the industry seeks end-to-end solutions.

To make the transition to Digital Businesses, CSPs must be able to work across silos, technologies and domains. A Digital Business may need to act as a one unified, virtually centralized entity—distributed, but not fragmented.

This may require a broader conceptualization of interoperability, one that accommodates diversity and anticipates change. In various embodiments, automating decisions and hand-offs in virtualized networks is not 'nice to have', but rather may be a foundational requirement for Zero-touch Orchestration, Operations and Management (e.g., TMF "ZOOM").

After four years, NFV is in the 'trough of disillusionment'. The good news is that early experiences may now assist to move on to new and more transformative approaches to break the current impasse.

Managing Snowflakes

There is a tendency in life and business to oversimplify a problem to come up with an easy solution. However, reducing a problem gratuitously for a short-cut might not net a sustainable solution as you inevitably cut-out important details. When such plans are implemented, real-world complexity inevitably reveals the short-comings. Since re-visiting past architectural decisions can be expensive and embarrassing for those involved, after-the-fact fixes tend to be Band-Aids®. In the end, what appeared safe might only have been expedient.

Some domains, like Telecom, are inherently complex and resist over-simplification; they require more thoughtful solutions. To that end, software Architects look for patterns. Patterns help us generalize phenomena based on common characteristics. By recognizing patterns abstractions may be created (e.g., models), which provide common semantics for working at a higher-level. Generalization may be an antidote to over-specialization so organizations can get away from one-off management of snowflakes. The benefit is a unified approach, integrative solutions and re-use of generalized objects in different contexts.

If the abstraction is extended to describe implementations, the model is 'executable', enabling the automation of tasks that are impossible for humans to perform at Internet scale and speed. Powerful abstractions give us leverage over our domain; they empower us by removing roadblocks to next-gen capabilities.

Interoperability: To Constrain or not to Constrain, that is the Question

While it might be appealing for CSPs to standardize their environments on a set of protocols, formats and technologies and force all VNF suppliers comply with it, it is an overly prescriptive approach to NFV interoperability that is short-sighted.

The fixed constraints tightly-couple CSP solution architecture to an implementation stack (e.g., specific Data Formats, NFVO, VNFM, VIM, as well as a set of specified middleware components, etc.). The approach casts the environment in concrete, inhibiting the adaptability of the entire platform. This is not a good architectural practice. Given the time and cost of transformation, CSPs do not want to revisit their platform every couple of years; they need a future-forward architecture that can evolve over-time.

Imposing fixed design constraints has the unintended effect of limiting market participation to conformant VNFs, which limits competition. Controlling VNFM providers design and deployment choices also inhibits product innovation and optimization, where another set of VNF-specific choices may provide improved performance and enhanced capabilities, which would benefit CSPs.

CSP design constraints raises costs for VNFM providers, which may have to develop and maintain custom versions of each VNF for every CSP environment or variant of an environment. Every time an element of a CSP environment changes the vendor will likely have to update their custom VNFs, related costs will be passed on to CSPs one way or another.

There is an alternative to tight constraints, it is relaxed-constraints and it has a fairly successful implementation—the Web. The founding architects of the largest, most diverse and resilient network in human history understood the theoretical challenges of building vast, open distributed systems and consciously pursued relaxed constraints. Postel's law, named after Jon Postel who authored TCP/IP, guides us to "be conservative in what you send, be liberal in what you accept". This philosophy was also adopted by HTTP and the REST architectural-style. Collectively, these technologies present a minimal set of generic specifications, which allow Web architecture to be flexible, extensible and adaptable.

Of course, this may be what is needed to cope with complexity of handling heterogeneous VNF packages. Constraints may be relaxed to promote participation, competition and continuous innovation. It suggests a generic protocol for onboarding VNFs, as well as VNF-Cs, NFVOs, VNFMs and VIMs in order to promote systemic interoperability.

To cope with all these heterogeneous and continuously evolving components there may be an abstraction, a way to generalize the snowflakes, map them to standard references wherever possible while accommodating unique details.

The industry may need a joined up model-of-models, or a 'Metamodel', which brings together related domain concepts from across Standards Development Organizations (SDOs) into a connected model that supports end-to-end automation of CSP processes, including service delivery and lifecycle management. This may mean linking NFV, Openstack, OSS/BSS and other concepts in a Metamodel that captures the relationships between these domains.

A Metamodel may not change the physics of any discrete function, tool or target host. The ability to interact with them will be prescribed by their interfaces, and whatever properties and behaviors they expose. However, it may provide a way to map proprietary interfaces to a standards-based API.

If there was a common model wrapping heterogeneous VNFs it may support the development of multi-vendor marketplaces and platforms for onboarding, composing and orchestrating them. While each VNF may be unique, they may share a set of common references to metadata and metrics to enable automated handling and management.

EnterpriseWeb's "Metamodel for a Virtual (or Real) Function Package" may help advance industry transformation. It may represent a universal template for onboarding heterogeneous VNF Packages.

Example Metamodel for a Virtual Function Package

In some embodiments, the "Metamodel" is distributed as an XML schema, which provides a common model for mapping vendor Packages to utilize OASIS TOSCA, ETSI NFV and TMF Open API concepts and can be extended to include concepts from other SDOs and Open Source projects.

In this example, the standards-based Metamodel example provides a high-level abstraction, a generic protocol, above any tool-specific model or specific standard, to allow Service Providers to streamline full lifecycle onboarding management and automation of downstream processes.

In this example, the Metamodel describes the domain in a graph, which allows the modeling of complex and evolving relationships between the domain concepts of multiple Standards Development Organizations (SDOs). It may provide a common machine-readable pattern for modeling Virtual Function Packages as an executable software object with mappings to standard-based references, providing a normalized representation. VNF vendors can also specify dependencies on VNF Managers, Orchestrators and supporting components.

A Metamodel's graph design may be natural to distributed computing and is aligned with the TOSCA topology. It addresses limitations of conventional information models and tree-based data models, which are rigid, hierarchical structures that cannot accurately represent the domain complexity.

In this example, the Metamodel supports mediation between a TOSCA Package, with its specified artifacts and plans, and related industry standards and APIs to construct an executable representation of the package, which can then be addressed as a single manageable entity—a virtual Lego®!

At least one Metamodel example described herein is refreshingly un-opinionated (i.e. relaxed constraints). It conceptually allows for the modeling of any virtual function (e.g. NFV, IoT, Big Data, or Enterprise application), any protocol (e.g. NETCONF/YANG, SNMP/MIB, HTTP/REST, SOAP/WSDL), any components (e.g. orchestrators, controllers, databases, operating systems) and any target hosts (e.g. VMware, OpenStack, Docker, Bare Metal). Rather than constrain design, it supports the modeling of real-world complexity. Of course, the Metamodel is just a pattern. It doesn't do anything by itself. The onus falls on implementations to be able to process Metamodel-based objects.

While the Metamodel example reflects concepts and principles of EnterpriseWeb's own platform technology, the Metamodel is implementation-independent.

Implementing the Example Metamodel

In this example, the Metamodel results in a software object, which is a rich metadata description of a Virtual Function package, using a consistent pattern. Instead of manually integrating a set of components together in a siloed solution with all relationships statically defined, each Metamodel-based object can be composed into any number of solutions. The business specifies "what" it wants—the objects it wants to use and the policies that govern them (i.e. an intent-based interface) and the "how", implementation and assurance, is automated. Since nothing is hard-coded, the business can rapidly configure and easily modify their applications using Metadata without worrying about the technical details. This is not magic, it's just advanced computer science. However, it does suggest sophisticated Platform technology to bind the right objects, at the right time, for the right people based on interaction-context.

The Metamodel may allow integration effort to be shifted from upfront human decisions to run-time system decisions. In this way, the Metamodel may automate interoperability in order to liberate developers from tedious and redundant work, while enabling a new-class of 'smart' applications. Developers can express their intent in policies and delegate responsibility to the platform to evaluate conditions, make decisions and configure a service for a real-time interaction context. It may support a shift from imperative, procedural programming to goal-oriented, event-driven software design, where the platform handles the complexity so CSPs can focus on the business.

Platforms implementing the example Metamodel may provide a design environment for onboarding and composing Metamodel-based objects and an execution environment for processing the requests for those objects. In response to a request (or event), Platforms may need to identify and interpret the relevant set of objects, handle all connections, perform all necessary translations and transformations, mediate the communications between elements of the solution, and orchestrate the overall service delivery while providing for scalable and secure transactions and lifecycle management of the service and each participating element. This is no small feat.

In this example, the Metamodel can be implemented as a stack of middleware components. This may involve integrating some combination of Big Data, Complex Event Processing and SemanticWeb technologies to drive automated decisions and implement behavior. This has been the dominant Enterprise IT approach for the last 10-15 years, but it has yielded mix results. EnterpriseWeb saw inefficiencies and inflexibility in these conventional Service Oriented Architectures, so they re-imagined the middle-tier from the ground up to support the requirements of digital businesses.

EnterpriseWeb—CloudNFV

EnterpriseWeb's example implementation of the example Metamodel, may be offered as a suite of products called "CloudNFV".

In one example, CloudNFV includes a Digital Marketplace solution that uses the Metamodel as the foundation for vendor and VNF onboarding. The Marketplace features a portal with role-based access control so vendors can rapidly and securely onboard their VNF Packages through a Metamodel-driven questionnaire. EnterpriseWeb also exposes a REST API for interaction with the questionnaire.

The interactive questionnaire drives the mapping of VNF properties and behaviors to domain concepts and types in order to "normalize" Package descriptors without writing any code or tightly-coupling the specification. The unique characteristics of each object are likewise captured; any detail that is required to interact with the endpoint (Identity, Certs and Keys, Protocols, Data Formats, Dependencies, etc.) are all declared as part of the description of that object and will require some form of mediation.

The object doesn't have to represent every detail of an endpoint; it can be limited to gold configs or the scope of a use-case and then expanded or modified over time. The approach supports iterative, agile development methods.

The example Metamodel pattern allows a rich, executable description of endpoints, which is:

Flexible (conditional relationships allowing varied implementations or 'flavors');

Extensible (captures non-standard properties and behaviors to allow for innovation); and Adaptable (version control is a concept, which allows for the evolution of elements)

In effect, EnterpriseWeb's implementation of the example Metamodel provides a consistent method for coping with variety and change at scale.

Beyond onboarding, EnterpriseWeb's example Metamodel-based object enables common methods over heterogeneous endpoints so they can be managed as if they were the same. It may enable CSPs to leverage standards-based metadata and metrics in the platform's design and execution environments for discovery, composition, orchestration, and resource and service configuration.

Unlike conventional point-to-point integration, where elements are tightly-coupled to each other, with the Metamodel interoperability may be based on a common design-pattern and shared metadata and link references; it allows solutions to be developed in a loosely-coupled manner. The software objects can be flexibly connected using metadata and metrics to configure and control services, it eliminates both 'integration tax' (i.e. expensive to build) and 'technical debt' (i.e. expensive to change).

EnterpriseWeb's Declarative approach may support "intent-based" interfaces that translate policies into dynamic implementations based on complex real-time computations of interaction context and system state. Policies specify the relevant metadata and metrics at design-time, which are interpreted at run-time to configure and control Network Functions based on closed-loop behavior.

In various embodiments, EnterpriseWeb's run-time supports multi-tenant, hybrid, multi-cloud and fog deployments and real-time enterprise workloads (stateless and stateful). The lightweight solution may have a 10 mb footprint and may only require a Java Servlet Container and SQL or NoSQL DB of choice. The CloudNFV solution can be distributed as a mesh network. Its service and resource orchestration, and generic VNF manager capabilities can be deployed as independent Microservices so they can be scaled and maintained separately.

EnterpriseWeb generally presents a big-picture unified CloudNFV solution with a North-bound API to the OSS/BSS that abstracts NFV and SDN complexity so CSPs can achieve zero-touch Management and Operations ("MANO") today.

In this example, CloudNFV provides a 'smart' catalog of all solution elements (e.g. VNFs, VNF-Cs, NFVOs, VNFMs, etc.). Everything is on-boarded using the Metamodel as the basis for a universal template. The platform provides a design environment for the declarative composition of VNFs into Network Services. At run-time, the platform interprets the Network Service and all the related policies to construct and optimized implementation plan, which are delegated to the right set of components for execution. EnterpriseWeb may mediate the relationships between components so each 3rd-party engine gets just what it needs to process the request in the format it requires. For disaggregated VNFs, CloudNFV can even provide generic orchestration and controller capabilities as event-driven middleware services.

In response to requests from Tier 1 telecoms and integrators, EnterpriseWeb has decomposed an example CloudNFV into targeted solutions for NFV, which can be deployed as discrete Microservices. Each implements a sub-domain of the example Metamodel, consistent with ETSI standard interfaces (i.e. NFVO, VNFM, VIM). This allows CSPs to deploy CloudNFV to mediate one-to-many orchestrators, one-to-many controllers, and one-to-many target hosts. Addressing this real-world many-to-many complexity is like removing a thorn from a lion's foot, eliminating integration pain that CSPs have at each layer. The business model allows CSPs to use EnterpriseWeb in one area to start and then can opt to expand its use over time.

About EnterpriseWeb

EnterpriseWeb platform makes it easy for businesses to rapidly compose highly-modular Cloud-native apps and web-scale processes from heterogeneous services, APIs and microservices. The platform connects people, information, systems, algorithms, network resources and devices in a unified model for integrated operations and task automation.

It includes shared libraries, tools and services for designing, running and managing Enterprise-class, Web-scale solutions.

The Platform is based on EnterpriseWeb's proprietary language and run-time. The Graph Object and Action Language (GOAL™) is a dynamic Language for declaratively modeling endpoints as software objects. The Metamodel for a Virtual Function Package, unsurprisingly, reflects design concepts and principles of GOAL. EnterpriseWeb's highly-available and performant run-time interprets GOAL objects, effectively executing event-driven mashups of remote data, functions and policies.

The EnterpriseWeb platform is a one-stop-shop for the unified management of dynamic human workflows and model-driven automation of Cloud, Internet-of-Things ("IoT"), network, system and IT pipelines. It represents a generational shift from bloated middleware-based application architectures to an agile application fabric. The software helps organizations of any type or size, transform into real-time, data-driven digital businesses so they can personalize user-experiences, optimize transactions and synchronize enterprise-wide activity.

Flatten the Stack

EnterpriseWeb has done to middleware components what NFV aims to do with network appliances. It liberates middleware capabilities from components and stores them as GOAL objects in the system library (i.e. a catalog). The platform runtime renders middleware capabilities as stateless, event-driven platform services. EnterpriseWeb's platform provides generic execution necessary to perform a wide-range of functions without a stack of middleware components. It eliminates the need for application servers, API gateways, enterprise service buses, process engines, integration tools, complex event processing, etc. This gives EnterpriseWeb a horizontal aspect, allowing it to act as an application fabric dynamically binding otherwise loosely-coupled endpoints in rich transactions.

When onboarding or composing objects in EnterpriseWeb, middleware capabilities are automatically attached via the platform's sophisticated Type system. You don't have to specify point-to-point connection, integration, translation, transformation, mediation, etc. in advance (design-time). The fabric understands each modeled object and when they are invoked in a process it handles implementation details on behalf of developer (run-time late-binding).

At run-time, the platform's execution environment references the library to dynamically construct the tool-chain it needs in order to realize the network service. It assembles just the right tools for the job just-in-time, in a single middleware backplane allowing extremely efficient, compute and Input/Output intensive, graph transaction processing.

This conceptual alignment with NFV principles is how EnterpriseWeb landed the first proof-of-concept project for ETSI NFV. What appears magical to many in the industry was just foresight on the company's part. Note, NFV is just one domain that the platform addresses, the technology is also used for real-time, data-driven, policy-controlled Cloud, IoT and Enterprise applications.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system that dynamically realizes a contextually-motivated network service instance in response to receiving an order, the system comprising:
   one or more processors; and
   memory storing instructions that, when executed by the one or more processors, cause the system to:
      receive an order, the order indicating a network service model;
      identify a context of the order based on in-band metadata;
      generate, using the network service model, a deployment plan, the deployment plan facilitating an instantiation of a contextually-motivated network service instance as a set of normalized lifecycle management (LCM) operations performed against each of a plurality of associated service entities; and
      deploy the deployment plan, wherein to deploy the deployment plan causes the system to:
         bind each of the normalized LCM operations, based on the context of the order, to one or more respective micro-capabilities, each of the respective micro-capabilities having previously been onboarded to the system as one or more corresponding declarative modeled objects capable of being declaratively composed, each of the corresponding declarative modeled objects being declaratively composed and modeled using a same dynamic language that is interpreted at run-time based on the context of the order, each of the corresponding declarative modeled objects including a mapping of object properties, object behaviors, and standard LCM operations to one or more existing micro-capabilities of the system; and
         manage execution of the one or more respective micro-capabilities and associated resources, associated storage, and associated network and service allocation and configuration, to instantiate the contextually-motivated network service instance.

2. The system of claim 1, wherein the network service model comprises a plurality of virtual network functions (VNFs) managed as service entities of the system, the network service model including network information for connecting one or more of the service entities of the system to one or more other service entities of the service entities of the system.

3. The system of claim 1, wherein the order comprises a product order, the product order being a particular type of event that is evaluated based on the context.

4. The system of claim 1, wherein the instructions further cause the system to:
request a list of billing packages, thereby allowing the billing packages to be referenced as part of the network service model.

5. The system of claim 3, wherein the respective micro-capabilities comprise one or more billing policies.

6. The system of claim 5, wherein to deploy the deployment causes the system to map and transform the billing policies into executable objects.

7. The system of claim 1, wherein any of the micro-capabilities and the associated resources, the associated storage, and the associated network and service allocation and configuration are performed by any of the system and one or more federated controllers.

8. The system of claim 7, wherein the one or more federated controllers include any of one or more Virtual Network Function Managers (VNFMs), one or more Network Function Virtualization Orchestrator (NFVOs), and one or more Software Defined Networking Controllers (SDN Controllers).

9. The system of claim 1, wherein the order is received from an associated system through an Representational State Transfer (REST) Application Programming Interface (API).

10. The system of claim 1, wherein the order comprises an order for a Virtual Customer Premises Equipment (vCPE).

11. The system of claim 1, wherein the instructions further cause the system to:
determine, based on the network service model, deployment information for one or more service entities, the deployment information including chaining requirements, VNF packages, and one or more connected policies.

12. The system of claim 11, wherein the one or more connected policies include one or more service license agreements (SLAs) related to system performance.

13. The system of claim 11, wherein the instructions further cause the system to:
detect one or more events associated with any of the network service instance or one or more other network service instances;
correlate the one or more events against a set of SLAs, the set of SLAs including at least the one or more SLAs related to performance;
determine one or more of the SLAs to be in violation;
identify one or more required LCM operations for each of the one or more SLAs determined to be in violation; and
bind each of the LCM operations, based on a context of a connected network service instance, to one or more micro-capabilities to bring each of the one or more SLAs determined to be in violation back into compliance.

14. The system of claim 13, wherein the one or more events include any of one or more alerts or state changes in any of the network service instance or the one or more other network service instances.

15. The system of claim 13, wherein the one or more required LCM operations include one or more scaling operations.

16. The system of claim 1, wherein to manage the execution of the one or more micro-capabilities causes the system to fulfill the order as a transaction providing guarantees, and to apply any of compensations and rollback automatically.

17. The system of claim 1, wherein any of the micro-capabilities and the associated resources, the associated storage, and the associated network and service allocation and configuration are performed as at least a portion of a choreography.

18. A non-transitory computer readable medium comprising instructions that, when executed, cause one or more processors to:
receive an order, the order indicating a network service model;
identify a context of the order based on in-band metadata;
generate, using the network service model, a deployment plan, the deployment plan facilitating an instantiation of a contextually-motivated network service instance as a set of normalized lifecycle management (LCM) operations performed against each of a plurality of associated service entities; and
deploy the deployment plan, wherein to deploy the deployment plan causes a system to:
bind each of the normalized LCM operations, based on the context of the order, to one or more respective micro-capabilities, each of the respective micro-capabilities having previously been onboarded to the system as one or more corresponding declarative modeled objects, each of the corresponding declarative modeled objects being declaratively composed and modeled using a same dynamic language that is interpreted at run-time based on the context of the order, each of the corresponding declarative modeled objects including a mapping of object properties, object behaviors, and standard LCM operations to one or more existing micro-capabilities of the system; and
manage execution of the one or more respective micro-capabilities and associated resources, associated storage, and associated network and service allocation and configuration, to instantiate the contextually-motivated network service instance.

19. The non-transitory computer readable medium of claim 18, wherein the network service model comprises a plurality of virtual network functions (VNFs) managed as service entities of the system, the network service model including network information for connecting one or more of the service entities of the system to one or more other service entities of the service entities of the system.

20. The non-transitory computer readable medium of claim 18, wherein the order comprises a product order, the product order being a particular type of event that is evaluated based on the context.

21. The non-transitory computer readable medium of claim 20, wherein the respective micro-capabilities comprise one or more billing policies.

22. The non-transitory computer readable medium of claim 21, wherein to deploy the deployment causes the system to map and transform the billing policies into executable objects.

23. The non-transitory computer readable medium of claim 18, wherein the order comprises an order for a Virtual Customer Premises Equipment (vCPE).

24. The non-transitory computer readable medium of claim 18, wherein the instructions further cause the one or more processors to:
determine, based on the network service model, deployment information for one or more service entities, the deployment information including chaining requirements, VNF packages, and one or more connected policies.

25. The non-transitory computer readable medium of claim 24, wherein the one or more connected policies include one or more service license agreements (SLAs) related to system performance.

26. The non-transitory computer readable medium of claim 24, wherein the instructions further cause the one or more processors to:
- detect one or more events associated with any of the network service instance or one or more other network service instances;
- correlate the one or more events against a set of SLAs, the set of SLAs including at least the one or more SLAs related to performance;
- determine one or more of the SLAs to be in violation;
- identify one or more required LCM operations for each of the one or more SLAs determined to be in violation; and
- bind each of the LCM operations, based on the context of a connected network service instance, to one or more micro-capabilities to bring each of the one or more SLAs determined to be in violation back into compliance.

27. A method that dynamically realizes a contextually-motivated network service instance in response to receiving an order, the method being implemented by a computing system including one or more physical processors and storage media storing machine-readable instructions, the method comprising:

- receiving an order, the order indicating a network service model;
- identifying a context of the order based on in-band metadata;
- generating, using the network service model, a deployment plan, the deployment plan facilitating an instantiation of a contextually-motivated network service instance as a set of normalized lifecycle management (LCM) operations performed against each of a plurality of associated service entities; and
- deploying the deployment plan, the deploying including:
  - binding each of the normalized LCM operations, based on the context of the order, to one or more respective micro-capabilities, each of the respective micro-capabilities having previously been onboarded to the system as one or more corresponding declarative modeled objects, each of the corresponding declarative modeled objects being declaratively composed and modeled using a same dynamic language that is interpreted at run-time based on the context of the order, each of the corresponding declarative modeled objects including a mapping of object properties, object behaviors, and standard LCM operations to one or more existing micro-capabilities of the system; and
  - managing execution of the one or more respective micro-capabilities and associated resources, associated storage, and associated network and service allocation and configuration, to instantiate the contextually-motivated network service instance.

* * * * *